United States Patent
Wu

(10) Patent No.: US 12,538,349 B2
(45) Date of Patent: Jan. 27, 2026

(54) MANAGING DATA COMMUNICATION BEFORE AND AFTER A STATE TRANSITION

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 370 days.

(21) Appl. No.: 18/279,140

(22) PCT Filed: Mar. 11, 2022

(86) PCT No.: PCT/US2022/019865
§ 371 (c)(1),
(2) Date: Aug. 28, 2023

(87) PCT Pub. No.: WO2022/212001
PCT Pub. Date: Oct. 6, 2022

(65) Prior Publication Data
US 2024/0147524 A1  May 2, 2024

Related U.S. Application Data

(60) Provisional application No. 63/200,898, filed on Apr. 1, 2021.

(51) Int. Cl.
*H04W 74/08* (2024.01)
*H04W 76/27* (2018.01)

(52) U.S. Cl.
CPC ........... *H04W 74/08* (2013.01); *H04W 76/27* (2018.02)

(58) Field of Classification Search
CPC ..... H04W 76/27; H04W 76/19; H04W 72/23; H04W 72/231; H04W 74/006; H04W 74/08
See application file for complete search history.

(56) References Cited

U.S. PATENT DOCUMENTS

2019/0037447 A1\* 1/2019 Lee ................. H04W 74/0833
2019/0380081 A1   12/2019 Chang et al.
(Continued)

FOREIGN PATENT DOCUMENTS

| WO | WO-2018/126449 A1 | 7/2018 |
| WO | WO-2020/166817 A1 | 8/2020 |

(Continued)

OTHER PUBLICATIONS

"3rd Generation Partnership Project; Technical Specification Group Services and System Aspects; Study on evolution of Cellular IoT security for the 5G System; (Release 16)," 3GPP Draft (May 2020).
(Continued)

*Primary Examiner* — Quoc Thai N Vu
(74) *Attorney, Agent, or Firm* — MARSHALL, GERSTEIN & BORUN LLP

(57) ABSTRACT

To manage communications from a UE during a state transition, a central unit (CU) of a base station performs, by processing hardware, an early data transmission procedure with the UE while the UE is in an inactive state, including transmitting at least one data packet of a sequence of data packets to the UE (802). The CU determines to transition the UE from the inactive state to a connected state (808). In response to transitioning the UE to the connected state, the CU transmits, by the processing hardware, a next data packet in the sequence of data packets to the UE, or retransmits, by the processing hardware, the at least one data packet to the UE in response to determining the at least one data packet has not been received (812).

21 Claims, 28 Drawing Sheets

(56) References Cited

U.S. PATENT DOCUMENTS

2022/0070945 A1* 3/2022 Wang ................ H04W 74/0841
2022/0225354 A1* 7/2022 Wang .................... H04W 72/52
2022/0322482 A1* 10/2022 Xu ........................ H04W 76/27

FOREIGN PATENT DOCUMENTS

| WO | WO-2020/167657 A1 | 8/2020 |
| WO | WO-2020/194171 A1 | 10/2020 |
| WO | WO-2021/057897 A1 | 4/2021 |
| WO | WO-2021/207317 A1 | 10/2021 |

OTHER PUBLICATIONS

Ericsson, "Email Discussion Report on [NB-Iot-AH#3] PDCP Handling at Resume," 3GPP Draft (May 26, 2016).
International Search Report and Written Opinion for Application No. PCT/US2022/019865, dated Jul. 4, 2022.

* cited by examiner

MANAGING DATA COMMUNICATION BEFORE AND AFTER A STATE TRANSITION

CROSS-REFERENCE TO RELATED APPLICATIONS

This application claims priority to and the benefit of the filing date of U.S. Provisional Patent Application No. 63/200,898 entitled "Managing Data Communication Before and After a State Transition," filed on Apr. 1, 2021, the entire disclosure of which is hereby expressly incorporated by reference.

FIELD OF THE DISCLOSURE

This disclosure relates generally to wireless communications and, more particularly, to communication of data at a user equipment (UE) and a radio access network (RAN) when the UE operates in an inactive or idle state associated with a protocol for controlling radio resources and after the UE transitions to a connected state associated with the protocol for controlling radio resources.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Generally speaking, a base station operating a cellular radio access network (RAN) communicates with a user equipment (UE) using a certain radio access technology (RAT) and multiple layers of a protocol stack. For example, the physical layer (PHY) of a RAT provides transport channels to the Medium Access Control (MAC) sublayer, which in turn provides logical channels to the Radio Link Control (RLC) sublayer, and the RLC sublayer in turn provides data transfer services to the Packet Data Convergence Protocol (PDCP) sublayer. The Radio Resource Control (RRC) sublayer is disposed above the PDCP sublayer.

The RRC sublayer specifies the RRC_IDLE state, in which a UE does not have an active radio connection with a base station; the RRC_CONNECTED state, in which the UE has an active radio connection with the base station; and the RRC_INACTIVE to allow a UE to more quickly transition back to the RRC_CONNECTED state due to Radio Access Network (RAN)-level base station coordination and RAN-paging procedures. In some cases, the UE in the RRC_IDLE or RRC_INACTIVE state has only one, relatively small packet to transmit. In these cases, the UE is in the RRC_IDLE or RRC_INACTIVE state can perform an early data transmission (also referred to herein as small data transmission) without transitioning to the RRC_CONNECTED state, e.g., by using techniques as specified in section 7.3 in 3GPP specification 36.300 v16.54.0.

In some scenarios, during early data communication between a RAN and a UE operating in an inactive or idle state, the RAN transitions the UE to a connected state, e.g., because the RAN needs to communicate a data packet associated to particular quality of service (QoS) requirements, or link quality between the UE and RAN becomes worse. It is not clear how to proceed with data communication after the UE transitions to the connected state.

SUMMARY

An example embodiment of the techniques of this disclosure is a method in a central unit (CU) of a base station for managing communications from a UE during a state transition. The method includes performing, by processing hardware, an early data transmission procedure with the UE while the UE is in an inactive state, including communicating at least one data packet of a sequence of data packets with the UE, and determining, by the processing hardware, to transition the UE from the inactive state to a connected state. In response to transitioning the UE to the connected state, the method includes communicating, by the processing hardware, a next data packet in the sequence of data packets with the UE, or recommunicating, by the processing hardware, the at least one data packet with the UE in response to failing to determine the at least one data packet has been received.

Another example embodiment of these techniques is a CU of a base station including processing hardware and configured to implement the method above.

Still another example embodiment of these techniques is a method in a distributed unit (DU) of a base station for managing communications from a UE during a state transition. The method includes performing, by processing hardware, an early data transmission procedure with the UE while the UE is in an inactive state, including communicating at least one data packet of a sequence of data packets with the UE. In response to the UE transitioning to the connected state, the method includes communicating, by the processing hardware, a next data packet in the sequence of data packets with the UE, or recommunicating, by the processing hardware, the at least one data packet with the UE in response to failing to determine the at least one data packet has been received.

Yet another example embodiment of these techniques is a DU of a base station including processing hardware and configured to implement the method above.

Another example embodiment of these techniques is a method in a UE for data transmissions to a base station during a state transition. The method includes performing, by processing hardware, an early data transmission procedure with a central unit (CU) and a distributed unit (DU) of the base station while the UE is in an inactive state, including communicating at least one data packet of a sequence of data packets with the CU via the DU. The method further includes transitioning, by the processing hardware, to a connected state with the base station. In response to transitioning to the connected state, the method includes communicating, by the processing hardware, a next data packet in the sequence of data packets with the base station, or recommunicating, by the processing hardware, the at least one data packet with the base station in response to failing to determine the at least one data packet has been received.

Still another example embodiment of these techniques is a UE including processing hardware and configured to implement the method above.

DETAILED DESCRIPTION OF THE DRAWINGS

Figure 1A:
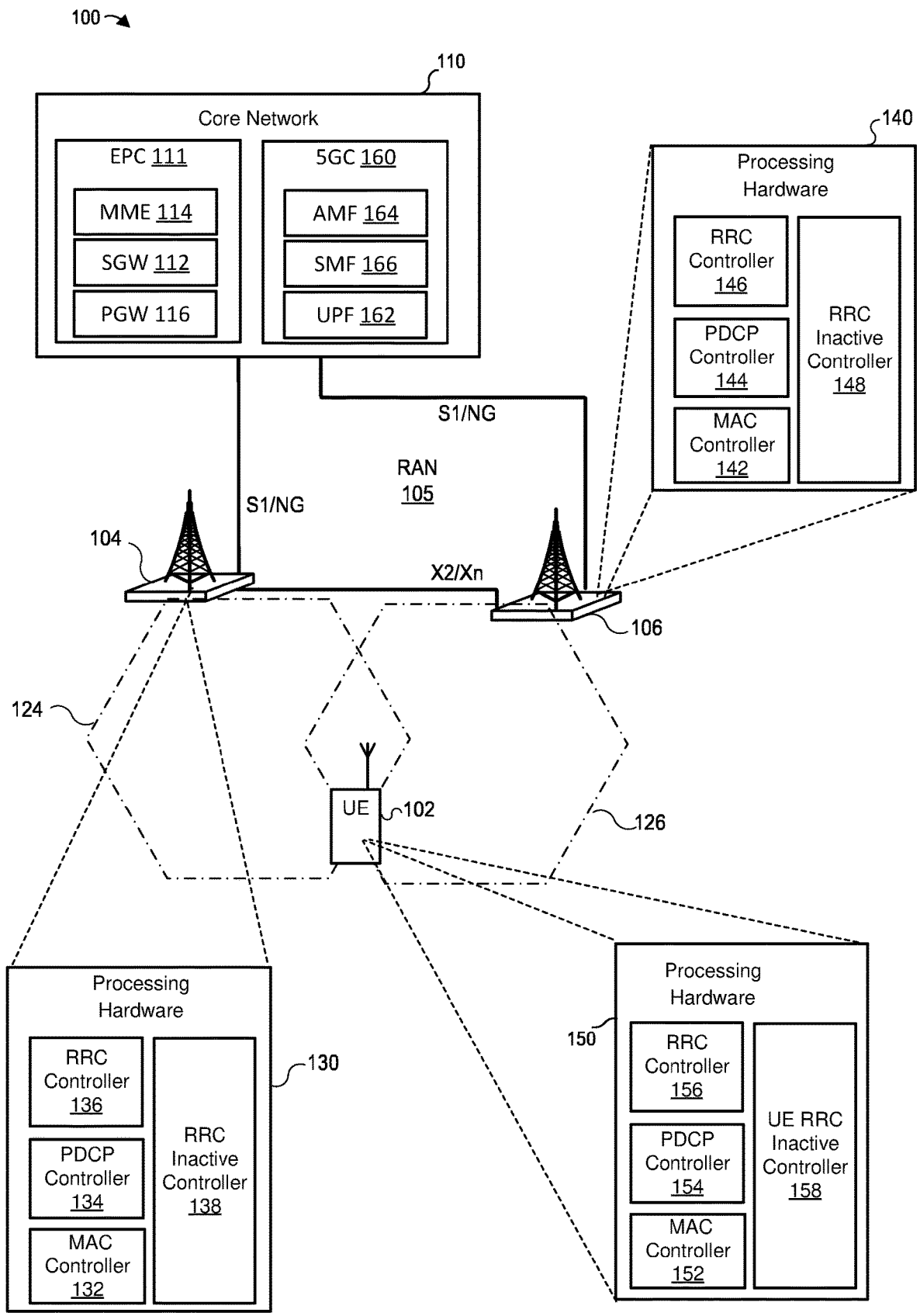
FIG. 1A is a block diagram of an example wireless communication system in which a user device and a base station of this disclosure can implement the techniques of this disclosure for reducing latency in data communication.

Referring first to FIG. 1A, an example wireless communication system 100 includes a UE 102, a base station (BS) 104, a base station 106, and a core network (CN) 110. The base stations 104 and 106 can operate in a RAN 105 connected to the core network (CN) 110. The CN 110 can be implemented as an evolved packet core (EPC) 111 or a fifth generation (5G) core (5GC) 160, for example. The CN 110 can also be implemented as a sixth generation (6G) core, in another example.

The base station 104 covers a cell 124, and the base station 106 covers a cell 126. If the base station 104 is a gNB, the cell 124 is an NR cell. If the base station 124 is an ng-eNB, the cell 124 is an evolved universal terrestrial radio access (E-UTRA) cell. Similarly, if the base station 106 is a gNB, the cell 126 is an NR cell, and if the base station 126 is an ng-eNB, the cell 126 is an E-UTRA cell. The cells 124 and 126 can be in the same Radio Access Network Notification Areas (RNA) or different RNAs. In general, the RAN 105 can include any number of base stations, and each of the base stations can cover one, two, three, or any other suitable number of cells. The UE 102 can support at least a 5G NR (or simply, "NR") or E-UTRA air interface to communicate with the base stations 104 and 106. Each of the base stations 104, 160 can connect to the CN 110 via an interface (e.g., S1 or NG interface). The base stations 104 and 106 also can be interconnected via an interface (e.g., X2 or Xn interface) for interconnecting NG RAN nodes.

Among other components, the EPC 111 can include a Serving Gateway (SGW) 112, a Mobility Management Entity (MME) 114, and a Packet Data Network Gateway (PGW) 116. The SGW 112 in general is configured to transfer user-plane packets related to audio calls, video calls, Internet traffic, etc., and the MME 114 is configured to manage authentication, registration, paging, and other related functions. The PGW 116 provides connectivity from the UE to one or more external packet data networks, e.g., an Internet network and/or an Internet Protocol (IP) Multimedia Subsystem (IMS) network. The 5GC 160 includes a User Plane Function (UPF) 162 and an Access and Mobility Management (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

As illustrated in FIG. 1A, the base station 104 supports a cell 124, and the base station 106 supports a cell 126. The cells 124 and 126 can partially overlap, so that the UE 102 can select, reselect, or hand over from one of the cells 124 and 126 to the other. To directly exchange messages or information, the base station 104 and base station 106 can support an X2 or Xn interface. In general, the CN 110 can connect to any suitable number of base stations supporting NR cells and/or EUTRA cells.

As discussed in detail below, the UE 102 and/or the RAN 105 implement the techniques of this disclosure to communicate data when the radio connection between the UE 102 and the RAN 105 is suspended, e.g., in the inactive or idle state of the protocol for controlling radio resources between the UE 102 and the RAN 105. For clarity, the examples below refer to the RRC_INACTIVE or RRC_IDLE state of the RRC protocol.

As used in this disclosure, the term "data" or "data packet" refers to signaling, control-plane information at a protocol layer of controlling radio resources (e.g., RRC), controlling mobility management (MM), controlling session management (SM), or refers to non-signaling, non-control-plane information at protocol layers above the layer of the protocol for controlling radio resources (e.g., RRC), above the layer of the protocol for controlling MM, above the layer of the protocol for controlling SM, or above the layer of the protocol for controlling quality of service (QoS) flows (e.g., service data adaptation protocol (SDAP)). The data to which the UE and/or the RAN applies the techniques of this disclosure can include, for example, Internet of things (IoT) data, Ethernet traffic data, Internet traffic data, or a short message service (SMS) message. Further, as discussed below, the UE 102 in some implementations applies these techniques only if the size of the data is below a certain threshold value.

In the example scenarios discussed below, the UE 102 transitions to the RRC_INACTIVE or RRC_IDLE state, then selects a cell of the base station 104, and exchanges data with the base station 104, either via the base station 106 or with the base station 104 directly, without transitioning to the RRC_CONNECTED state. In particular, the UE 102 and the base station 104 of the RAN 105 can communicate using early data transmission procedures, without the UE 102 transitioning to the RRC_CONNECTED state.

As a more specific example, the UE 102 in some cases transmits data in the uplink (UL) direction to the RAN 105 while the UE 102 operates in the RRC_INACTIVE or RRC_IDLE state.

After the UE 102 determines that data is available for uplink transmission while the UE 102 operates in the RRC_INACTIVE or RRC_IDLE state, the UE 102 can apply one or more security functions to the UL data packet, generate a first UL protocol data unit (PDU) including the security-protected packet, include a UL RRC message along with the first UL PDU in a second UL PDU, and transmit the second UL PDU to the RAN 105. The UE 102 includes a UE identity/identifier (ID) of the UE 102 in the UL RRC message. The RAN 105 can identify the UE 102 based on the UE ID. In some implementations, the UE ID can be an inactive Radio Network Temporary Identifier (I-RNTI), resume ID or a non-access stratum (NAS) ID. The NAS ID can be an S-Temporary Mobile Subscriber Identity (S-TMSI) or a Global Unique Temporary Identifier (GUTI).

The security function can include an integrity protection and/or encryption function. When integrity protection is enabled, the UE 102 can generate a message authentication code for integrity (MAC-I) to protect integrity of the data. Thus, the UE 102 in this case generates a security-protected packet including the data and the MAC-I. When encryption is enabled, the UE 102 can encrypt the data to obtain an encrypted packet, so that the security-protected packet includes encrypted data. When both integrity protection and encryption are enabled, the UE 102 can generate a MAC-I for protecting integrity of the data and encrypt the data along with the MAC-I to generate an encrypted packet and an encrypted MAC-I. The UE 102 then can transmit the security-protected packet to the RAN 105, while in the RRC_INACTIVE or RRC_IDLE state.

In some implementations, the data is an uplink (UL) service data unit (SDU) of the packet data convergence protocol (PDCP) or SDAP. The UE 102 applies the security function to the SDU and includes the secured SDU in a first UL PDU (e.g., a UL PDCP PDU). The UE 102 then includes the UL PDCP PDU in a second UL PDU, such as a UL MAC PDU, which can be associated with the medium access control (MAC) layer. Thus, the UE 102 in these cases transmits the secured UL PDCP PDU in the UL MAC PDU. In some implementations, the UE 102 can include, in the UL MAC PDU, a UL RRC message. In other implementations, the UE 102 may omit a UL RRC message from the UL MAC PDU. In such implementations, the UE 102 may omit a UE ID of the UE 102 from the UL MAC PDU. In yet other implementations, the UE 102 can include the UL PDCP PDU in a UL radio link control (RLC) PDU and then include the UL RLC PDU in the UL MAC PDU. In the case of including the UL RRC message in the UL MAC PDU, the UE 102 in some implementations generates an RRC MAC-I and includes the RRC MAC-I in the UL RRC message. For example, the RRC MAC-I is a resumeMAC-I field, as specified in 3GPP specification 38.331. In other implementations, the UE can obtain the RRC MAC-I from the UL RRC message with an integrity key (e.g., $K_{RRCint}$ key), an integrity protection algorithm, and other parameters COUNT (e.g., 32-bit, 64-bit or 128-bit value), BEARER (e.g., 5-bit value), and DIRECTION (e.g., 1-bit value).

In other implementations, the data is an uplink (UL) protocol data unit (SDU) of the NAS. The UE 102 applies the security function to the SDU and includes the secured SDU in a first UL PDU such as a NAS PDU, which can be associated with the NAS layer. For example, the NAS layer can be an MM sublayer or an SM sublayer of 5G, Evolved Packet System (EPS), or 6G. Then the UE 102 can include the UL NAS PDU in a second UL PDU, such as a UL RRC message. Thus, the UE 102 in these cases transmits the (first) secured UL NAS PDU in the UL RRC message. In some implementations, the UE 102 can include the UL RRC message in a UL MAC PDU and transmits the UL MAC PDU to a base station (e.g., base station 104 or 106) via a cell (e.g., cell 124 or 126). In this case, the UE 102 may omit an RRC MAC-I from the UL RRC message. Alternatively, the UE 102 may include an RRC MAC-I as described above.

In some implementations, the UL RRC message described above can be a common control channel (CCCH) message, an RRC resume request message, or an RRC early data request message. The UL RRC message can include a UE ID of the UE 102 as described above.

More generally, the UE 102 can secure the data using at least one of encryption and integrity protection, include the secured data as a security-protected packet in the first UL PDU, and transmit the first UL PDU to the RAN 105 in the second UL PDU.

In some scenarios and implementations, the base station 106 can retrieve the UE ID of the UE 102 from the UL RRC message and identify the base station 104 as the destination of the data in the first UL PDU, based on the determined UE ID. In one example implementation, the base station 106 retrieves the first UL PDU from the second UL PDU and transmits the first UL PDU to the base station 104. The base station 104 then retrieves the security-protected packet from the first UL PDU, applies one or two security functions to decrypt the data and/or check the integrity protection, and transmits the data to the CN 110 (e.g., SGW 112, UPF 162, MME 114 or AMF 164) or an edge server. In some implementations, the edge server can operate within the RAN 105. More specifically, the base station 104 derives at least one security key from UE context information of the UE 102. Then the base station 104 retrieves the data from the security-protected packet by using the at least one security key and transmits the data to the CN 110 or edge server. When the security-protected packet is an encrypted packet, the base station 104 decrypts the encrypted packet to obtain the data by using the at least one security key (e.g., an (d)encryption key). If the security-protected packet is an integrity-protected packet, the integrity protected packet may include the data and the MAC-I. The base station 104 can verify whether the MAC-I is valid for the security-protected packet by using the at least one security key (e.g., an integrity key). When the base station 104 confirms that the MAC-I is valid, the base station 104 sends the data to the CN 110 or edge server. On the other hand, when the base station 104 determines that the MAC-I is invalid, the base station 104 discards the security-protected packet. Further, if the security-protected packet is both encrypted and integrity-protected, the encrypted and integrity-protected packet may include the encrypted packet along with the encrypted MAC-I. The base station 104 in this case decrypts the encrypted packet and the encrypted MAC-I to obtain the data and the MAC-I. The base station 104 then determines whether the MAC-I is valid for the data. If the base station 104 determines that the MAC-I is valid, the base station 104 retrieves the data and forwards the data to the CN 110 or edge server. However, if the base station 104 determines that the MAC-I is invalid, the base station 104 discards the packet.

In another implementation, the base station 106 retrieves the security-protected packet from the first UL PDU. The base station 106 performs a retrieve UE context procedure with the base station 104 to obtain UE context information of the UE 102 from the base station 104. The base station 106 derives at least one security key from the UE context information. Then the base station 106 retrieves the data from the security-protected packet by using the at least one security key and transmits the data to the CN 110 (e.g., UPF 162) or an edge server. When the security-protected packet is an encrypted packet, the base station 106 decrypts the encrypted packet to obtain the data by using the at least one security key (e.g., an (d)encryption key). If the security-protected packet is an integrity-protected packet, the integrity protected packet may include the data and the MAC-I. The base station 106 can verify whether the MAC-I is valid for the security-protected packet by using the at least one security key (e.g., an integrity key). When the base station 106 confirms that the MAC-I is valid, the base station 106 sends the data to the CN 110. On the other hand, when the base station 106 determines that the MAC-I is invalid, the base station 106 discards the security-protected packet. Further, if the security-protected packet is both encrypted and integrity-protected, the encrypted and integrity-protected packet may include the encrypted packet along with the encrypted MAC-I. The base station 106 in this case decrypts the encrypted packet and the encrypted MAC-I to obtain the data and the MAC-I. The base station 106 then determines whether the MAC-I is valid for the data. If the base station 106 determines that the MAC-I is valid, the base station 106 retrieves the data and forwards the data to the data CN 110. However, if the base station 106 determines that the MAC-I is invalid, the base station 106 discards the packet.

In other scenarios and implementations, the base station 104 can retrieve the UE ID of the UE 102 from the UL RRC message and identify that the base station 104 stores UE context information of the UE 102. Thus, the base station 104 retrieves the security-protected packet from the first UL PDU, retrieve the data from the security-protected packet and sends the data to the CN 110 or edge server as described above.

Further, the RAN 105 in some cases transmits data in the downlink (DL) direction to the UE 102 operating in the RRC_INACTIVE or RRC_IDLE state.

For example, when the base station 104 determines that data is available for downlink transmission to the UE 102 that is currently operating in the RRC_INACTIVE or RRC_IDLE state, the base station 104 can apply at least one security function to the data to generate a security-protected packet, generate a first DL PDU including the security-protected packet, and include the first DL PDU in a second DL PDU. To secure the data, the base station 104 can apply the security function (e.g., integrity protection and/or encryption) to the data. More particularly, when integrity protection is enabled, the base station 104 generates a MAC-I for protecting integrity of the data, so that the security-protected packet includes the data and the MAC-I. When encryption is enabled, the base station 104 encrypts the data to generate an encrypted packet, so that the security-protected packet is an encrypted packet. Further, when both integrity protection and encryption are enabled, the base station 104 can generate a MAC-I for protecting integrity of the data and encrypt the data along with the MAC-I to generate an encrypted packet and an encrypted MAC-I. The base station 104 in some implementations generates a first DL PDU, such as a DL PDCP PDU, including the security-protected packet, includes the first DL PDU in a second DL PDU associated with the MAC layer, for example (e.g., a DL MAC PDU), and transmits the second DL PDU to the UE 102 without first causing the UE 102 to transition from the RRC_INACTIVE or RRC_IDLE state to the RRC_CONNECTED state. In some implementations, the base station 104 includes the DL PDCP PDU in a DL RLC PDU, includes the DL RLC PDU in the DL MAC PDU and transmits the DL MAC PDU to the UE 102 without first causing the UE 102 to transition from the RRC_INACTIVE or RRC_IDLE state to the RRC_CONNECTED state.

In another implementation, the base station 104 transmits the first DL PDU to the base station 106, which then generates a second PDU (e.g., a DL MAC PDU) including the first DL PDU and transmits the second DL PDU to the UE 102 without first causing the UE 102 to transition from the RRC_INACTIVE or RRC_IDLE state to the RRC_CONNECTED state. In some implementations, the base station 106 generates a DL RLC PDU including the first DL PDU and includes the DL RLC PDU in the second DL PDU. In yet another implementation, the base station 104 includes the first DL PDU in a DL RLC PDU and transmits the DL RLC PDU to the base station 106, which then generates a second DL PDU (e.g., a DL MAC PDU) including the DL RLC PDU and transmits the second DL PDU to the UE 102.

In some implementations, the base station (i.e., the base station 104 or 106) generates a downlink control information (DCI) and a cyclic redundancy check (CRC) scrambled with an ID of the UE 102 to transmit the second DL PDU generated by the base station. In some implementations, the ID of the UE 102 can be a Radio Network Temporary Identifier (RNTI). For example, the RNTI can be a cell RNTI (C-RNTI), a temporary C-RNTI, or an inactive C-RNTI. The base station transmits the DCI and scrambled CRC on a physical downlink control channel (PDCCH) to the UE 102 operating in the RRC_INACTIVE or RRC_IDLE state. The base station scrambles the CRC with the ID of the UE 102. In some implementations, the base station may assign the ID of the UE 102 to the UE 102 in a random access response that the base station transmits in a random access procedure with the UE 102 before transmitting the DCI and scrambled CRC. In other implementations, the base station may assign the ID of the UE 102 to the UE 102 in an RRC message (e.g., an RRC release message or an RRC reconfiguration message) that the base station transmits to the UE 102 before transmitting the DCI and scrambled CRC, e.g., while the UE 102 was previously operating in the RRC_CONNECTED state, RRC_INACTIVE state, or RRC_IDLE state.

The UE 102 operating in the RRC_INACTIVE or RRC_IDLE state can receive the DCI and scrambled CRC on the PDCCH. Then the UE 102 confirms that a physical downlink shared channel (PDSCH), including the second DL PDU, is addressed to the UE 102 according to the ID of the UE 102, DCI, and scrambled CRC. The UE 102 then can retrieve the data from the security-protected packet. If the security-protected packet is an encrypted packet, the UE 102 can decrypt the encrypted packet using the appropriate decryption function and the security key to obtain the data. If the security-protected packet is the integrity-protected packet including the data and the MAC-I, the UE 102 can determine whether the MAC-I is valid. If the UE 102 confirms that the MAC-I is valid, the UE 102 retrieves the data. If, however, the UE 102 determines that the MAC-I is invalid, the UE 102 discards the packet. Finally, when the security-protected packet is both encrypted and integrity-protected, with encrypted data and an encrypted MAC-I, the UE 102 can decrypt the encrypted packet and encrypted MAC-I to obtain the data and the MAC-I. The UE 102 then can verify that the MAC-I is valid for the data. If the UE 102 confirms that the MAC-I is valid, the UE 102 retrieves and processes the data. Otherwise, when the UE 102 determines that the MAC-I is invalid, the UE 102 discards the data.

The base station 104 is equipped with processing hardware 130 that can include one or more general-purpose processors (e.g., CPUs) and a non-transitory computer-readable memory storing instructions that the one or more general-purpose processors execute. Additionally or alternatively, the processing hardware 130 can include special-purpose processing units. The processing hardware 130 in an example implementation includes a Medium Access Control (MAC) controller 132 configured to perform a random access procedure with one or more user devices, receive uplink MAC protocol data units (PDUs) from one or more user devices, and transmit downlink MAC PDUs to one or more user devices. The processing hardware 130 can also include a Packet Data Convergence Protocol (PDCP) controller 134 configured to transmit DL PDCP PDUs in accordance with which the base station 104 can transmit data in the downlink direction, in some scenarios, and receive UL PDCP PDUs in accordance with which the base station 104 can receive data in the uplink direction, in other scenarios. The processing hardware further can include an RRC controller 136 to implement procedures and messaging at the RRC sublayer of the protocol communication stack. The processing hardware 130 in an example implementation includes an RRC inactive controller 138 configured to manage uplink and/or downlink communications with one or more UEs operating in the RRC_INACTIVE or RRC_IDLE state. The base station 106 can include generally similar components. In particular, components 140, 142, 144, 146, and 148 can be similar to the components 130, 132, 134, 136, and 138, respectively.

The UE 102 is equipped with processing hardware 150 that can include one or more general-purpose processors such as CPUs and non-transitory computer-readable memory storing machine-readable instructions executable on the one or more general-purpose processors, and/or special-purpose processing units. The processing hardware 150 in an example implementation includes an RRC inactive controller 158 configured to manage uplink and/or downlink communications when the UE 102 operates in the RRC_INACTIVE state. The processing hardware 150 in an example implementation includes a Medium Access Control (MAC) controller 152 configured to perform a random access procedure with a base station, transmit uplink MAC protocol data units (PDUs) to the base station, and receive downlink MAC PDUs from the base station. The processing hardware 150 can also include a PDCP controller 154 configured to transmit DL PDCP PDUs in accordance with which the base station 106 can transmit data in the downlink direction, in some scenarios, and receive UL PDCP PDUs in accordance with which the base station 106 can receive data in the uplink direction, in other scenarios. The processing hardware further can include an RRC controller 156 to implement procedures and messaging at the RRC sublayer of the protocol communication stack.

Figure 1B:
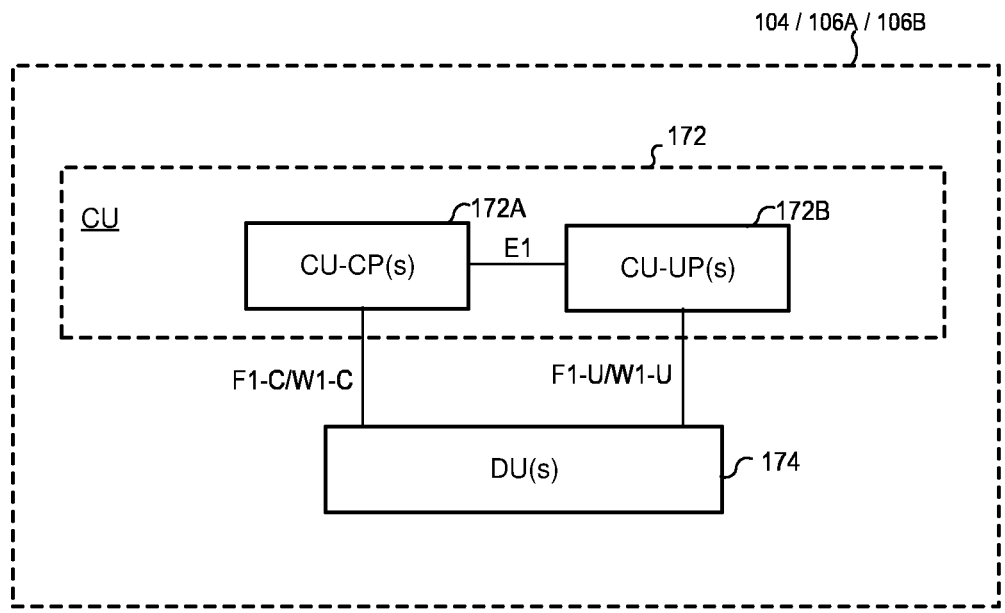
FIG. 1B is a block diagram of an example base station in which a centralized unit (CU) and a distributed unit (DU) can operate in the system of FIG. 1A.

FIG. 1B depicts an example, distributed or disaggregated implementation of any one or more of the base stations 104, 106. In this implementation, the base station 104, 106 includes a central unit (CU) 172 and one or more DUs 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 can include a PDCP controller, an RRC controller and/or an RRC inactive controller such as PDCP controller 134, 144, RRC controller 136, 146 and/or RRC inactive controller 138, 148. In some implementations, the CU 172 can include a radio link control (RLC) controller configured to manage or control one or more RLC operations or procedures. In other implementations, the CU 172 does not include an RLC controller.

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware can include a MAC controller (e.g., MAC controller 132, 142) configured to manage or control one or more MAC operations or procedures (e.g., a random access procedure), and/or a RLC controller configured to manage or control one or more RLC operations or procedures. The process hardware can also include a physical layer controller configured to manage or control one or more physical layer operations or procedures.

In some implementations, the CU 172 can include a logical node CU-CP 172A that hosts the control plane part of the PDCP protocol of the CU 172. The CU 172 can also include logical node(s) CU-UP 172B that hosts the user plane part of the PDCP protocol and/or Service Data Adaptation Protocol (SDAP) protocol of the CU 172. The CU-CP 172A can transmit control information (e.g., RRC messages, F1 application protocol messages), and the CU-UP 172B can transmit the data packets (e.g., SDAP PDUs or Internet Protocol packets).

The CU-CP 172A can be connected to multiple CU-UP 172B through the E1 interface. The CU-CP 172A selects the appropriate CU-UP 172B for the requested services for the UE 102. In some implementations, a single CU-UP 172B can be connected to multiple CU-CP 172A through the E1 interface. The CU-CP 172A can be connected to one or more DU 174s through an F1-C or W1-C interface. The CU-UP 172B can be connected to one or more DU 174 through an F1-U or W1-U interface under the control of the same CU-CP 172A. In some implementations, one DU 174 can be connected to multiple CU-UP 172B under the control of the same CU-CP 172A. In such implementations, the connectivity between a CU-UP 172B and a DU 174 is established by the CU-CP 172A using Bearer Context Management functions.

Figure 2A:
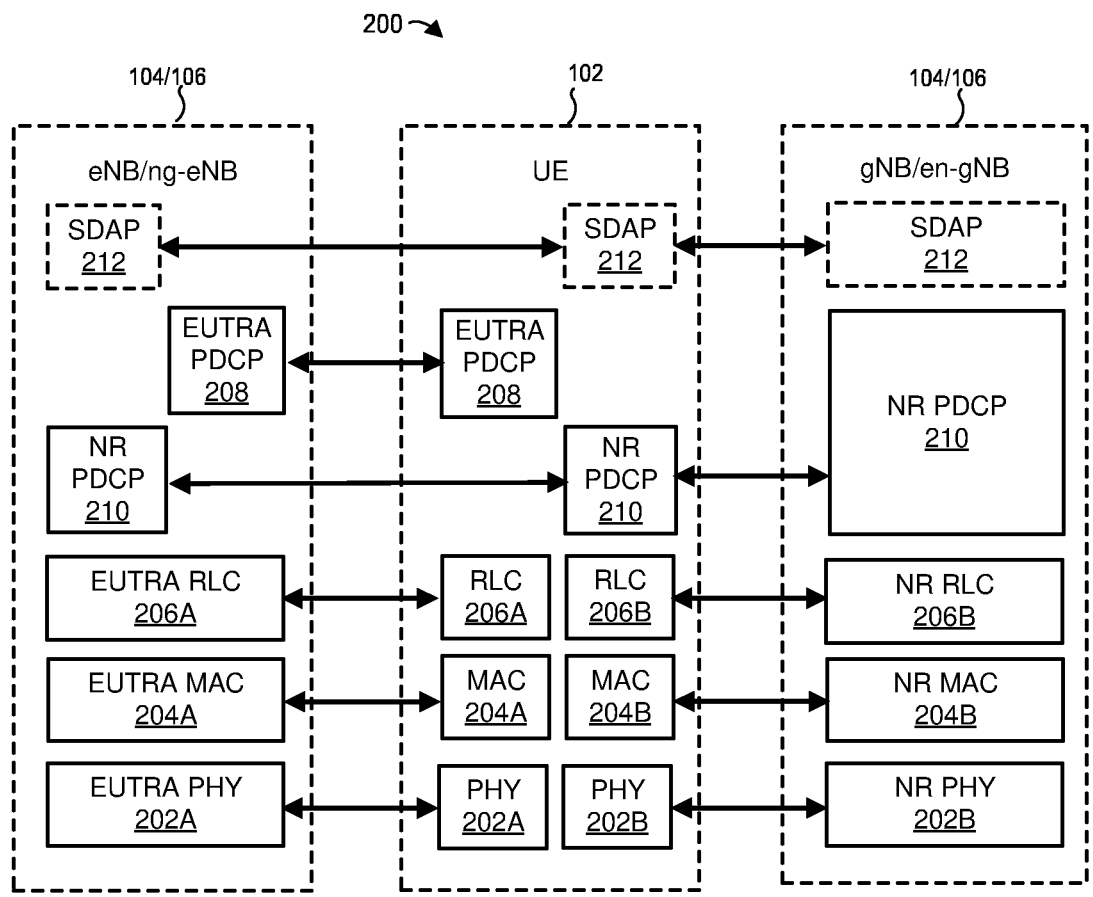
FIG. 2A is a block diagram of an example protocol stack according to which the UE of FIG. 1A communicates with base stations.

FIG. 2A illustrates, in a simplified manner, an example protocol stack 200 according to which the UE 102 can communicate with an eNB/ng-eNB or a gNB (e.g., one or more of the base stations 104, 106).

In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to an EUTRA PDCP sublayer 208 and, in some cases, to an NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides data transfer services to the NR PDCP sublayer 210. The NR PDCP sublayer 210 in turn can provide data transfer services to Service Data Adaptation Protocol (SDAP) 212 or a radio resource control (RRC) sublayer (not shown in FIG. 2A). The UE 102, in some implementations, supports both the EUTRA and the NR stack as shown in FIG. 2A, to support handover between EUTRA and NR base stations and/or to support DC over EUTRA and NR interfaces. Further, as illustrated in FIG. 2A, the UE 102 can support layering of NR PDCP 210 over EUTRA RLC 206A, and SDAP sublayer 212 over the NR PDCP sublayer 210.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide signaling radio bearers (SRBs) or RRC sublayer (not shown in FIG. 2A) to exchange RRC messages or non-access-stratum (NAS) messages, for example. On a user plane, the EUTRA PDCP sublayer 208 and the NR PDCP sublayer 210 can provide DRBs to support data exchange. Data exchanged on the NR PDCP sublayer 210 can be SDAP PDUs, Internet Protocol (IP) packets or Ethernet packets.

Figure 2B:
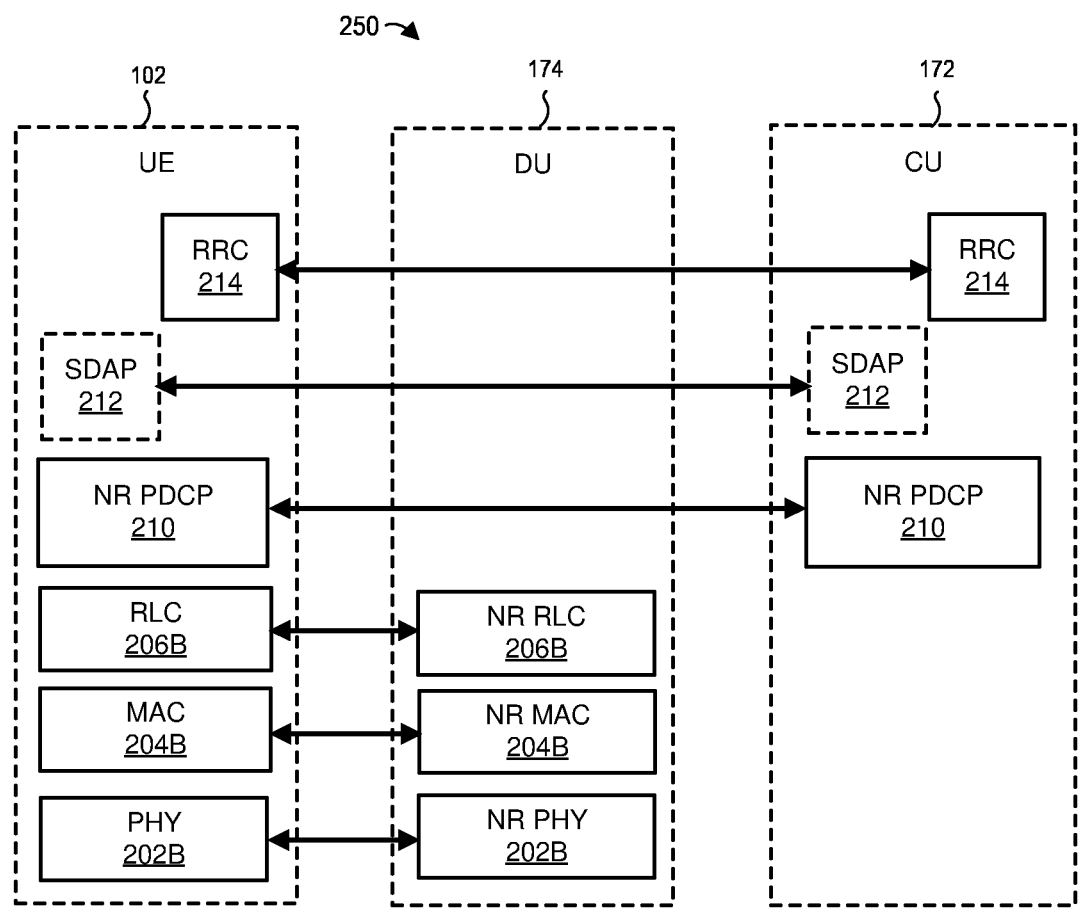
FIG. 2B is a block diagram of an example protocol stack according to which the UE of FIG. 1A can communicate with a DU and a CU.

FIG. 2B illustrates, in a simplified manner, an example protocol stack 250 which the UE 102 can communicate with a DU (e.g., DU 174) and a CU (e.g., CU 172). The radio protocol stack 200 is functionally split as shown by the radio protocol stack 250 in FIG. 2B. The CU at any of the base stations 104 or 106 can hold all the control and upper layer functionalities (e.g., RRC 214, SDAP 212, NR PDCP 210), while the lower layer operations (e.g., NR RLC 206B, NR MAC 204B, and NR PHY 202B) are delegated to the DU. To support connection to a 5GC, NR PDCP 210 provides SRBs to RRC 214, and NR PDCP 210 provides DRBs to SDAP 212 and SRBs to RRC 214.

Next, several example scenarios that involve several components of FIG. 1A and relate to transmitting and/or receiving data in an inactive or idle state are discussed with reference to FIGS. 3A-3E. Generally speaking, events in FIGS. 3A-3E that are the same are labeled with the same reference numbers. To simplify the following description, the "inactive state" can represent the RRC_INACTIVE or RRC_IDLE state, and the connected state can represent the RRC_CONNECTED state.

Figure 3A:
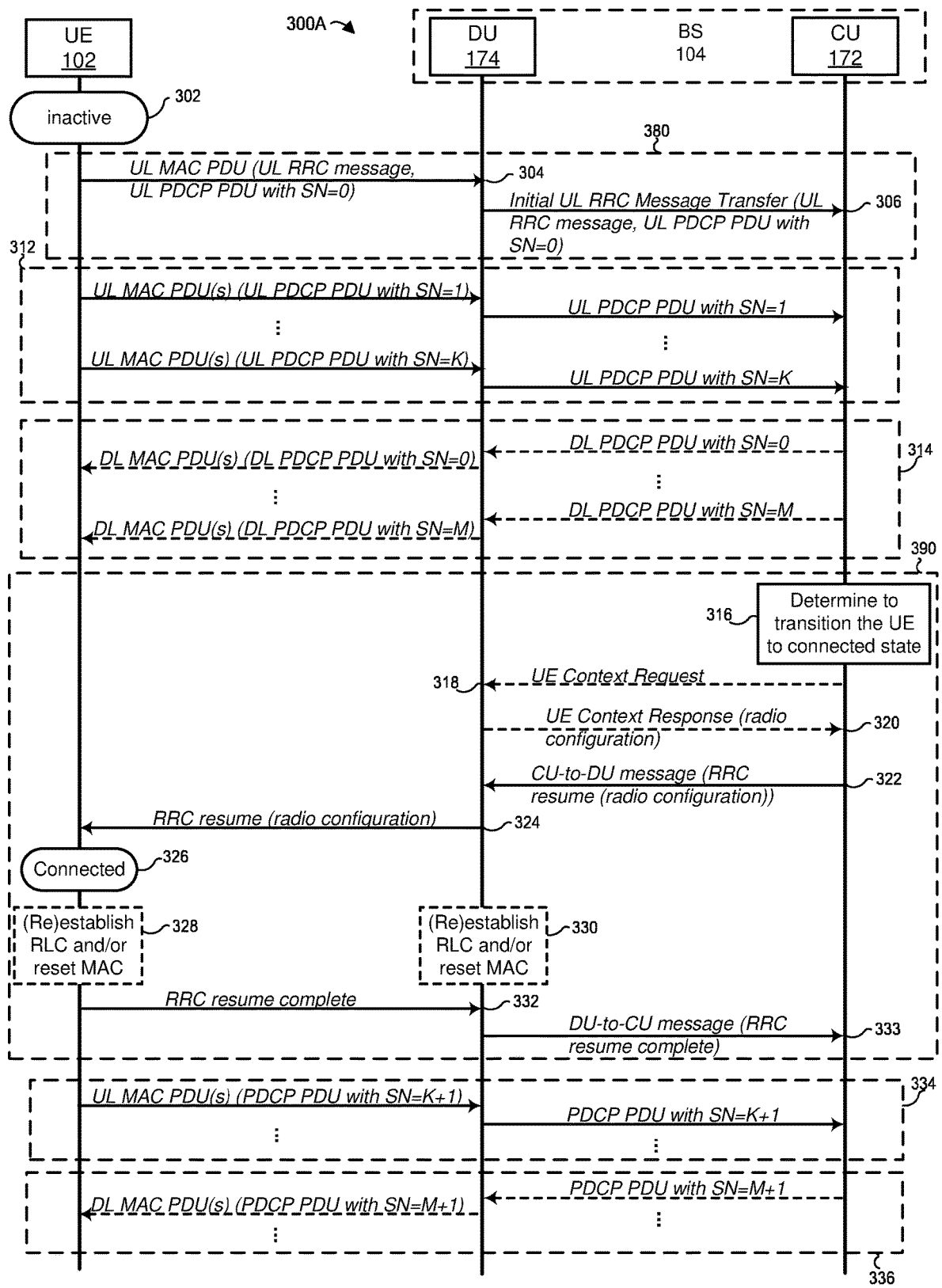
FIG. 3A is a messaging diagram of an example procedure for managing communications from a UE during a state transition from an inactive state to a connected state with the base station.

Referring first to FIG. 3A, in a scenario 300A, the UE 102 initially operates 302 in an inactive state (e.g., RRC_INACTIVE or RRC_IDLE) and the base station 104 includes a CU 172 and a DU 174. In some scenarios and implementations, the UE 102 previously operated in a connected state with the RAN 105 (e.g., with the base station 104, base station 106, or another base station not shown in FIG. 1A), before transitioning to the inactive state. After a (first) certain period of data inactivity for the UE 102, the RAN 105 can determine that neither the RAN 105 nor the UE 102 has transmitted any data in the downlink direction or the uplink direction, respectively, during the (first) certain period. In response to the determination, the RAN 105 can transmit a first RRC release message (e.g., RRCRelease message or RRCConnectionRelease message) to the UE 102 and instruct the UE 102 to transition to the inactive state. The UE 102 transitions to the inactive state upon receiving the first RRC release message and operates 302 in the inactive state. The RAN 105 can assign UE identity/identifier (ID) (e.g., an I-RNTI or a resume ID) to the UE 102 and include the assigned value in the first RRC release message. After the UE 102 transitions to the inactive state, the UE 102 may perform one or more RAN notification area (RNA) updates with the CU 172 via the DU 174 without state transitions, in some cases. For example, the UE 102 in the inactive state can send a RRC resume request message (e.g., a RRCResumeRequest message or RRCConnectionResumeRequest message) to the RAN 105 for an RNA update and the RAN 105 can transmit a first RRC release message (e.g., RRCRelease message or RRCConnectionRelease message) to the UE 102 and instruct the UE 102 to still stay in the inactive state. In some implementations, the CU 172 can include a security parameter (e.g., Next Hop Chaining Count) in the first RRC release message. The UE 102 derives security keys (i.e., base key, integrity key(s) and/or encryption key (s)) using the security parameter. For example, the UE 102 derives a base key (e.g., $K_{gNB}$) using the security parameter and derives integrity key(s) (e.g., $K_{RRCint}$ key and/or the $K_{UPint}$ key) and encryption key(s) (e.g., $K_{RRCenc}$ key and/or $K_{UPenc}$ key) from the base key. The CU 172 derives security keys (i.e., same as the security keys derived by the UE 102) in a similar manner as the UE 102. The UE 102 can include the UE ID in the UL RRC message that the UE 102 transmits 302. The UE 102 and CU 172 use the integrity key (e.g., the $K_{UPint}$ key) and/or encryption key (e.g., the $K_{UPenc}$ key) in data communication in events 304, 312, 314, 334, and 336. The UE 102 and CU 172 use the integrity key (e.g., the $K_{RRCint}$ key) and/or encryption key (e.g., the $K_{RRCenc}$ key) in communication of RRC resume message and RRC resume complete message in events 324 and 332 respectively.

At a later time, the UE 102 in the inactive state initiates 380 initial UL early data communication to transmit uplink (UL) data. In response to or after initiating early data communication, the UE 102 generates an initial UL MAC PDU including a UL RRC message and an UL PDCP PDU with sequence number (SN)=0 and transmits 304 the initial UL MAC PDU to the DU 174 on cell 124. The DU 174 retrieves the UL RRC message and the UL PDCP PDU with SN=0 from the initial UL MAC PDU and generates an Initial UL RRC Message Transfer message including the UL RRC message. Then, the DU 174 sends 306 the Initial UL RRC Message Transfer message to the CU 172. After receiving the Initial UL RRC Message Transfer message, the CU 172 in some implementations can send a UE Context Setup Request message (not shown in FIG. 3A) to the DU 174 to establish a UE Context of the UE 102 at the DU 174. In response, the DU 174 sends a UE Context Setup Response message (not shown in FIG. 3A) to the CU 172. In some implementations, the DU 174 can include the UL PDCP PDU with SN=0 in the Initial UL RRC Message Transfer message. In other implementations, the DU 174 can send the UL PDCP PDU with SN=0 via a user plane interface (e.g., F1-U interface or W1-U interface) to the CU 172 instead of including the UL PDCP PDU with SN=0 in the Initial UL RRC Message Transfer message. In this case, the DU 174 can send the UL PDCP PDU with SN=0 to the CU 172 via the user plane interface after receiving the UE Context Setup Request message or transmitting the UE Context Setup Response message.

After receiving the Initial UL RRC Message Transfer message or the UE Context Setup Response message, the CU 172 refrains from transitioning the UE 102 to a connected state and performs 312, 314 early data communication with the CU 172 via the DU 174 to communicate UL data and/or DL data. More specifically, after transmitting the initial UL MAC PDU, the UE 102 can transmit 312 to the DU 174 one or more UL PDCP PDUs with SN=1, . . . , K, respectively, where K is an integer and larger than 0. The UE 102 can send 312 UL MAC PDU(s) including the one or more UL PDCP PDUs to the DU 174. The DU 174 forwards the one or more UL PDCP PDUs to the CU 172 via a control plane interface (e.g., F1-C or W1-U) or a user plane interface (F1-U or W1-U). The UE 102 can include an application data packet, RRC message or a NAS PDU in a particular UL PDCP PDU. In some implementations, a UL MAC PDU in the one or more UL MAC PDUs can include a particular UL PDCP PDU or include a segment of a particular UL PDCP PDU. In other implementations, the UE 102 can send 312 to the UE 102 a UL MAC PDU including at least two UL PDCP PDUs of the K UL PDCP PDUs. In some implementations, the UE 102 can include a particular UL PDCP PDU in a UL RLC PDU and includes the UL RLC PDU in a UL MAC PDU in the one or more UL MAC PDUs. In other implementations, the UE 102 can include a segment of a particular UL PDCP PDU in a UL RLC PDU segment, includes other segment(s) of the UL PDCP PDU in other UL RLC PDU segment(s), and include the other UL RLC PDU segment(s) in UL MAC PDU(s) in the one or more UL MAC PDUs. In yet other implementations, the UE 102 can send 312 to the UE 102 a UL MAC PDU including at least two UL RLC PDUs each including a particular UL PDCP PDU of the K UL PDCP PDUs. When the DU 174 receives all segments of a UL PDCP PDU from the UE 102, the DU 174 assembles the segments to obtain the UL PDCP PDU, and send the UL PDCP PDU to the CU 172.

After receiving the Initial UL RRC Message Transfer message, transmitting the UE Context Setup Request message or receiving the UE Context Setup Response message, the CU 172 can transmit 314 to the DU 174 one or more DL PDCP PDUs with SN=0, . . . , M, respectively, where M is an integer and larger than or equal to 0. The DU 174 can send 314 DL MAC PDU(s) including the one or more DL PDCP PDUs to the UE 102. The CU 172 can receive one or more DL data packets from the CN 110 or the edge server and include a particular DL data packet in a particular DL PDCP PDU. In some implementations, a DL MAC PDU in the one or more DL MAC PDUs can include a particular DL PDCP PDU or include a segment of a particular DL PDCP PDU. In other implementations, the DU 174 can send 314 to the UE 102 a DL MAC PDU including at least two DL PDCP PDUs of the M+1 PDCP PDUs. In some implementations, the DU 174 can include a particular DL PDCP PDU in a DL RLC PDU and includes the DL RLC PDU in a DL MAC PDU in the one or more DL MAC PDUs. In other implementations, the DU 174 can include a segment of a particular DL PDCP PDU in a DL RLC PDU segment, includes other segment(s) of the DL PDCP PDU in other DL RLC PDU segment(s), and include the other DL RLC PDU segment(s) in DL MAC PDU(s) in the one or more DL MAC PDUs. In yet other implementations, the DU 174 can send 314 to the UE 102 a DL MAC PDU including at least two DL RLC PDUs each including a particular DL PDCP PDU of the M+1 DL PDCP PDUs. When the UE 102 receives all segments of a DL PDCP PDU from the DU 174, the UE 102 assembles the segments to obtain the DL PDCP PDU.

Although not shown in FIG. 3A, the (subsequent) UL early data communication 312 and the DL early data communication 314 can be overlapped or not overlapped in time and/or frequency.

After or while performing 312, 314 early data communication with the UE 102 via the DU 174, the CU 172 determines 316 to transition the UE 102 to the connected state. As mentioned previously, this determination may occur when the RAN needs to communicate a data packet associated with a particular quality of service (QoS) requirement not available through the early data transmission procedure, or because link quality between the UE and RAN degrades below a threshold. In response to the determination, the CU 172 can send 318 a UE Context Request message to the DU 174 to obtain a radio configuration for the UE 102. In response, the DU 174 sends 320 a UE Context Response including a radio configuration for the UE 102. In some implementations, the UE Context Request message and UE Context Response message can be a UE Context Setup Request message and a UE Context Setup Response message respectively. In other implementations, the UE Context Request message and UE Context Response message can be a UE Context Modification Request message and a UE Context Modification Response message respectively. After obtaining the radio configuration, the CU 172 generates a RRC resume message including the radio configuration and sends 322 to the DU 174 a CU-to-DU message including the RRC resume message. In turn, the DU 174 retrieves the RRC resume message from the CU-to-DU message and sends 324 the RRC resume message to the UE 102.

In some implementations, the radio configuration can include multiple configuration parameters that configure radio resources for the UE 102 to communicate with the DU 174 via a PCell (e.g., the cell 124 or another cell) and zero, one, or more SCells of the DU 174. For example, the radio configuration can include PHY configuration(s), MAC configuration(s), and/or RLC configuration(s). In other implementations, the radio configuration can be a CellGroupConfig information element (IE) defined in 3GPP specification 38.331. In yet other implementations, the radio configuration includes configuration parameters in an RRCReconfiguration message, RRCReconfiguration-IEs, or a CellGroupConfig IE conforming to 3GPP TS 38.331. In yet other implementations, the radio configuration includes configuration parameters in an RRCConnectionReconfiguration message or RadioResourceConfigDedicated IE conforming to 3GPP TS 36.331.

In some implementations, the CU 172 can apply one or more security functions to the RRC resume message (i.e., the RRC PDU including the RRC resume message), generate a DL PDCP PDU including the security protected RRC resume message and sends 322 the CU-to-DU message including the DL PDCP PDU to the DU 174. In turn, the DU 174 sends 324 at least one DL MAC PDU including the DL PDCP PDU to the UE 102. In one implementation, the DU 174 can generate a DL MAC PDU including the DL PDCP PDU and transmit the DL MAC PDU to the UE 102. More specifically, the DU 174 can generate a DL RLC PDU including the DL PDCP PDU, include the DL RLC PDU in a DL MAC PDU and transmit 324 the DL MAC PDU to the UE 102. In another implementation, the DU 174 can segment the DL PDCP PDU into multiple segments and generate plural DL MAC PDUs where each includes a particular segment. When the UE 102 receives all of the segments, the UE 102 assembles the segments to obtain the DL PDCP PDU. More specifically, the DU 174 can generate a DL RLC PDU segment including a particular segment of the DL PDCP PDU, include the DL RLC PDU segment into a DL MAC PDU and transmit 324 the DL MAC PDU to the UE 102. When the UE 102 receives all of the DL RLC PDU segments, the UE 102 assembles the segments to obtain the DL PDCP PDU.

In response to the RRC resume message, the UE 102 transitions 326 to the connected state and transmits 332 a RRC resume complete message to the DU 174, which in turn sends 333 a DU-to-CU message including the RRC resume complete message to the CU 172. Events 316, 318, 320, 322, 324, 326, 328, 330, 332, 333 are collectively called a non-EDT configuration procedure 390.

After the UE 102 transitions to the connected state, the UE 102 performs 334 UL data communication and/or 336 DL data communication with the CU 172 via the DU 174. More specifically, the UE 102 can transmit 334 to the DU 174 one or more UL PDCP PDUs, where SN starts from K+1. Similarly, the CU 172 can transmit 336 to the UE 102 via the DU 174 one or more DL PDCP PDUs, where SN starts from M+1. In some implementations, the UL PDCP PDUs at events 312 and 334 can associate to a first radio bearer (e.g., a DRB) and/or a first quality of service (QoS) flow. In other implementations, the DL PDCP PDUs at events 314 and 336 can associate to a second radio bearer (e.g., a DRB) and/or a second quality of service (QoS) flow. The first and second radio bearers can be the same or different.

In some implementations, the UE 102 can (re)establish 328 RLC and/or reset MAC in response to the RRC resume message. In some implementations, the UE 102 uses a UE RLC entity to transmit 312 the UL PDCP PDU(s) or the UL RLC PDU(s) including the UL PDCP PDU(s) and uses a UE MAC entity to transmit 312 the UL MAC PDU(s), as described above. The UE 102 uses the UE RLC entity to receive 314 the DL PDCP PDU(s) or the DL RLC PDU(s) including the DL PDCP PDU(s) as described above, uses the UE MAC entity to receive 314 the DL MAC PDU(s), as described above. In some implementations, the UE 102 can reestablish 328 the UE RLC entity, and/or reset the UE MAC entity in response to the RRC resume message. Then, the UE 102 performs 334, 336 data communication with the DU 174 with the reestablished UE RLC entity and/or the reset MAC entity. Alternatively, the UE 102 can release the UE RLC entity and/or the UE MAC entity and establish a new UE RLC entity and/or a new UE MAC entity, in response to the RRC resume message. Then, the UE 102 performs 334, 336 data communication with the DU 174 with the new UE RLC entity and/or the new UE MAC entity.

Similarly, the DU 174 can (re)establish 328 RLC and/or reset MAC in response to the UE Context Request message that the DU 174 receives 318 or in response to the CU-to-DU message that the DU 174 receives 322. In some implementations, the DU 174 uses a DU RLC entity to transmit 314 the DL PDCP PDU(s) or the DL RLC PDU(s) including the DL PDCP PDU(s), uses the DU MAC entity to transmit 314 the DL MAC PDU(s), as described above. The DU 174 uses the DU RLC entity to receive 312 the UL PDCP PDU(s) or the UL RLC PDU(s) including the UL PDCP PDU(s), uses the DU MAC entity to receive 312 the UL MAC PDU(s), as described above. The DU 174 can reestablish 330 the DU RLC entity, and/or reset the DU MAC entity in response to the UE Context Request message that the DU 174 receives 318 or in response to the CU-to-DU message that the DU 174 receives 322. Then, the DU 174 performs 334, 336 data communication with the UE 102 with the reestablished RLC entity and/or the reset MAC entity. Alternatively, the DU 174 can release the DU RLC entity and/or the DU MAC entity and establish a new UE RLC entity and/or a new UE MAC entity, in response to the UE Context Request message that the DU 174 receives 318 or in response to the CU-to-DU message that the DU 174 receives 322. Then, the DU 174 performs 334, 336 data communication with the UE 102 with the new DU RLC entity and/or the new DU MAC entity.

In other implementations, the UE 102 can refrain from (re)establishing and/or releasing RLC (e.g., the (new) UE RLC entity) and/or resetting and/or releasing (e.g., the (new) UE MAC entity) in response to the RRC resume message. Similarly, the DU 174 can refrain from (re)establishing and/or releasing RLC (e.g., the (new) DU RLC entity) and/or resetting and/or releasing MAC (e.g., the (new) DU MAC entity) in response to the UE Context Request message that the DU 174 receives 318 or in response to the CU-to-DU message that the DU 174 receives 322.

In some implementations, the CU 172 can apply one or more security functions (e.g., encryption and/or integrity protection) to the RRC resume message (i.e., the RRC PDU including the RRC resume complete message) by using the integrity key (e.g., the $K_{RRCint}$ key) and/or the encryption key (e.g., the $K_{RRCenc}$ key). Then, the CU 172 generates a DL PDCP PDU including the security protected RRC resume message and sends 322 the DL PDCP PDU to the DU 174, which in turn sends 324 the DL PDCP PDU to the UE 102. In one implementation, the DU 174 can generate a DL MAC PDU including the DL PDCP PDU and transmit the DL MAC PDU to the UE 102. The UE 102 retrieves the DL PDCP PDU from the DL MAC PDU. More specifically, the DU 174 can generate a DL RLC PDU including the DL PDCP PDU, include the DL RLC PDU in a DL MAC PDU and transmit 324 the DL MAC PDU to the UE 102. The UE 102 retrieves the DL PDCP PDU from the DL MAC PDU and the DL RLC PDU. In another implementation, the DU 174 can segment the DL PDCP PDU into multiple segments and generate plural DL MAC PDUs including a particular segment. When the UE 102 receives all of the segments, the UE 102 assembles the segments to obtain the DL PDCP PDU. More specifically, the DU 174 can generate DL RLC PDU segments each including a particular segment of the DL PDCP PDU, include a particular DL RLC PDU segment into a particular DL MAC PDU and transmit 324 the particular DL MAC PDU to the UE 102. When the UE 102 receives all of the DL RLC PDU segments from the DL MAC PDUs, the UE 102 assembles the segments to obtain the DL PDCP PDU. When the UE 102 receives 324 the DL PDCP PDU, the UE 102 applies one or more security functions (e.g., decryption and/or integrity check) to the DL PDCP PDU to obtain the (non-security-protected) RRC resume message, by using the integrity key (e.g., the $K_{RRCint}$ key) and/or the encryption key (e.g., the $K_{RRCenc}$ key) (i.e., the same as the integrity and/or the encryption keys that the CU 172 applies to the RRC resume message).

In some implementations, the UE 102 can apply one or more security functions (e.g., encryption and/or integrity protection) to the RRC resume complete message (i.e., the RRC PDU including the RRC resume complete message) by using the integrity key (e.g., the $K_{RRCint}$ key) and/or the encryption key (e.g., the $K_{RRCenc}$ key). Then, the UE 102 generates a UL PDCP PDU including the security protected RRC resume complete message and sends 332 the UL PDCP PDU to the DU 174, which in turn sends 333 the DU-to-CU message including the UL PDCP PDU to the CU 172. In one implementation, the UE 102 can generate a UL MAC PDU including the UL PDCP PDU and transmit the UL MAC PDU to the UE 102. The DU 174 retrieves the UL PDCP PDU from the UL MAC PDU. More specifically, the UE 102 can generate a UL RLC PDU including the UL PDCP PDU, include the UL RLC PDU in a UL MAC PDU and transmit 332 the UL MAC PDU to the DU 174. The DU 174 retrieves the UL PDCP PDU from the UL MAC PDU and the UL RLC PDU. Then the DU 174 sends the UL PDCP PDU to the CU 172 as described above. In another implementation, the UE 102 can segment the UL PDCP PDU into multiple segments and generate plural MAC PDUs including a particular segment. When the DU 174 receives all of the segments, the DU 174 assembles the segments to obtain the UL PDCP PDU. More specifically, the UE 102 can generate UL RLC PDU segments each including a particular segment of the UL PDCP PDU, include a particular UL RLC PDU segment into a particular UL MAC PDU and transmit 332 the particular UL MAC PDU to the DU 174. When the DU 174 receives all of the UL RLC PDU segments from the UL MAC PDUs, the DU 174 assembles the segments to obtain the UL PDCP PDU. When the CU 172 receives 333 the UL PDCP PDU, the CU 172 applies one or more security functions (e.g., decryption and/or integrity check) to the UL PDCP PDU to obtain the (non-security-protected) RRC resume complete message, by using the integrity key (e.g., the $K_{RRCint}$ key) and/or the encryption key (e.g., the $K_{RRCenc}$ key) (i.e., the same as the integrity and/or the encryption keys that the UE 102 applies to the RRC resume complete message).

In some implementations, the UE 102 can apply one or more security functions (e.g., encryption and/or integrity protection) to UL data packet(s) in the UL PDCP PDU(s) 304, 312, 334 by using the integrity key (e.g., the $K_{UPint}$ key) and/or the encryption key (e.g., the $K_{UPenc}$ key). For each of the UL data packet(s), the UE 102 generates a UL PDCP PDU including a particular security protected UL data packet and transmits the security-protected UL PDCP PDU(s) to the CU 172 via the DU 174 at event 304, 306, 312 and 334 respectively. In such implementations, the CU 172 applies one or security function (e.g., decryption and/or integrity check) to the security-protected UL data packet(s) received in the UL PDCP PDU(s) at events 306, 312 or 334 to obtain (non-security-protected) UL data packet(s) by using the integrity key (e.g., the $K_{UPint}$ key) and/or the encryption key (e.g., the $K_{UPenc}$ key) (i.e., the same as the integrity key (e.g., the $K_{UPint}$ key) and/or the encryption key (e.g., the $K_{UPenc}$ key) that the UE 102 uses).

In other implementations, the CU 172 can apply one or more security functions (e.g., encryption and/or integrity protection) to DL data packet(s) in the DL PDCP PDU(s) 314, 336 by using the integrity key (e.g., the $K_{UPint}$ key) and/or the encryption key (e.g., the $K_{UPenc}$ key). For each of the DL data packet(s), the CU 172 generates a DL PDCP PDU including a particular security protected DL data packet and transmits the security-protected DL PDCP PDU(s) to the UE 102 via the DU 174 at event 314 and 336 respectively. In such implementations, the UE 102 applies one or security function (e.g., decryption and/or integrity check) to the security-protected DL data packet(s) received in the DL PDCP PDU(s) at events 314 or 336 to obtain (non-security-protected) DL data packet(s) by using the integrity key (e.g., the $K_{UPint}$ key) and/or the encryption key (e.g., the $K_{UPenc}$ key) (i.e., the same as the integrity key (e.g., the $K_{UPint}$ key) and/or the encryption key (e.g., the $K_{UPenc}$ key) that the CU 172 uses).

In this manner, the UE 102 and BS 104 may, despite transitioning from an inactive state to a connected state, proceed with UL and/or DL data packet transfer starting with continuing sequence numbering K+1 for UL PDCP PDUs and continuing sequence numbering M+1 for DL PDCP PDUs.

Figure 3B:
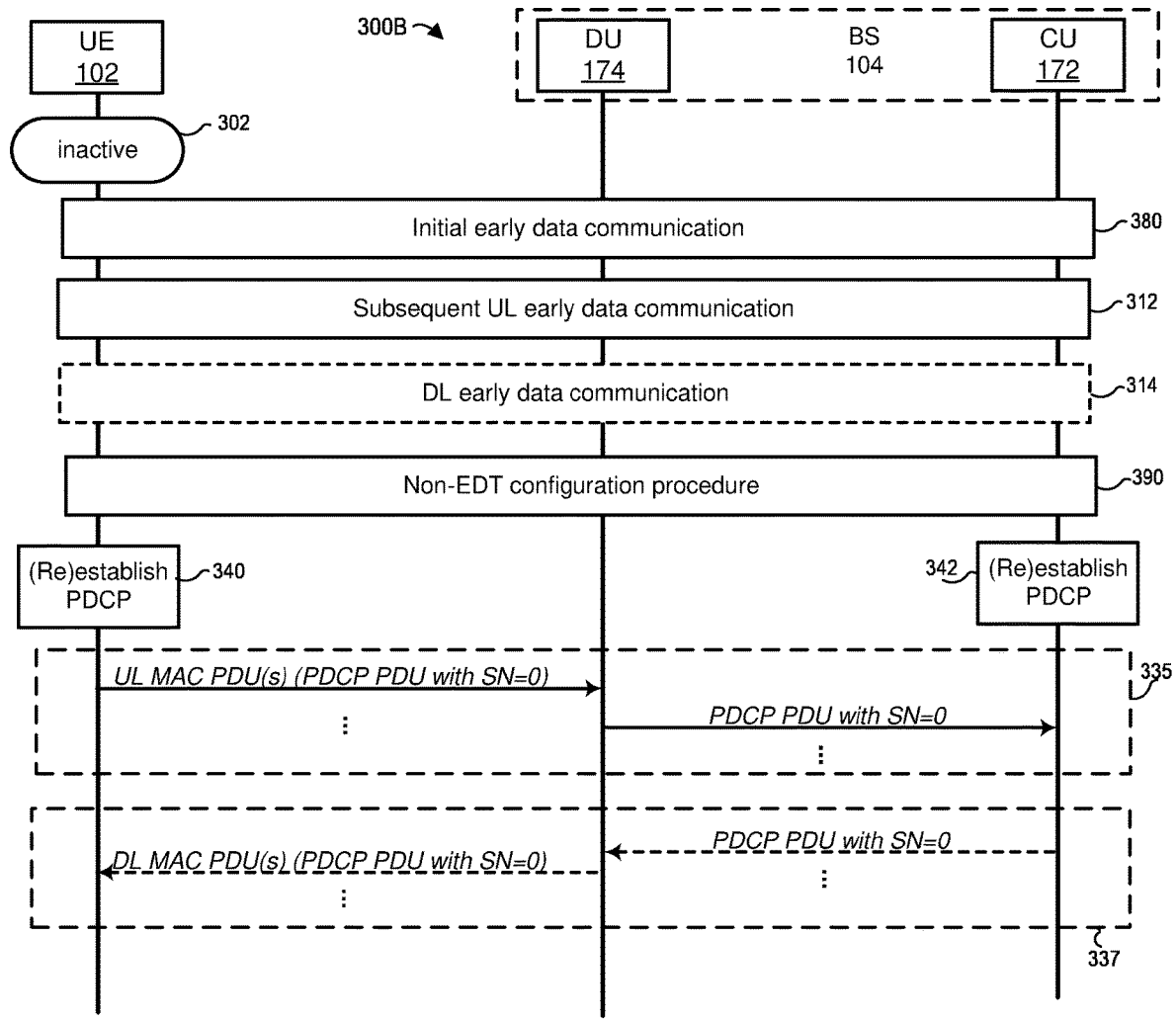
FIG. 3B is a messaging diagram of another example procedure for managing communications from a UE during a state transition from an inactive state to a connected state with the base station, where the UE or the CU reestablishes a packet data convergence protocol (PDCP) entity.

Referring next to FIG. 3B, a scenario 300B is depicted which is generally similar to the scenario 300A. Events in this scenario similar to those discussed above are labeled with the same reference numbers and the examples and implementations for FIG. 3A can apply to FIG. 3B. In this scenario 300B, the UE 102 and CU 172 reestablish respective PDCP entities after transitioning to a connected state and restart sequence numbering for continuing UL and/or DL PDCP PDUs. The differences between the scenarios of FIG. 3A and FIG. 3B are discussed further below.

In the scenario 300B, the UE 102 transitions to the connected state as part of a non-EDT configuration procedure 390, and the UE 102 and the CU 172 (re)establish 340, 342 respective PDCP entities. When both PDCP entities are (re)established, the UE 172 performs 335 UL data communication and/or 337 DL data communication with the CU 172 via the DU 174. More specifically, the UE 102 can transmit 335 to the DU 174 one or more UL PDCP PDUs, where SN restarts from 0. Similarly, the CU 172 can transmit 337 to the UE 102 via the DU 174 one or more DL PDCP PDUs, where SN restarts from 0. In some implementations, the UL PDCP PDUs at events 312 and 335 can associate to a first radio bearer (e.g., a DRB) and/or a first quality of service (QoS) flow. In other implementations, the DL PDCP PDUs at events 314 and 337 can associate to a second radio bearer (e.g., a DRB) and/or a second quality of service (QoS) flow. The first and second radio bearers can be the same or different.

In some implementations, the UE 102 can (re)establish 340 PDCP in response to the RRC resume message. In some implementations, the UE 102 uses a UE PDCP entity to transmit 312 the UL PDCP PDU(s) or the UL RLC PDU(s) including the UL PDCP PDU(s) and uses the UE PDCP entity to receive 314 the DL PDCP PDU(s) or the DL RLC PDU(s) including the DL PDCP PDU(s), as described above. In some implementations, the UE 102 can reestablish 340 the UE PDCP entity in response to the RRC resume message. Then, the UE 102 performs 335, 337 data communication with the CU 172 via the DU 174 with the reestablished UE PDCP entity. Alternatively, the UE 102 can release the UE PDCP entity and establishes a new UE PDCP entity, in response to the RRC resume message. Then, the UE 102 performs 335, 337 data communication with the CU 172 via the DU 174 with the new UE PDCP entity.

Similarly, the CU 172 can (re)establish 342 PDCP in response to determining 316 to transition the UE to the connected state. In some implementations, the CU 172 uses a CU PDCP entity to transmit 314 the DL PDCP PDU(s), and uses the CU PDCP entity to receive 312 the UL PDCP PDU(s), as described above. In some implementations, the CU 172 can reestablish 342 the CU PDCP entity, in response to or after making 316 the determination, transmitting 318 the UE Context Request message, receiving 320 the UE Context Response message or transmitting 322 the RRC resume message. Then, the CU 172 performs 335, 337 data communication with the UE 102 via the DU 174 with the reestablished CU PDCP entity. Alternatively, the CU 172 can release the CU PDCP entity and establishes a new CU PDCP entity, in response to or after making 316 the determination, transmitting 318 the UE Context Request message, receiving 320 the UE Context Response message or transmitting 322 the RRC resume message. Then, the CU 172 performs 335, 337 data communication with the UE 102 via the DU 174 with the new CU PDCP entity.

In other implementations, the UE 102 can refrain from (re)establishing and/or releasing PDCP (e.g., the (new) UE PDCP entity) in response to the RRC resume message. Similarly, the CU 172 can refrain from (re)establishing PDCP (e.g., the (new) CU PDCP entity) in response to determining 316 to transition the UE to the connected state.

Figure 3C:
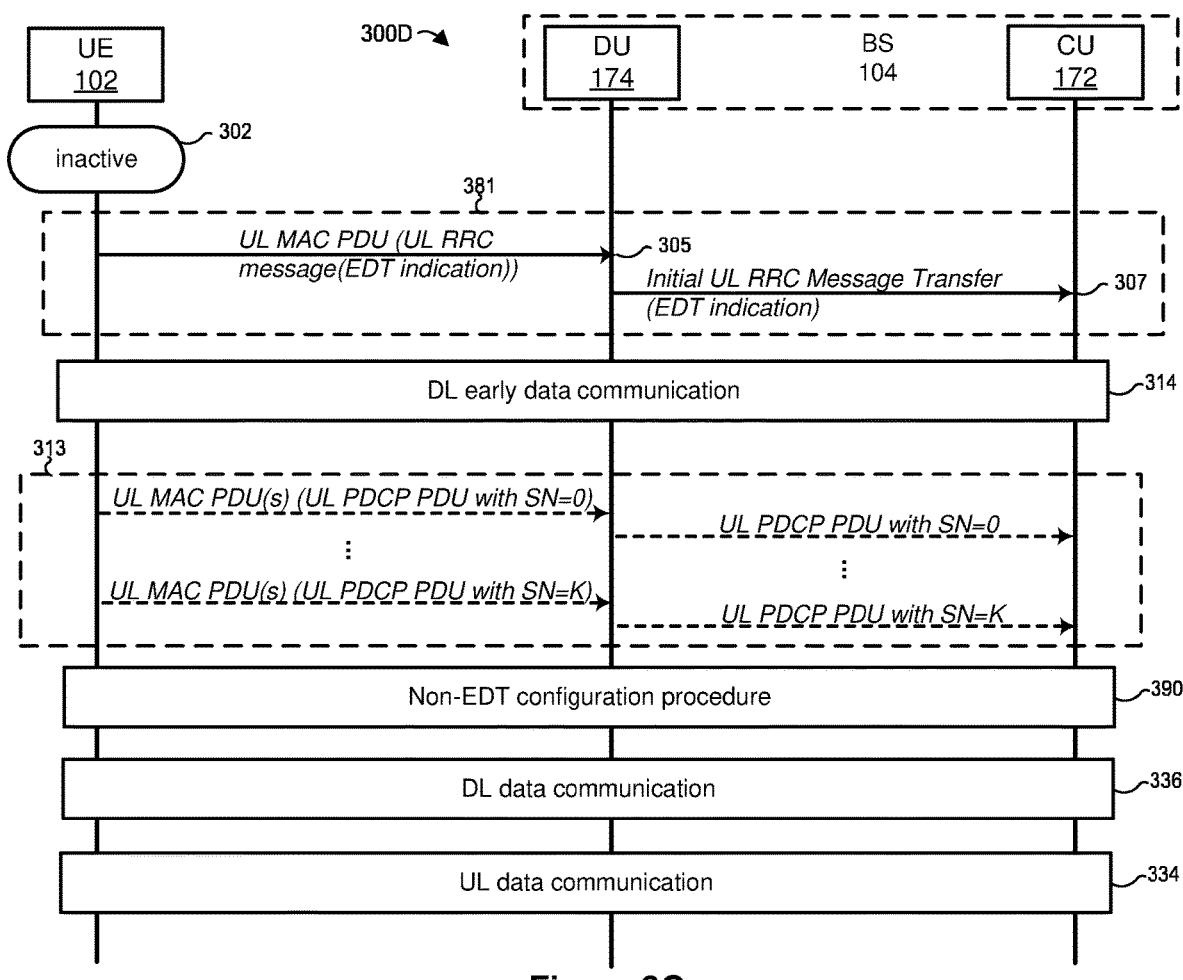
FIG. 3C is a messaging diagram of yet another example procedure for managing communications from a UE during a state transition from an inactive state to a connected state with the base station, where an initial radio resource control (RRC) message does not include an initial data packet.

Referring next to FIG. 3C, a scenario 300C is depicted which is generally similar to the scenario 300A. Events in this scenario similar to those discussed above are labeled with the same reference numbers and the examples and implementations for FIG. 3A can apply to FIG. 3C. A difference between scenario 300C and scenario 300A is that the UE initiates 381 initial UL early data communication without an initial UL PDCP PDU. The differences between the scenarios of FIG. 3A and FIG. 3C are discussed further below.

In the scenario 300C, the UE 102 in the inactive state initiates 381 initial early data communication to transmit uplink (UL) data or receive downlink (DL) data. In response to or after initiating early data communication, the UE 102 generates an initial UL MAC PDU including a UL RLC message and without a UL PDCP PDU and transmits 305 the initial UL MAC PDU to the DU 174 on cell 124. The DU 174 retrieves the UL RRC message from the initial UL MAC PDU and generates an Initial UL RRC Message Transfer message including the UL RRC message. Then, the DU 174 sends 307 the Initial UL RRC Message Transfer message to the CU 172.

After transmitting 381 the initial UL MAC PDU, the UE 102 can transmit 313 to the DU 174 one or more UL PDCP PDUs with SN=0, . . . , K, respectively, where K is an integer and larger than 0. The UE 102 can send 313 UL MAC PDU(s) including the one or more UL PDCP PDUs to the DU 174. The DU 174 forwards the one or more UL PDCP PDUs to the CU 172 via a control plane interface (e.g., F1-C or W1-U) or a user plane interface (F1-U or W1-U). The UE 102 can include an application data packet, RRC message, or a NAS PDU in a particular UL PDCP PDU. In some implementations, a UL MAC PDU in the one or more UL MAC PDUs can include a particular UL PDCP PDU or include a segment of a particular UL PDCP PDU. In other implementations, the UE 102 can send 313 to the UE 102 a UL MAC PDU including at least two UL PDCP PDUs of the K UL PDCP PDUs. In some implementations, the UE 102 can include a particular UL PDCP PDU in a UL RLC PDU and includes the UL RLC PDU in a UL MAC PDU in the one or more UL MAC PDUs. In other implementations, the UE 102 can include a segment of a particular UL PDCP PDU in a UL RLC PDU segment, includes other segment(s) of the UL PDCP PDU in other UL RLC PDU segment(s), and include the other UL RLC PDU segment(s) in UL MAC PDU(s) in the one or more UL MAC PDUs. In yet other implementations, the UE 102 can send 313 to the UE 102 a UL MAC PDU including at least two UL RLC PDUs each including a particular UL PDCP PDU of the K UL PDCP PDUs. When the DU 174 receives all segments of a UL PDCP PDU from the UE 102, the DU 174 assembles the segments to obtain the UL PDCP PDU, and send the UL PDCP PDU to the CU 172.

Figure 3D:
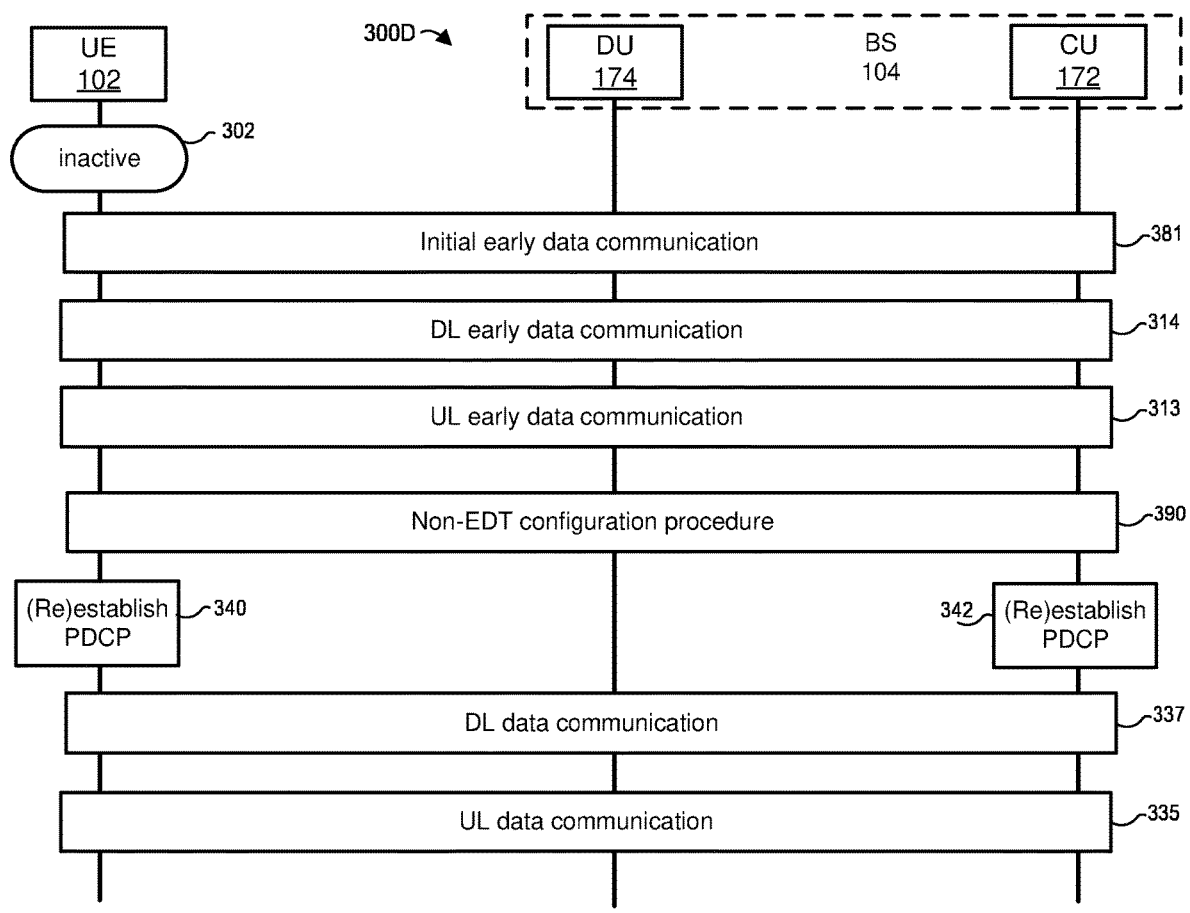
FIG. 3D is a messaging diagram of another example procedure for managing communications from a UE during a state transition from an inactive state to a connected state with the base station, where the UE or the CU reestablishes a PDCP entity and an initial radio resource control (RRC) message does not include an initial data packet.

Referring next to FIG. 3D, a scenario 300D is depicted which combines aspects of scenario 300B with aspects of scenario 300C. In particular, in the scenario 300D, the UE 102 in the inactive state initiates 381 initial early data communication to transmit uplink (UL) data or receive downlink (DL) data. After transmitting the initial UL MAC PDU, the UE 102 can transmit 313 to the DU 174 one or more UL PDCP PDUs with SN=0, . . . , K, respectively, where K is an integer and larger than 0. Additionally, in the scenario 300D, the UE 102 can (re)establish 340 PDCP in response to the RRC resume message as in the scenario 300B. More specifically, the UE 102 can (re)establish 340 a UE PDCP entity in response to the RRC resume message. The UE 102 uses the UE PDCP entity to transmit 313 the UL PDCP PDU(s) or the UL RLC PDU(s) including the UL PDCP PDU(s) as described above. The UE 102 uses the UE PDCP entity to receive 314 the DL PDCP PDU(s) or the DL RLC PDU(s) including the DL PDCP PDU(s) as described above. Similarly, the CU 172 can (re)establish 342 PDCP in response to determining 316 to transition the UE to the connected state. More specifically, the CU 172 can (re)establish 342 a CU PDCP entity in response to determining 316 to transition the UE to the connected state.

Figure 3E:
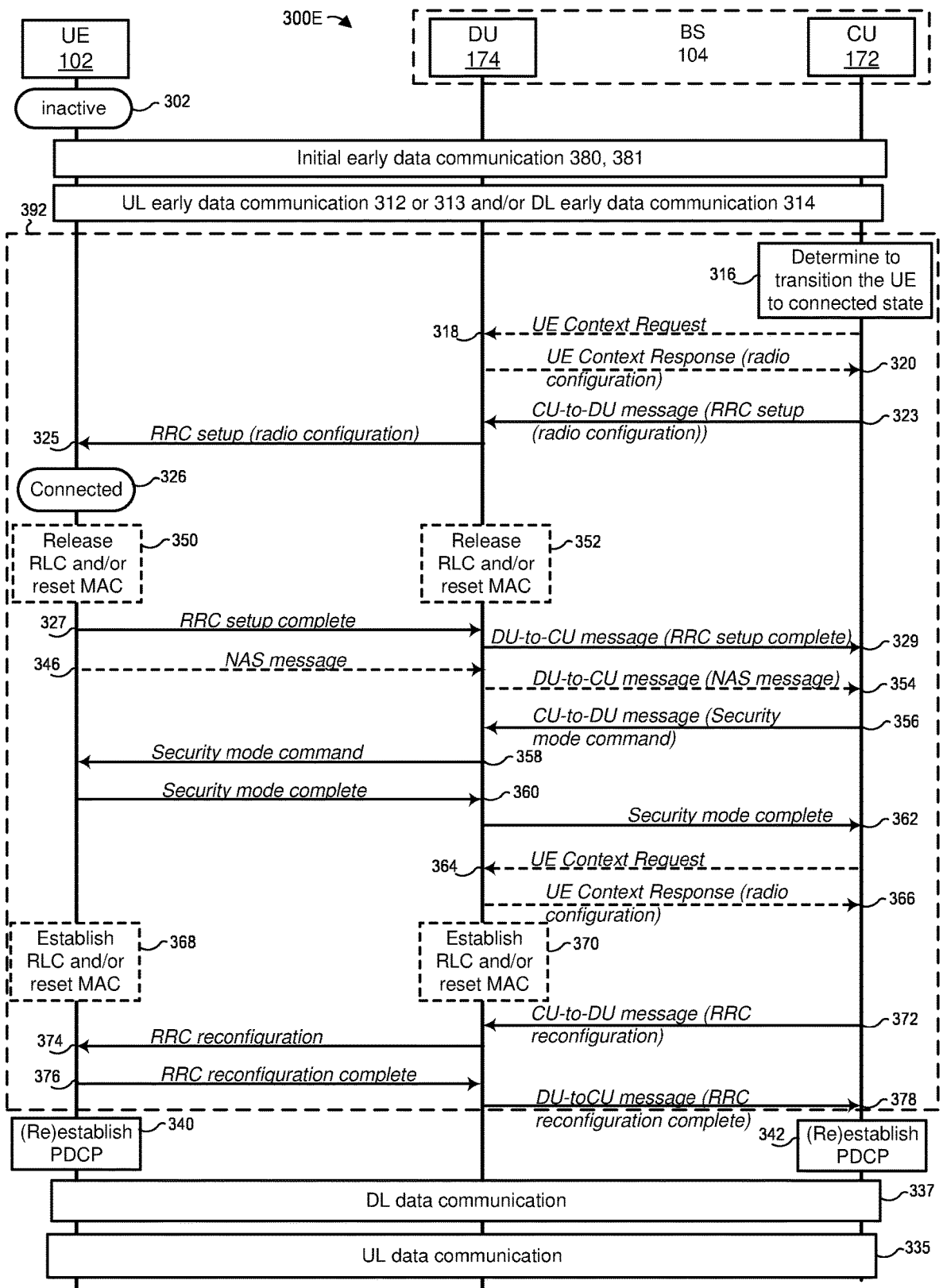
FIG. 3E is a messaging diagram of yet another example procedure for managing communications from a UE during a state transition from an inactive state to a connected state with the base station, where the CU sends an RRC setup message to the UE to start over rather than resume the connection with the base station.

Referring next to FIG. 3E, a scenario 300E is depicted which is generally similar to the scenario 300A. Events in this scenario similar to those discussed above are labeled with the same reference numbers and the examples and implementations for FIG. 3A can apply to FIG. 3E. A difference between scenario 300E and scenario 300A is that the CU 172 transmits an RRC setup message instead of an RRC resume message in the non-EDT configuration procedure. The differences between the scenarios of FIG. 3A and FIG. 3E are discussed further below.

In the scenario 300E in a non-EDT configuration procedure 392, the CU 172 receives 320 a radio configuration from the DU and generates a RRC setup message including the radio configuration and sends 323 to the DU 174 a CU-to-DU message including the RRC setup message. In turn, the DU 174 retrieves the RRC setup message from the CU-to-DU message and sends 325 the RRC setup message to the UE 102. In this manner, rather than resuming the connection with the base station 104 as described in scenario 300A, the connection starts over.

As a result, the UE 102 can release 350 RLC and/or reset MAC in response to the RRC setup message. For example, the UE 102 can release 350 a RLC entity that the UE 102 used to transmit UL data in the initial data communication 380 in response to the RRC setup message. In response to the RRC setup message, the UE 102 transmits 327 an RRC setup complete message to the DU 174. The DU 174 then forwards 329 the RRC setup complete message to the CU 172 in a DU-to-CU message. Similarly, the DU 174 can release 352 RLC and/or reset MAC in response to the UE Context Request message that the DU 174 receives 318 or in response to the CU-to-DU message that the DU 174 receives 323. For example, the DU 174 can release 355 a DU RLC entity that the DU 174 used to receive the UL data in the initial data communication 380, in response to the CU-to-DU message that the DU 174 receives 323.

Moreover, the UE 102 optionally transmits 346 a NAS message to the DU 174. The DU 174 then forwards 354 the NAS message to the CU 172 in a DU-to-CU message. In response, the CU 172 transmits 356 a security mode command to the DU 174 in a CU-to-DU message, which the DU 174 forwards 358 to the UE 102. In response to the security mode command, the UE 102 transmits 360 a security mode complete message to the DU 174, which the DU 174 forwards 362 to the CU 172 in a DU-to-CU message. The UE 102 and CU 172 can derive at least one security key (i.e., new security key(s)) from configuration parameters included in the security mode command message and applies the at least one new security key to messages exchanged between the UE 102 and CU 172 (e.g., events 374, 376) and DL data communication 337 and UL data communication 335, in similar manners described above.

In response to receiving the security mode complete message, the CU 172 can send 364 a UE Context Request message to the DU 174 to obtain a radio configuration for the UE 102. In response, the DU 174 sends 366 a UE Context Response including a radio configuration for the UE 102. In some implementations, the UE Context Request message and UE Context Response message can be a UE Context Setup Request message and a UE Context Setup Response message respectively. In other implementations, the UE Context Request message and UE Context Response message can be a UE Context Modification Request message and a UE Context Modification Response message respectively.

The CU 172 transmits 372 an RRC reconfiguration message in a CU-to-DU message to the DU 174. The DU 174 then forwards 374 the RRC reconfiguration message to the UE 102. In response, the UE 102 transmits 376 an RRC reconfiguration complete message to the DU 174, which forwards 378 the RRC reconfiguration complete message to the CU 172 in a DU-to-CU message.

In some implementations, the UE 102 can establish 368 RLC in response to the RRC reconfiguration message. More specifically, the UE 102 can establish 368 a new UE RLC entity in response to the RRC reconfiguration message. Similarly, the DU 174 can establish 370 RLC in response to the UE Context Request message that the DU 174 receives 364. More specifically, the DU 174 can establish 368 a new DU RLC entity in response to the UE Context Request message that the DU 174 receives 364.

Figure 4:
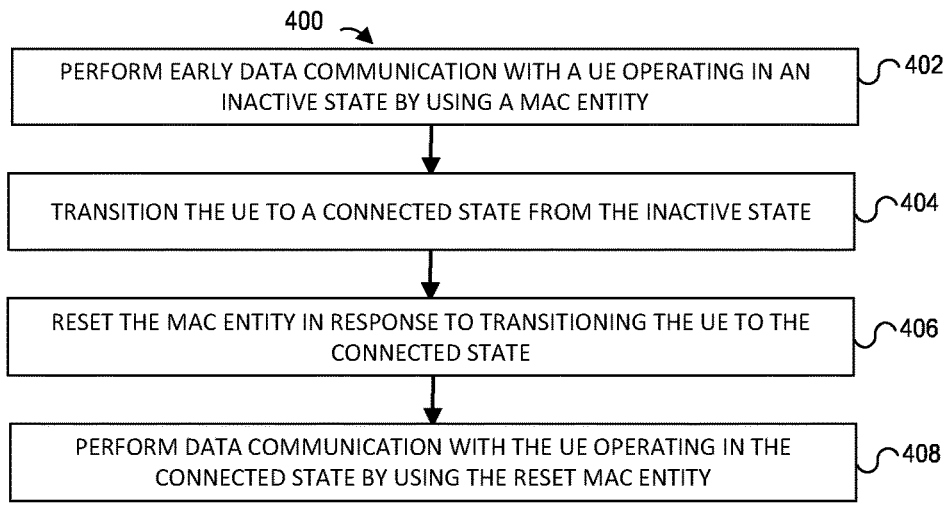
FIG. 4 is a flow diagram of an example method for managing communications from a UE during a state transition by resetting a media access control (MAC) entity, which can be implemented by the RAN of FIG. 1A.
Figure 5:
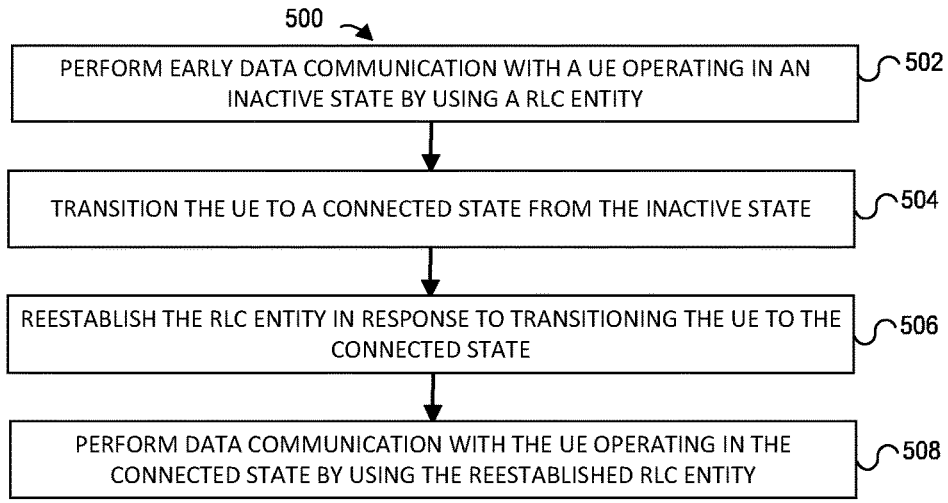
FIG. 5 is a flow diagram of an example method for managing communications from a UE during a state transition by reestablishing a radio control link (RLC) entity, which can be implemented by the RAN of FIG. 1A.
Figure 6:
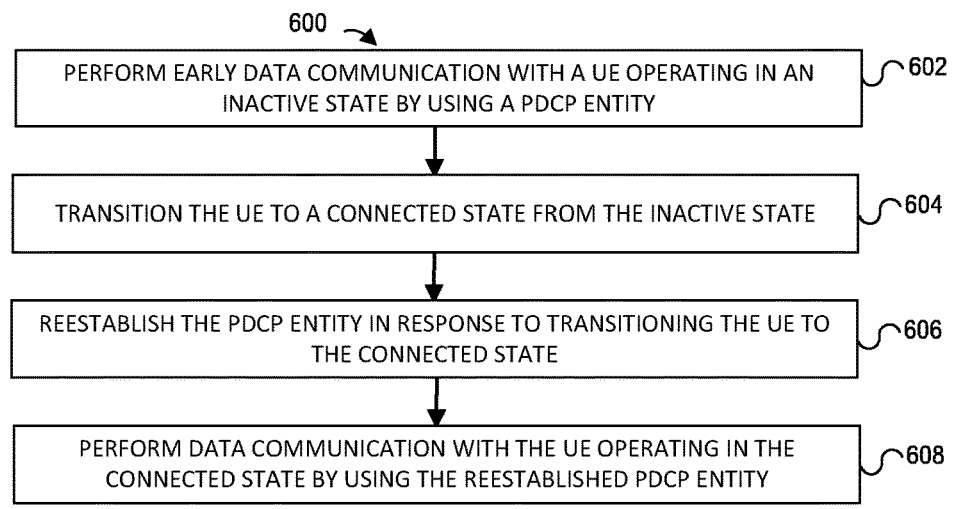
FIG. 6 is a flow diagram of an example method for managing communications from a UE during a state transition by reestablishing a PDCP entity, which can be implemented by the RAN of FIG. 1A.
Figure 10:
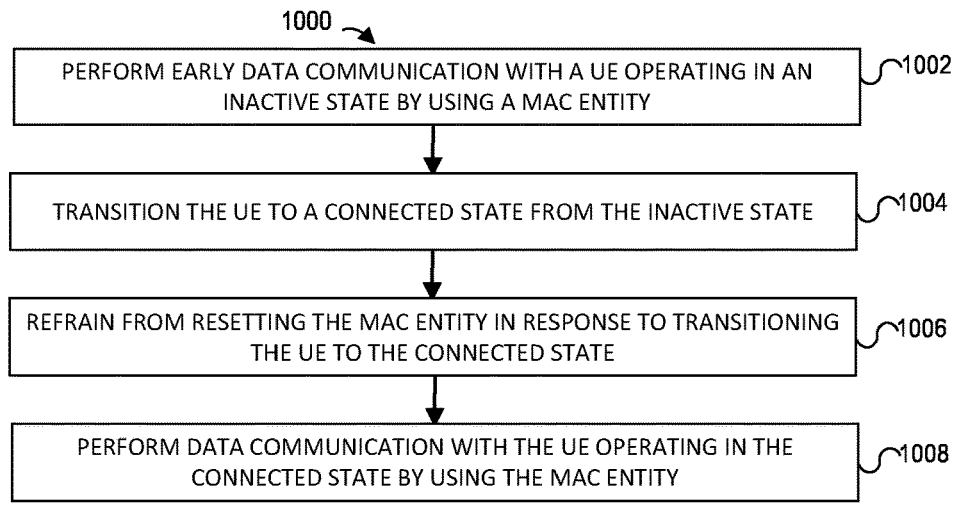
FIG. 10 is a flow diagram of an example method for managing communications from a UE during a state transition by refraining from resetting a MAC entity, which can be implemented by the RAN of FIG. 1A.
Figure 11:
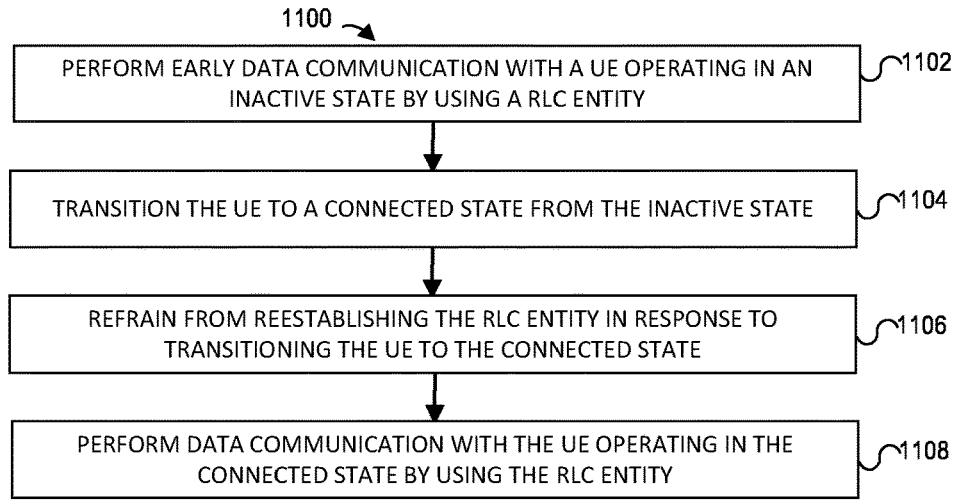
FIG. 11 is a flow diagram of an example method for managing communications from a UE during a state transition by refraining from reestablishing an RLC entity, which can be implemented by the RAN of FIG. 1A.
Figure 12:
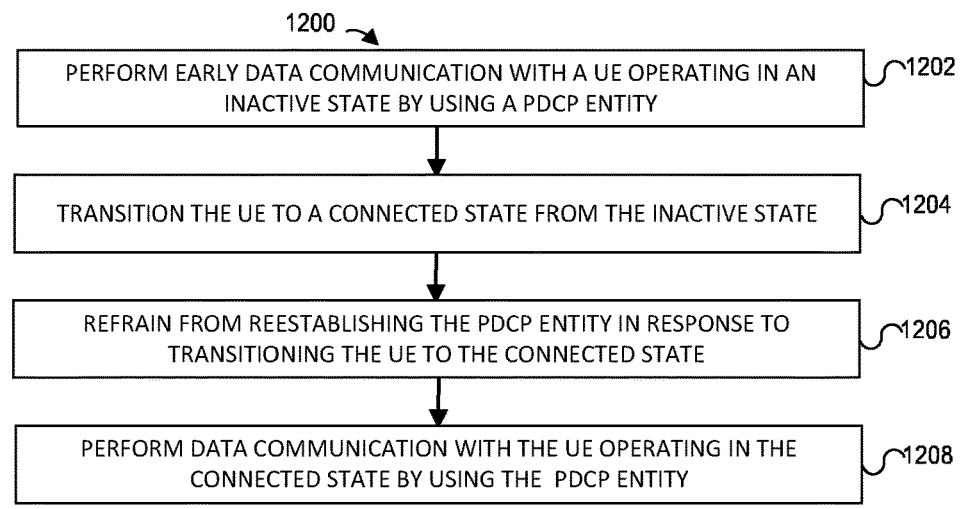
FIG. 12 is a flow diagram of an example method for managing communications from a UE during a state transition by refraining from reestablishing a PDCP entity, which can be implemented by the RAN of FIG. 1A.
Figure 19:
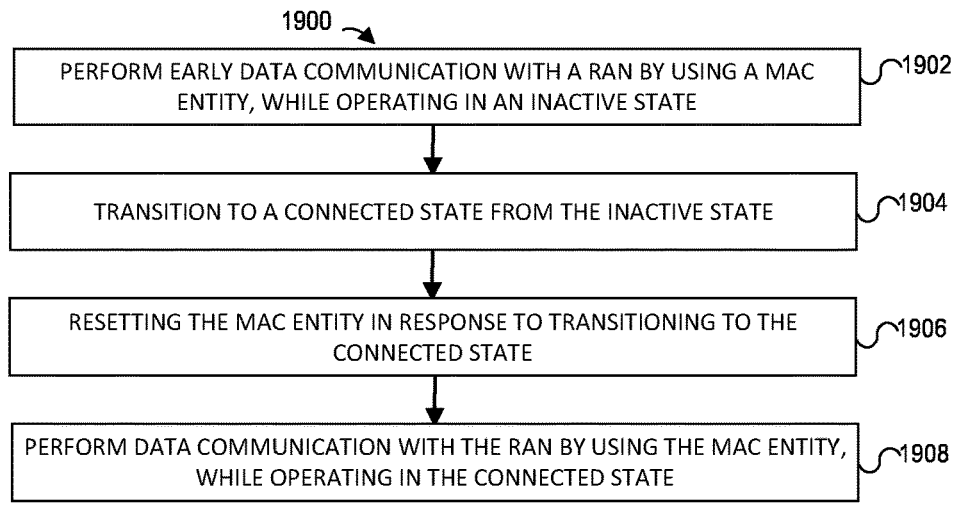
FIG. 19 is a flow diagram of an example method for data transmissions to a base station during a state transition by resetting a MAC entity, which can be implemented by the UE of FIG. 1A.
Figure 20:
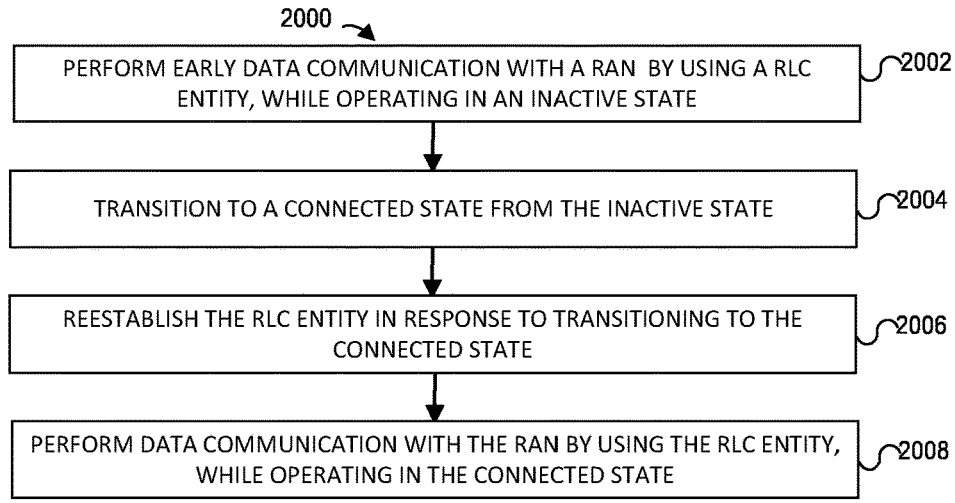
FIG. 20 is a flow diagram of an example method for data transmissions to a base station during a state transition by reestablishing an RLC entity, which can be implemented by the UE of FIG. 1A.
Figure 21:
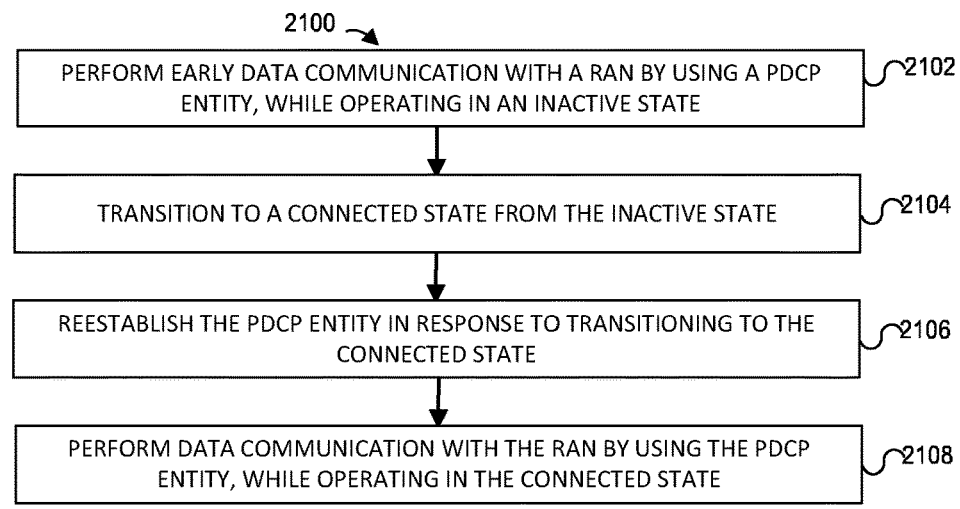
FIG. 21 is a flow diagram of an example method data transmissions to a base station during a state transition by reestablishing a PDCP entity, which can be implemented by the UE of FIG. 1A.
Figure 25:
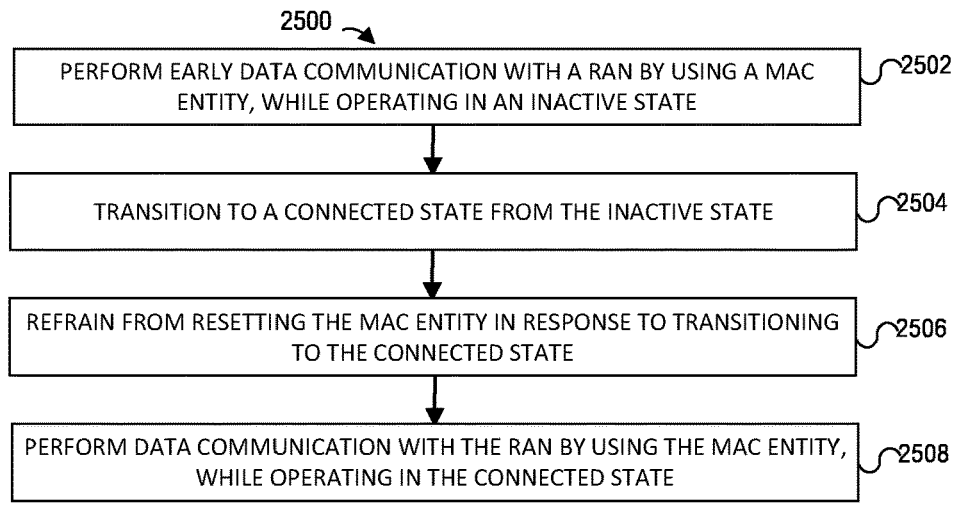
FIG. 25 is a flow diagram of an example method for data transmissions to a base station during a state transition by refraining from resetting a MAC entity, which can be implemented by the UE of FIG. 1A.
Figure 26:
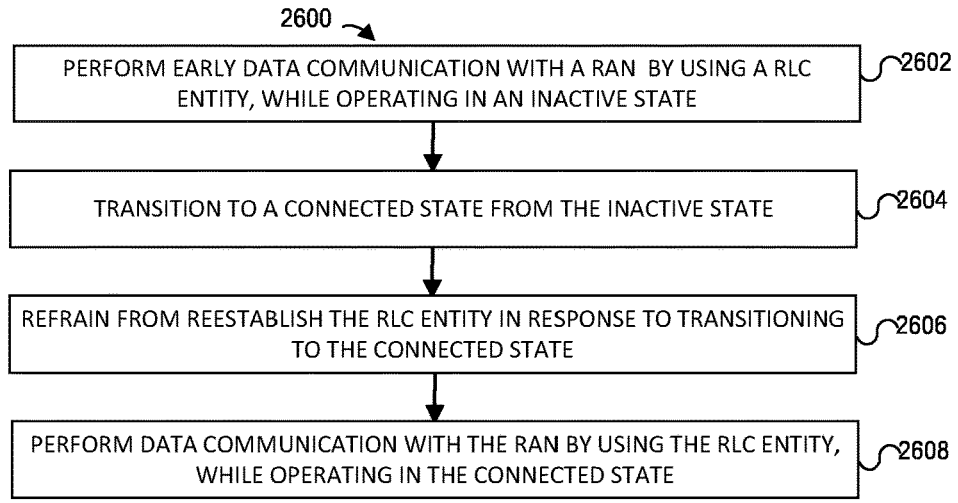
FIG. 26 is a flow diagram of an example method for data transmissions to a base station during a state transition by refraining from reestablishing an RLC entity, which can be implemented by the UE of FIG. 1A.
Figure 27:
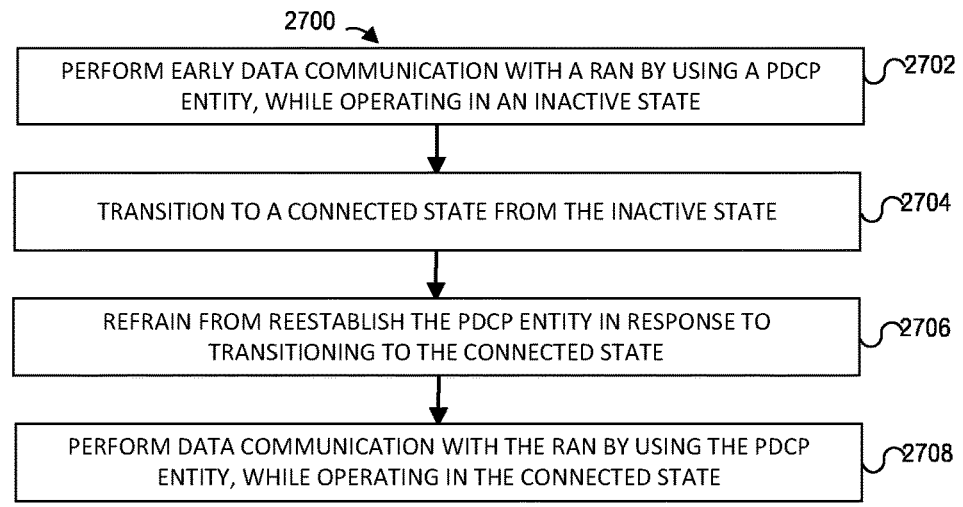
FIG. 27 is a flow diagram of an example method for data transmissions to a base station during a state transition by refraining from reestablishing a PDCP entity, which can be implemented by the UE of FIG. 1A.

FIGS. 4-37 are flow diagrams depicting methods that a UE (e.g., the UE 102), nodes (e.g., CU 172, DU 174, base station 104) of a RAN (e.g., the RAN 105) or the RAN can perform for managing data communication before and after a state transition from the inactive state to the connected state between the UE and the RAN. FIGS. 4-6 show example methods for resetting or reestablishing MAC, RLC, and PDCP entities at a RAN to manage data communication before and after a transition to a connected state. In contrast, FIGS. 10-12 show example methods for maintaining (or refraining from resetting or reestablishing) MAC, RLC, and PDCP entities at a RAN to manage data communication before and after a transition to a connected state. At the UE, FIGS. 19-21 show example methods for resetting or reestablishing MAC, RLC, and PDCP entities to manage data communication before and after a transition to a connected state. In contrast, FIGS. 25-27 show example methods for maintaining (or refraining from resetting or reestablishing) MAC, RLC, and PDCP entities at a UE to manage data communication before and after a transition to a connected state.

FIG. 4 is a flow diagram of an example method 400 for managing data communication before and after a state transition from the inactive state to the connected state, which can be implemented in one or more RAN nodes (e.g., CU 172, DU 174, base station 104 or RAN 105).

At block 402, the RAN node(s) performs early data communication with a UE operating in an inactive state by using a MAC entity (e.g., events 304, 306, 312, 314). At block 404, the RAN node(s) transitions the UE to a connected state from the inactive state (e.g., events 322, 324). At block 406, the RAN node(s) resets the MAC entity in response to transitioning the UE to the connected state (e.g., event 330). At block 408, the RAN node(s) performs data communication with the UE operating in the connected state by using the reset MAC entity (e.g., events 334, 336, 335, 337).

FIG. 5 is a flow diagram of an example method 500 for managing data communication before and after a state transition from the inactive state to the connected state, which can be implemented in one or more RAN nodes (e.g., CU 172, DU 174, base station 104 or RAN 105).

At block 502, the RAN node(s) performs early data communication with a UE operating in an inactive state by using a RLC entity (e.g., events 304, 306, 312, 314). At block 504, the RAN node(s) transitions the UE to a connected state from the inactive state (e.g., events 322, 324). At block 506, the RAN node(s) reestablishes the RLC entity in response to transitioning the UE to the connected state (e.g., event 330). At block 508, the RAN node(s) performs data communication with the UE operating in the connected state by using the reestablished RLC entity (e.g., events 334, 336, 335, 337).

FIG. 6 is a flow diagram of an example method 600 for managing data communication before and after a state transition from the inactive state to the connected state, which can be implemented in one or more RAN nodes (e.g., CU 172, DU 174, base station 104 or RAN 105).

At block 602, the RAN node(s) performs early data communication with a UE operating in an inactive state by using a PDCP entity (e.g., events 304, 306, 312, 314). At block 604, the RAN node(s) transitions the UE to a connected state from the inactive state (e.g., events 322, 324). At block 606, the RAN node(s) reestablishes the PDCP entity in response to transitioning the UE to the connected state (e.g., event 342). At block 608, the RAN node(s) performs data communication with the UE operating in the connected state by using the reestablished PDCP entity (e.g., events 335, 337).

Figure 7A:
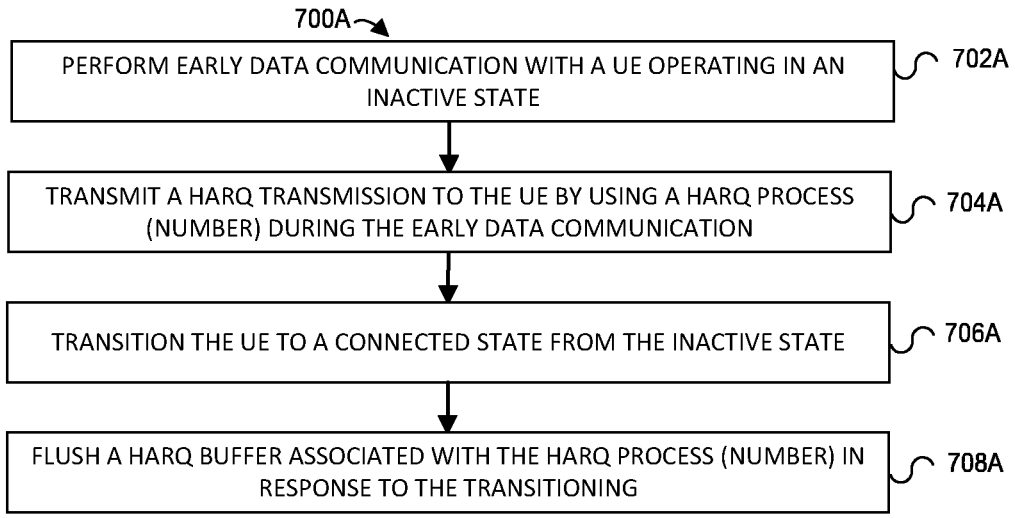
FIGS. 7A-7C are flow diagrams of example methods for managing communications from a UE during a state transition by transmitting a hybrid automatic repeat request (HARQ) transmission using a HARQ process number, which can be implemented by the RAN of FIG. 1A.

FIG. 7A is a flow diagram of an example method 700A for managing data communication before and after a state transition from the inactive state to the connected state, which can be implemented in one or more RAN nodes (e.g., CU 172, DU 174, base station 104 or RAN 105). In the method 700A, the RAN nodes flush a HARQ buffer associated with a HARQ process number when the UE transitions to the connected state from the inactive state. In this manner, the HARQ process number resets so that a HARQ transmission associated with the HARQ process is scheduled as a new transmission.

At block 702A, the RAN node(s) performs early data communication with a UE operating in an inactive state (e.g., events 304, 306, 312, 314). The RAN node(s) transmits a first downlink control information (DCI) to the UE to schedule the UE to receive the HARQ transmission. At block 704A, the RAN node(s) transmits a HARQ transmission to the UE by using a HARQ process (number) during the early data communication (e.g., events 314). At block 706A, the RAN node(s) transitions the UE to a connected state from the inactive state (e.g., events 322, 324). At block 708A, the RAN node(s) flushes a HARQ buffer associated with the HARQ process (number) in response to the transitioning. After flushing the HARQ buffer, the RAN node(s) generates the next HARQ transmission associated with the HARQ process as a new transmission for the UE operating in the connected state. The RAN node(s) transmits a second DCI to the UE to schedule the UE to receive the next HARQ transmission after transitioning the UE to the connected state. The RAN node(s) can include the same HARQ process number in the first DCI and second DCI.

In some implementations, the UE uses a soft buffer associated with a HARQ process (number) to receive the HARQ transmission of the MAC PDU. The UE flushes the soft buffer in response to transitioning to the connected state. After flushing the soft buffer, the UE determines the next HARQ transmission associated with the HARQ process (number) as a new transmission. The UE attempts to receive the DCI after transitioning to the connected state. In accordance with the DCI, the UE receives the next HARQ transmission and determines the next HARQ transmission as a new transmission.

Figure 7B:
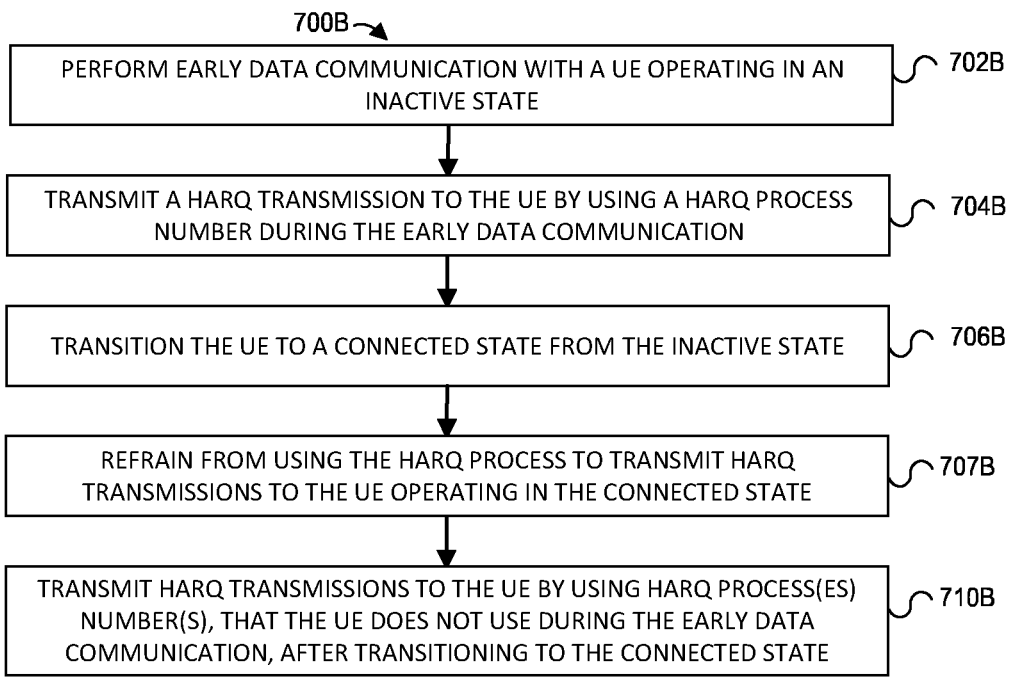

FIG. 7B is a flow diagram of an example method 700B for managing data communication before and after a state transition from the inactive state to the connected state, which can be implemented in one or more RAN nodes (e.g., CU 172, DU 174, base station 104 or RAN 105). The method 700B is an alternative to the method 700A as shown in FIG. 7A. In the method 700B, when the UE transitions to the connected state from the inactive state, the RAN nodes transmit HARQ transmissions using a different HARQ process number than the HARQ process number for HARQ transmissions while the UE was in the inactive state.

At block 702B, the RAN node(s) performs early data communication with a UE operating in an inactive state (e.g., events 304, 306, 312, 314). At block 704B, the RAN node(s) transmits a HARQ transmission to the UE by using a HARQ process (number) during the early data communication (e.g., events 314). At block 706B, the RAN node(s) transitions the UE to a connected state from the inactive state (e.g., events 322, 324). At block 707B, the RAN node(s) refrains from using the HARQ process (number) to transmit HARQ transmissions to the UE operating in the connected state. At block 710B, the RAN node(s) transmits HARQ transmissions to the UE by using (an)other HARQ process(es) number(s), that the UE does not use during the early data communication, after transitioning to the connected state.

Figure 7C:
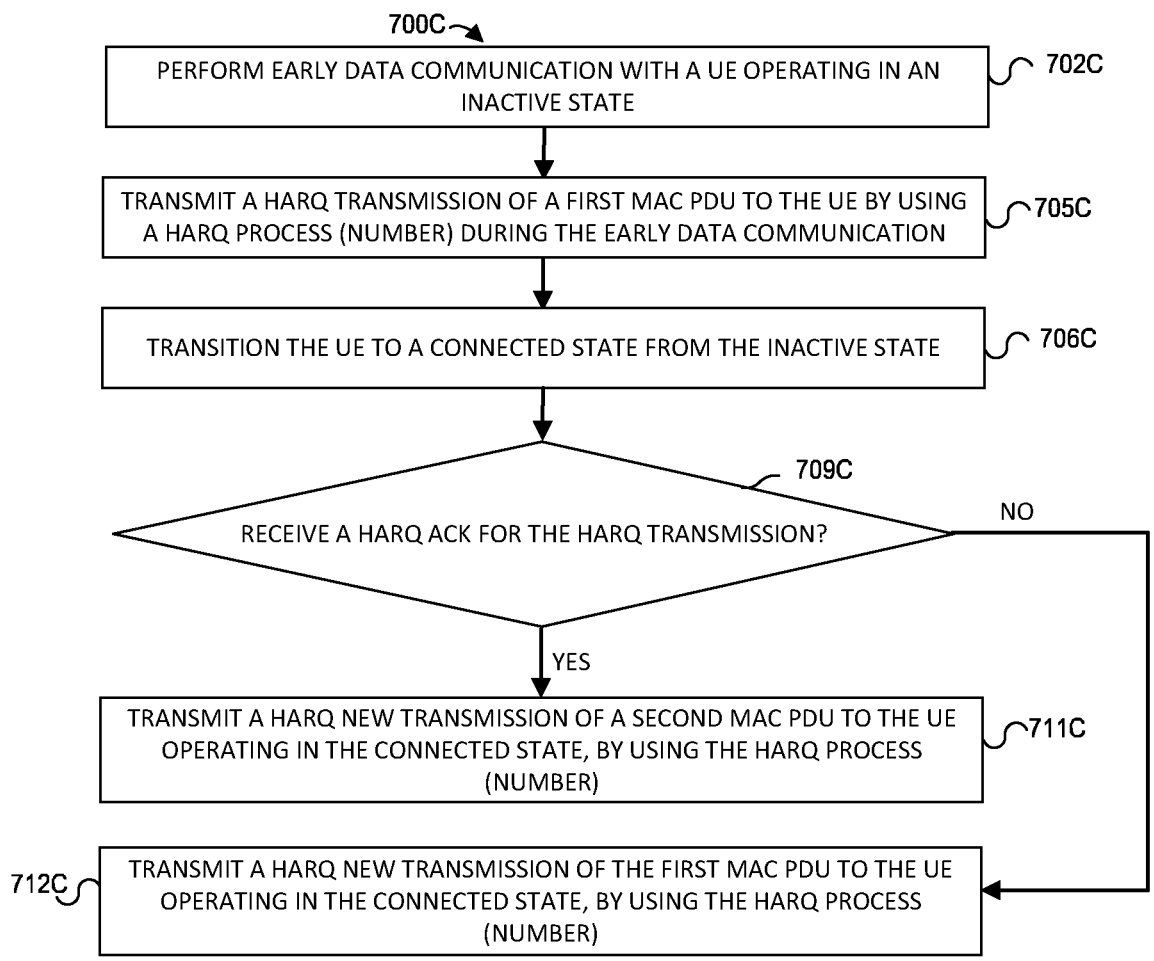

FIG. 7C is a flow diagram of an example method 700C for managing data communication before and after a state transition from the inactive state to the connected state, which can be implemented in one or more RAN nodes (e.g., CU 172, DU 174, base station 104 or RAN 105). In the example method 700C, after the UE transitions to a connected state from an inactive state, reset MAC PDUs are assigned a new data indicator (NDI) to indicate new data. This is because the HARQ buffer may not be maintained during a state change. If the RAN node(s) receives a HARQ acknowledgement for a HARQ transmission of a MAC PDU transmitted while the UE was in the inactive state, the RAN node(s) transmits a HARQ new transmission of a new subsequent MAC PDU to the UE. If the RAN node(s) receives a HARQ NACK or does not receive a HARQ acknowledgement for the HARQ transmission of the MAC PDU transmitted while the UE was in the inactive state, the RAN node(s) transmits a HARQ new transmission of the MAC PDU, but with an NDI indicating new data to start over in the connected state.

At block 702C, the RAN node(s) performs early data communication with a UE operating in an inactive state e.g., events 304, 306, 312, 314). At block 705C, the RAN node(s) transmits a HARQ transmission of a first MAC PDU to the UE by using a HARQ process (number) during the early data communication (e.g., events 314). At block 706C, the RAN node(s) transitions the UE to a connected state from the inactive state (e.g., events 322, 324). At block 709C, the RAN node(s) determines whether a HARQ acknowledgement for the HARQ transmission of the first MAC PDU is received. If the RAN node(s) receives a HARQ acknowledgement for the HARQ transmission of the first MAC PDU, the RAN node(s) at block 711C transmits a HARQ new transmission of a second MAC PDU to the UE operating in the connected state, by using the HARQ process number (e.g., events 336, 337).

If the RAN node(s) does not receive a HARQ acknowledgement for the HARQ transmission of the first MAC PDU, the RAN node(s) at block 712C transmits a HARQ new transmission of the first MAC PDU to the UE operating in the connected state, by using the HARQ process (number). Alternatively, the RAN node(s) at block 712C does not transmit a HARQ transmission of the first MAC PDU. In this alternative, the RAN node(s) can flush a HARQ buffer storing the first MAC PDU.

Figure 8:
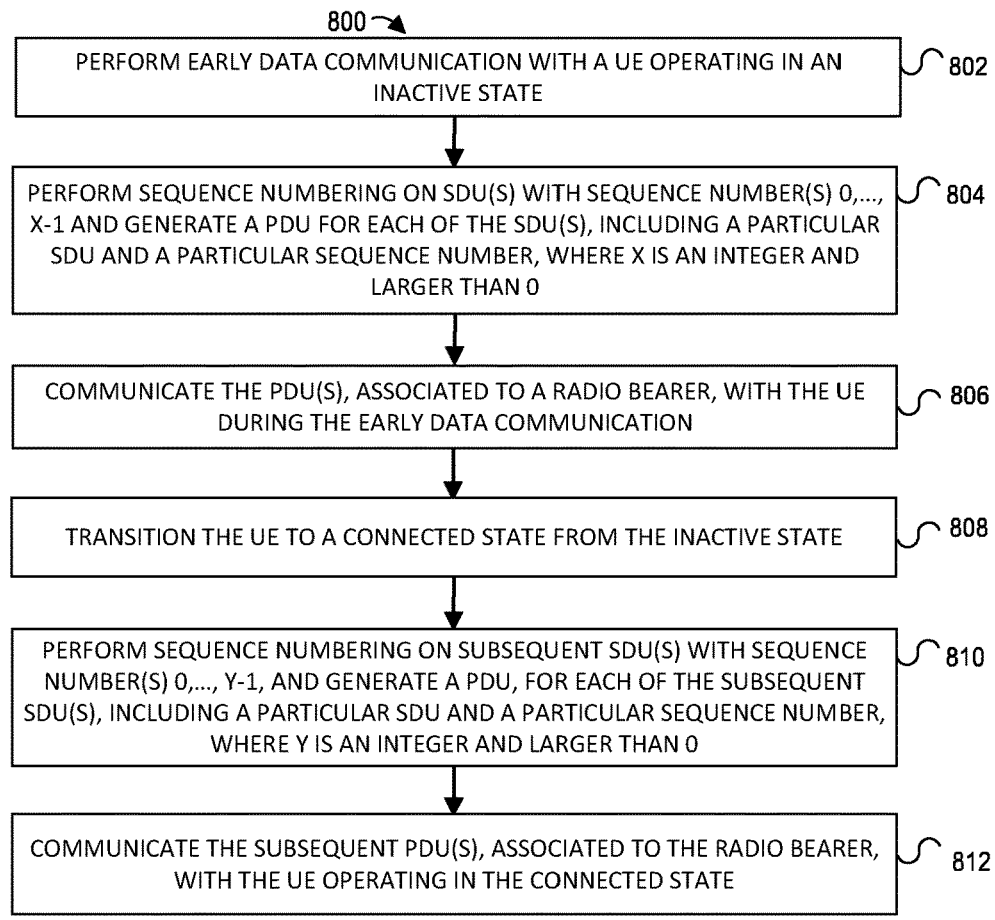
FIG. 8 is a flow diagram of an example method for managing communications from a UE during a state transition by assigning a first set of sequence numbers (0, . . . , X−1) to packets transmitted in the inactive state and resetting the set of sequence numbers (0, . . . , Y−1) for packets transmitted in the connected state, which can be implemented by the RAN of FIG. 1A.

FIG. 8 is a flow diagram of an example method 800 for managing data communication before and after a state transition from the inactive state to the connected state, which can be implemented in one or more RAN nodes (e.g., CU 172, DU 174, base station 104 or RAN 105). In the example method 800, the RAN nodes restart sequence numbering for continuing DL PDCP PDUs associated with the same radio bearer after transitioning the UE to the connected state as in FIG. 3B.

At block 802, the RAN node(s) performs early data communication with a UE operating in an inactive state (e.g., events 304, 306, 312, 314). At block 804, the RAN node(s) performs sequence numbering on SDU(s) with sequence number(s) 0, . . . , X−1 and generates a PDU for each of the SDU(s), including a particular SDU and a particular sequence number, where X is an integer and larger than 0 (e.g., events 304, 306, 312, 314). At block 806, the RAN node(s) communicates the PDU(s), associated to a radio bearer, with the UE during the early data communication (e.g., events 304, 306, 312, 314). At block 808, the RAN node(s) transitions the UE to a connected state from the inactive state (e.g., events 322, 324). At block 810, the RAN node(s) performs sequence numbering on subsequent SDU(s) with sequence number(s) 0, . . . , Y−1, and generates a PDU, for each of the subsequent SDU(s), including a particular SDU and a particular sequence number, where Y is an integer and larger than 0 (e.g., events 335, 337). At block 812, the RAN node(s) communicates the subsequent PDU(s), associated to the radio bearer, with the UE operating in the connected state (e.g., events 335, 337). In some implementations, the PDU(s) can be PDCP PDU(s) or RLC PDU(s).

Figure 9:
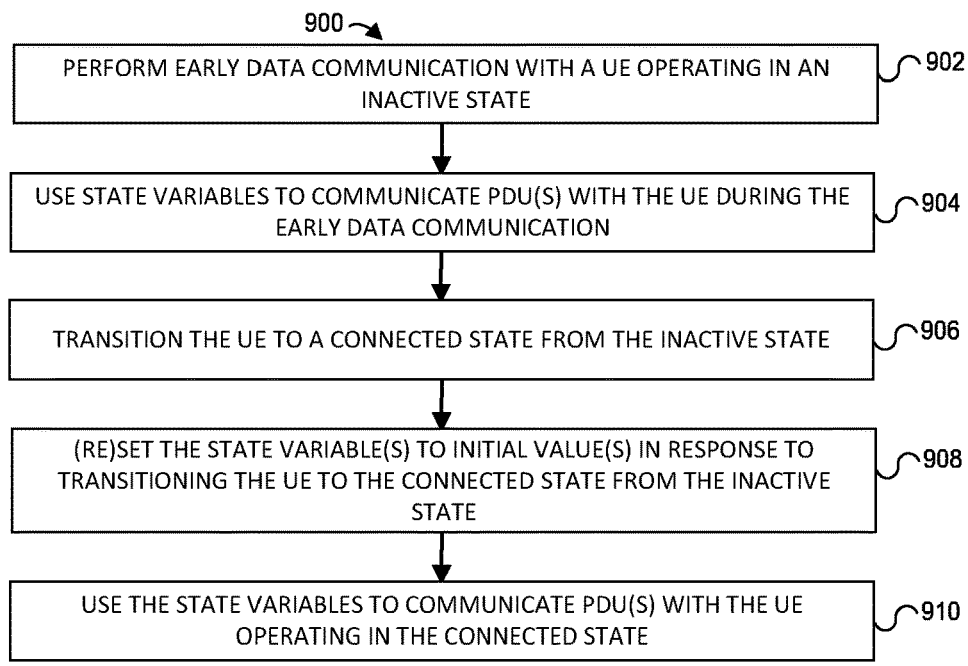
FIG. 9 is a flow diagram of an example method for managing communications from a UE during a state transition by resetting state variables used to communicate data packets in the inactive state to their initial values when transitioning to the connected state, which can be implemented by the RAN of FIG. 1A.

FIG. 9 is a flow diagram of an example method 900 for managing data communication before and after a state transition from the inactive state to the connected state, which can be implemented in one or more RAN nodes (e.g., CU 172, DU 174, base station 104 or RAN 105). This flow diagram uses state variables to track and (re)set and/or (re)establish RLC, MAC, and/or PDCP entities in accordance with any of FIGS. 4-6 after transitioning from an inactive state to the connected state.

At block 902, the RAN node(s) performs early data communication with a UE operating in an inactive state (e.g., events 304, 306, 312, 314). At block 904, the network node uses state variables to communicate PDU(s) with the UE during the early data communication (e.g., events 304, 306, 312, 314). At block 906, the RAN node(s) transitions the UE to a connected state from the inactive state (e.g., events 322, 324). At block 908, the RAN node(s) (re)sets the state variable(s) to initial value(s) in response to transitioning the UE to the connected state from the inactive state (e.g., events 330, 342). At block 910, the RAN node(s) uses the state variables to communicate PDU(s) with the UE operating in the connected state (e.g., events 334, 336, 335, 337). In some implementations, the PDU(s) can be PDCP PDU(s) or RLC PDU(s).

FIG. 10 is a flow diagram of an example method 1000 for managing data communication before and after a state transition from the inactive state to the connected state, which can be implemented in one or more RAN nodes (e.g., CU 172, DU 174, base station 104 or RAN 105).

At block 1002, the RAN node(s) performs early data communication with a UE operating in an inactive state by using a MAC entity (e.g., events 304, 306, 312, 314). At block 1004, the RAN node(s) transitions the UE to a connected state from the inactive state (e.g., events 322, 324). At block 1006, the RAN node(s) refrains from resetting the MAC entity in response to transitioning the UE to the connected state. At block 1008, the RAN node(s) performs data communication with the UE operating in the connected state by using the MAC entity (e.g., events 334, 336, 335, 337).

FIG. 11 is a flow diagram of an example method 1100 for managing data communication before and after a state transition from the inactive state to the connected state, which can be implemented in one or more RAN nodes (e.g., CU 172, DU 174, base station 104 or RAN 105).

At block 1102, the RAN node(s) performs early data communication with a UE operating in an inactive state by using a RLC entity (e.g., events 304, 306, 312, 314). At block 1104, the RAN node(s) transitions the UE to a connected state from the inactive state (e.g., events 322, 324). At block 1106, the RAN node(s) refrains from reestablishing the RLC entity in response to transitioning the UE to the connected state. At block 1108, the RAN node(s) performs data communication with the UE operating in the connected state by using the RLC entity (e.g., events 334, 336, 335, 337).

FIG. 12 is a flow diagram of an example method 1200 for managing data communication before and after a state transition from the inactive state to the connected state, which can be implemented in one or more RAN nodes (e.g., CU 172, DU 174, base station 104 or RAN 105).

At block 1202, the RAN node(s) performs early data communication with a UE operating in an inactive state by using a PDCP entity (e.g., events 304, 306, 312, 314). At block 1204, the RAN node(s) transitions the UE to a connected state from the inactive state (e.g., events 322, 324). At block 1206, the RAN node(s) refrains from reestablishing the PDCP entity in response to transitioning the UE to the connected state. At block 1208, the RAN node(s) performs data communication with the UE operating in the connected state by using the PDCP entity (e.g., events 334, 336).

Figure 13A:
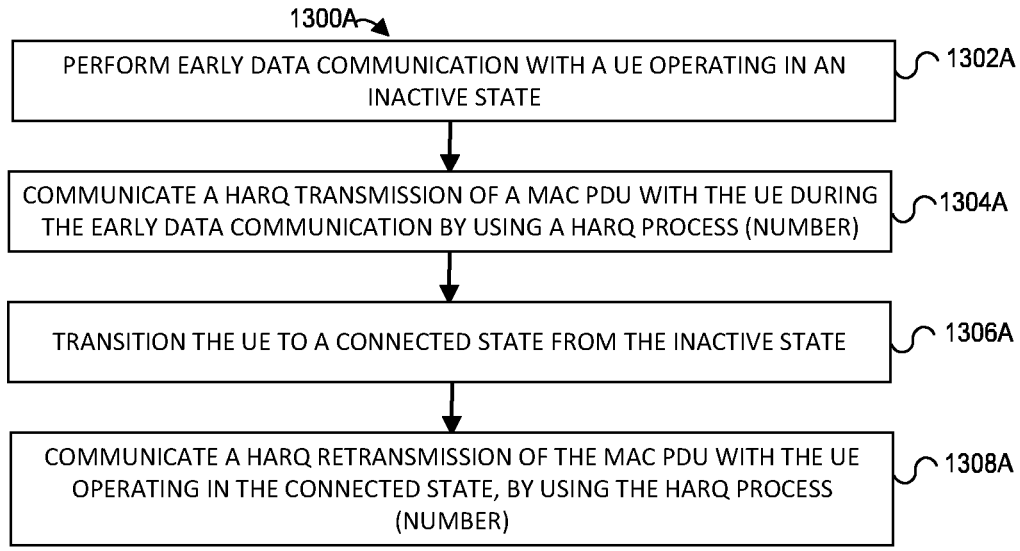
FIGS. 13A-13B are flow diagrams of example methods for managing communications from a UE during a state transition by transmitting a HARQ transmission using a HARQ process number, which can be implemented by the RAN of FIG. 1A.

FIG. 13A is a flow diagram of an example method 1300A for managing data communication before and after a state transition from the inactive state to the connected state, which can be implemented in one or more RAN nodes (e.g., CU 172, DU 174, base station 104 or RAN 105). In contrast to the method 700A in FIG. 7A, in the method 1300A the RAN nodes communicate a HARQ retransmission of the MAC PDU after the UE transitions to the connected state from the inactive state, rather than a new HARQ transmission.

At block 1302A, the RAN node(s) performs early data communication with a UE operating in an inactive state (e.g., events 304, 306, 312, 314). At block 1304A, the RAN node(s) communicates a HARQ transmission of a MAC PDU with the UE during the early data communication by using a HARQ process (number) (e.g., events 304, 306, 312, 314). At block 1306A, the RAN node(s) transitions the UE to a connected state from the inactive state (e.g., events 322, 324). At block 1308A, the RAN node(s) communicates a HARQ retransmission of the MAC PDU with the UE operating in the connected state, by using the HARQ process (number).

Figure 13B:
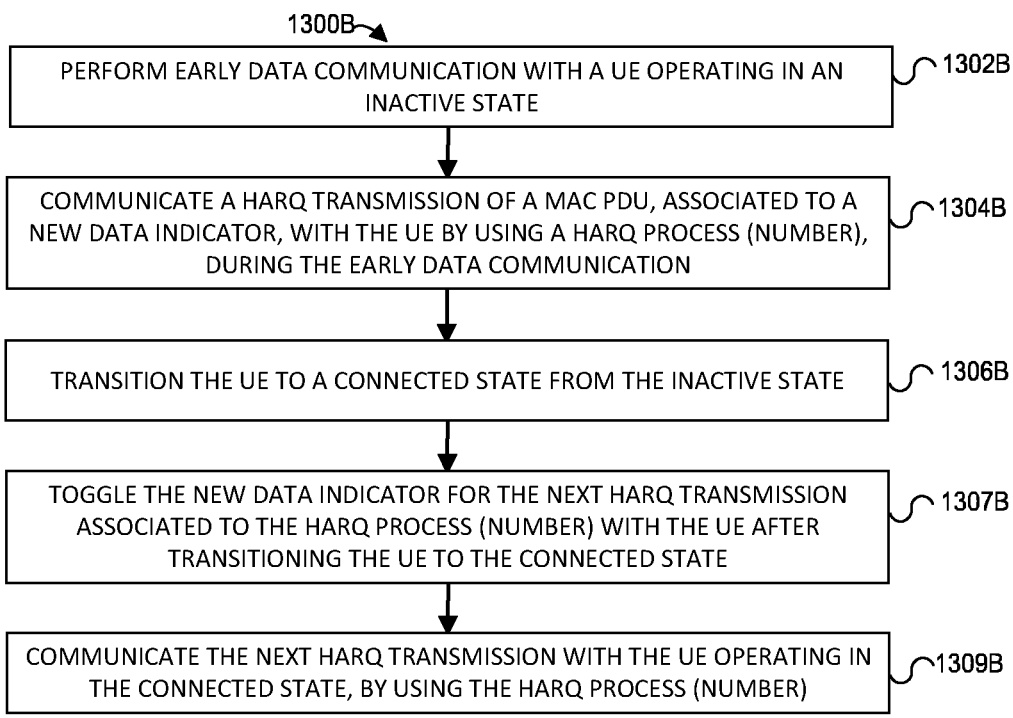

FIG. 13B is a flow diagram of an example method 1300B for managing data communication before and after a state transition from the inactive state to the connected state, which can be implemented in one or more RAN nodes (e.g., CU 172, DU 174, base station 104 or RAN 105). In contrast to the method 700B in FIG. 7B, in the method 1300B the RAN nodes toggle an NDI for a next HARQ retransmission associated with a HARQ process number after the UE transitions to the connected state from the inactive state, rather than using a different HARQ process number.

At block 1302B, the RAN node(s) performs early data communication with a UE operating in an inactive state (e.g., events 304, 306, 312, 314). At block 1304B, the RAN node(s) communicates a HARQ transmission of a MAC PDU with the UE during the early data communication by using a HARQ process (number) (e.g., events 304, 306, 312, 314). At block 1306B, the RAN node(s) transitions the UE to a connected state from the inactive state (e.g., events 322, 324). At block 1307B, the RAN node(s) toggles the new data indicator for the next HARQ transmission associated to the HARQ process (number) with the UE after transitioning the UE to the connected state. At block 1309B, the RAN node(s) communicates the next HARQ transmission with the UE operating in the connected state, by using the HARQ process (number) (e.g., events 334, 336, 335, 337).

Figure 14:
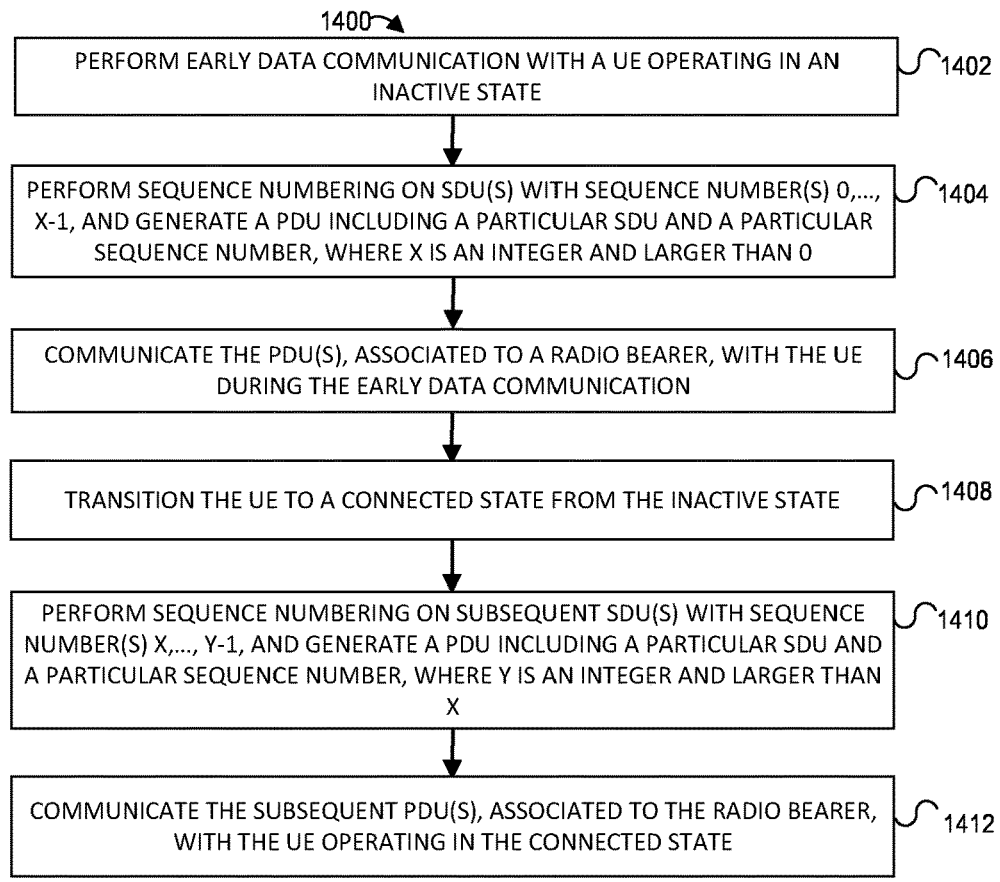
FIG. 14 is a flow diagram of an example method for managing communications from a UE during a state transition by assigning a first set of sequence numbers (0, . . . , X−1) to packets transmitted in the inactive state and a second set of sequence numbers (X, . . . , Y−1) for packets transmitted in the connected state, where the second set of sequence numbers begin from the number (X) after the last number (X−1) in the first set of sequence numbers, which can be implemented by the RAN of FIG. 1A.

FIG. 14 is a flow diagram of an example method 1400 for managing data communication before and after a state transition from the inactive state to the connected state, which can be implemented in one or more RAN nodes (e.g., CU 172, DU 174, base station 104 or RAN 105). In the example method 1400, the RAN nodes continue sequence numbering using the number after the last sequence number used for DL PDCP PDUs while the UE was in the inactive state for DL PDCP PDUs associated with the same radio bearer after transitioning the UE to the connected state as in FIG. 3A. This is in contrast to the method 800 as shown in FIG. 8 where the RAN nodes restart the sequence numbers when the UE transitions to the connected state from the inactive state.

At block 1402, the RAN node(s) performs early data communication with a UE operating in an inactive state (e.g., events 304, 306, 312, 314). At block 1404, the RAN node(s) performs sequence numbering on SDU(s) with sequence number(s) 0, . . . , X–1 and generates a PDU for each of the SDU(s), including a particular SDU and a particular sequence number, where X is an integer and larger than 0 (e.g., events 304, 306, 312, 314). At block 1406, the RAN node(s) communicates the PDU(s), associated to a radio bearer, with the UE during the early data communication (e.g., events 304, 306, 312, 314). At block 1408, the RAN node(s) transitions the UE to a connected state from the inactive state (e.g., events 322, 324). At block 1410, the RAN node(s) performs sequence numbering on subsequent SDU(s) with sequence number(s) X, . . . , Y–1, and generates a PDU, for each of the subsequent SDU(s), including a particular SDU and a particular sequence number, where Y is an integer and larger than X (e.g., events 334, 336). At block 1412, the RAN node(s) communicates the subsequent PDU(s), associated to the radio bearer, with the UE operating in the connected state (e.g., events 334, 336). In some implementations, the PDU(s) can be PDCP PDU(s) or RLC PDU(s).

Figure 15:
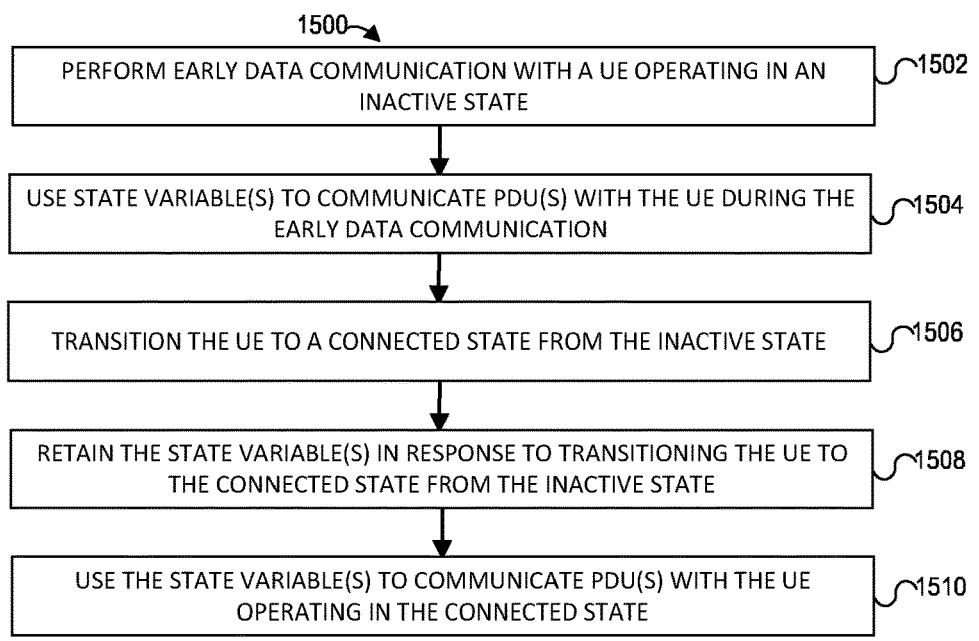
FIG. 15 is a flow diagram of an example method for managing communications from a UE during a state transition by retaining state variables used to communicate data packets in the inactive state when transitioning to the connected state, which can be implemented by the RAN of FIG. 1A.

FIG. 15 is a flow diagram of an example method 1500 for managing data communication before and after a state transition from the inactive state to the connected state, which can be implemented in one or more RAN nodes (e.g., CU 172, DU 174, base station 104 or RAN 105). This flow diagram uses state variables to track and (re)set and/or (re)establish RLC, MAC, and/or PDCP entities in accordance with any of FIGS. 4-6 after transitioning from an inactive state to the connected state. In contrast with the method 900 as shown in FIG. 9, in the method 900 the RAN nodes retain the state variables after the UE transitions to the connected state from the inactive state.

At block 1502, the RAN node(s) performs early data communication with a UE operating in an inactive state (e.g., events 304, 306, 312, 314). At block 1504, the network node uses state variables to communicate PDU(s) with the UE during the early data communication (e.g., events 304, 306, 312, 314). At block 1506, the RAN node(s) transitions the UE to a connected state from the inactive state (e.g., events 322, 324). At block 1508, the RAN node(s) retains (values of) the state variable(s) to initial value(s) in response to transitioning the UE to the connected state from the inactive state. At block 1510, the RAN node(s) uses the state variables to communicate PDU(s) with the UE operating in the connected state (e.g., events 334, 336, 335, 337). In some implementations, the PDU(s) can be PDCP PDU(s) or RLC PDU(s).

Figure 16:
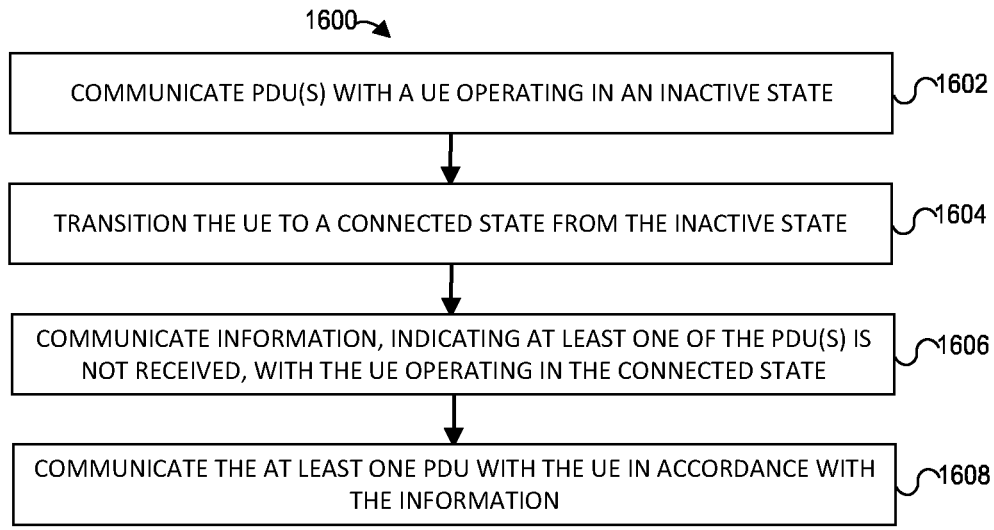
FIG. 16 is a flow diagram of an example method for managing communications from a UE during a state transition by receiving information indicating that at least one data packet was not received while the UE was in the inactive state, which can be implemented by the RAN of FIG. 1A.

FIG. 16 is a flow diagram of an example method 1600 for managing data communication before and after a state transition from the inactive state to the connected state, which can be implemented in one or more RAN nodes (e.g., CU 172, DU 174, base station 104 or RAN 105). In the method 1600, the UE fails to communicate an acknowledgment of PDU(s) transmitted by the RAN nodes while the UE was in the inactive state or communicates an indication that the UE did not receive at least one PDU transmitted by the RAN nodes while the UE was in the inactive state. Accordingly, the RAN nodes may retransmit the PDU(s) to the UE while the UE is in the connected state.

At block 1602, the RAN node(s) communicates PDU(s) with a UE operating in an inactive state (e.g., events 304, 306, 312, 314). At block 1604, the RAN node(s) transitions the UE to a connected state from the inactive state (e.g., events 322, 324). At block 1606, the RAN node(s) communicates information, indicating at least one of the PDU(s) is not received, with the UE operating in the connected state. At block 1608, the RAN node(s) communicates the at least one PDU with the UE in accordance with the information. In some implementations, the PDU(s) can be PDCP PDU(s) or RLC PDU(s). For example, the RAN node(s) (e.g., the base station 104, DU 174 or RAN 105) receives a RLC Status PDU including the information from the UE operating in the connected state. In another example, the RAN node(s) (e.g., the base station 104, CU 172 or RAN 105) receives a PDCP Control PDU including the information from the UE operating in the connected state. In yet another example, the RAN node(s) (e.g., the base station 104, CU 172 or RAN 105) receives a RRC message including the information from the UE operating in the connected state.

For example, the RAN node(s) (e.g., the base station 104, DU 174 or RAN 105) transmits a RLC Status PDU including the information to the UE operating in the connected state and receives the at least one of RLC PDU(s) from the UE transmitting the at least one of RLC PDU(s) in accordance with the RLC Status PDU. In another example, the RAN node(s) (e.g., the base station 104, CU 172 or RAN 105) transmits a PDCP Control PDU including the information to the UE operating in the connected state and receives the at least one of PDCP PDU(s) from the UE transmitting the at least one of PDCP PDU(s) in accordance with the PDCP Control PDU. In yet another example, the RAN node(s) (e.g., the base station 104, CU 172 or RAN 105) transmits a RRC message including the information from the UE operating in the connected state and receives the at least one of PDU(s) from the UE transmitting the at least one of PDU(s) in accordance with the RRC message.

Figure 17:
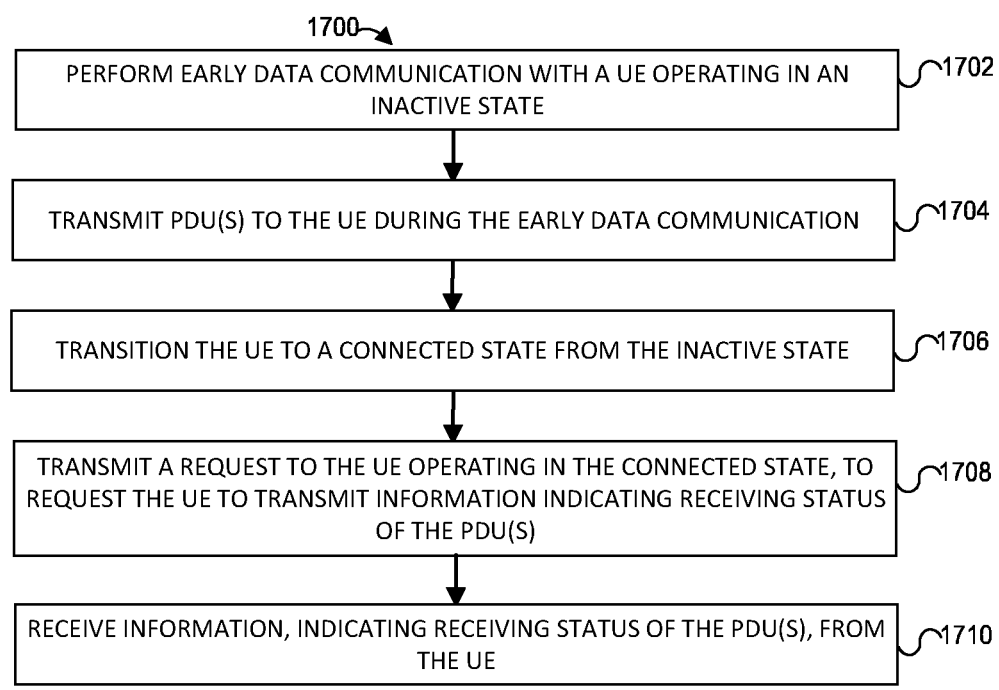
FIG. 17 is a flow diagram of an example method for managing communications from a UE during a state transition by transmitting a request to the UE for information indicating whether the data packets were received while the UE was in the inactive state, which can be implemented by the RAN of FIG. 1A.

FIG. 17 is a flow diagram of an example method 1700 for managing data communication before and after a state transition from the inactive state to the connected state, which can be implemented in one or more RAN nodes (e.g., CU 172, DU 174, base station 104 or RAN 105). The method 1700 includes additional or alternative steps to the method 1600 as shown in FIG. 16. In the method 1700, the RAN nodes transmit a request to the UE operating in the connected state, to request the UE to transmit information indicating the received status of PDU(s) transmitted while the UE was in the inactive state.

At block 1702, the RAN node(s) performs early data communication with a UE operating in an inactive state (e.g., events 304, 306, 312, 314). At block 1704, the RAN node(s) transmits PDU(s) to the UE during the early data communication (e.g., events 314). At block 1706, the RAN node(s) transitions the UE to a connected state from the inactive state (e.g., events 322, 324). At block 1708, the RAN node(s) transmits a request to the UE operating in the connected state, to request the UE to transmit information indicating receiving status of the PDU(s). In some implementations, the PDU(s) can be PDCP PDU(s) or RLC PDU(s). In some implementations, the request can be a PDU which includes a field or an IE requesting the UE to transmit the information. The PDU can be a RLC PDU, PDCP PDU or a RRC message. The RLC PDU can include a polling bit or can be a control PDU polling the UE to send the information.

Figure 18:
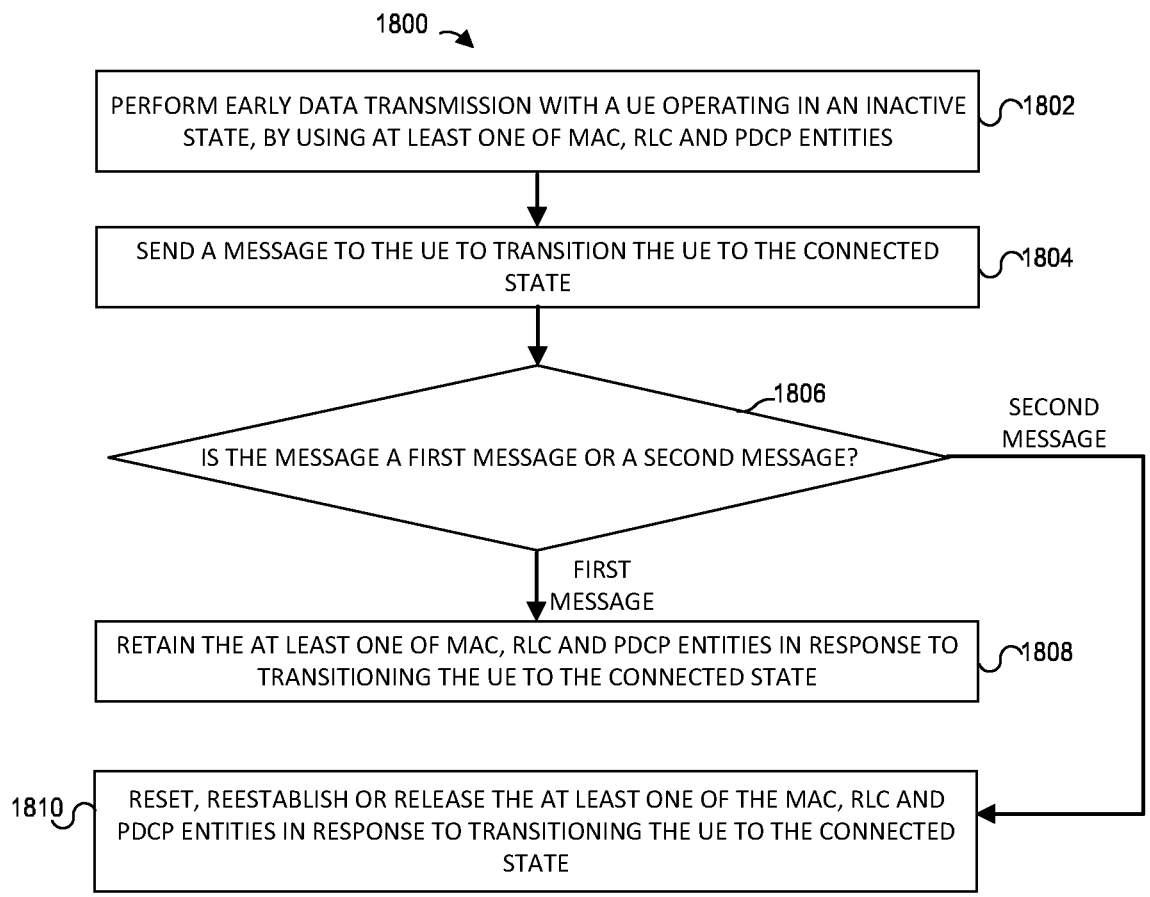
FIG. 18 is a flow diagram of an example method for managing communications from a UE during a state transition by retaining, resetting, reestablishing, or releasing a MAC entity, an RLC entity, and/or a PDCP entity in response to sending a first or second message to the UE, which can be implemented by the RAN of FIG. 1A.

FIG. 18 is a flow diagram of an example method 1800 for managing data communication before and after a state transition from the inactive state to the connected state, which can be implemented in one or more RAN nodes (e.g., CU 172, DU 174, base station 104 or RAN 105). In the method 1800, a first message (e.g., an RRC resume message) indicates to retain the MAC, RLC and PDCP entities, and a second message (e.g., an RRC setup message) indicates to reset, reestablish or release the MAC, RLC and PDCP entities in response to the UE transitioning to the connected state from the inactive state.

At block 1802, the RAN node(s) performs early data transmission with a UE operating in an inactive state, by using at least one of MAC, RLC and PDCP entities (e.g., events 304, 306, 312, 314). At block 1804, the RAN node(s) sends a message to the UE to transition the UE to the connected state (e.g., events 322, 324). At block 1806, the RAN node(s) determines to proceed to block 1808 or 1810. If the message is a first message, the RAN node(s) retains the at least one of MAC, RLC and PDCP entities in response to transitioning the UE to the connected state, at block 1808. If the message is a second message, the RAN node(s) resets, reestablishes or releases the at least one of MAC, RLC, and PDCP entities in response to transitioning the UE to the connected state (e.g., events 330, 342, 352). In cases of releasing the at least one of the MAC, RLC, or PDCP entities, the RAN node(s) can establish at least one of new MAC, RLC, or PDCP entities in response to transitioning the UE to the connected state. The first message may be an RRC resume message, and the second message may be an RRC setup message.

FIG. 19 is a flow diagram of an example method 1900 for managing data communication before and after a state transition from the inactive state to the connected state, which can be implemented in the UE 102.

At block 1902, the UE 102 operating in an inactive state performs early data communication with a base station 104 by using a MAC entity (e.g., events 304, 306, 312, 314). At block 1904, the UE 102 transitions to a connected state from the inactive state (e.g., events 322, 324). At block 1906, the UE 102 resets the MAC entity in response to transitioning to the connected state (e.g., event 330). At block 1908, the UE 102 operating in the connected state performs data communication with the base station 104 by using the reset MAC entity (e.g., events 334, 336, 335, 337).

FIG. 20 is a flow diagram of an example method 2000 for managing data communication before and after a state transition from the inactive state to the connected state, which can be implemented in the UE 102.

At block 2002, the UE 102 operating in an inactive state performs early data communication with the base station 104 by using a RLC entity (e.g., events 304, 306, 312, 314). At block 2004, the UE 102 transitions to a connected state from the inactive state (e.g., events 322, 324). At block 2006, the UE 102 reestablishes the RLC entity in response to transitioning to the connected state (e.g., event 330). At block 2008, the UE 102 operating in the connected state performs data communication with the base station 104 by using the reestablished RLC entity (e.g., events 334, 336, 335, 337).

FIG. 21 is a flow diagram of an example method 2100 for managing data communication before and after a state transition from the inactive state to the connected state, which can be implemented in the UE 102.

At block 2102, the UE 102 operating in an inactive state performs early data communication with the base station 104 by using a PDCP entity (e.g., events 304, 306, 312, 314). At block 2104, the UE 102 transitions to a connected state from the inactive state (e.g., events 322, 324). At block 2106, the UE 102 reestablishes the PDCP entity in response to transitioning to the connected state (e.g., event 342). At block 2108, the UE 102 operating in the connected state performs data communication with the base station 104 by using the reestablished PDCP entity (e.g., events 335, 337).

Figure 22:
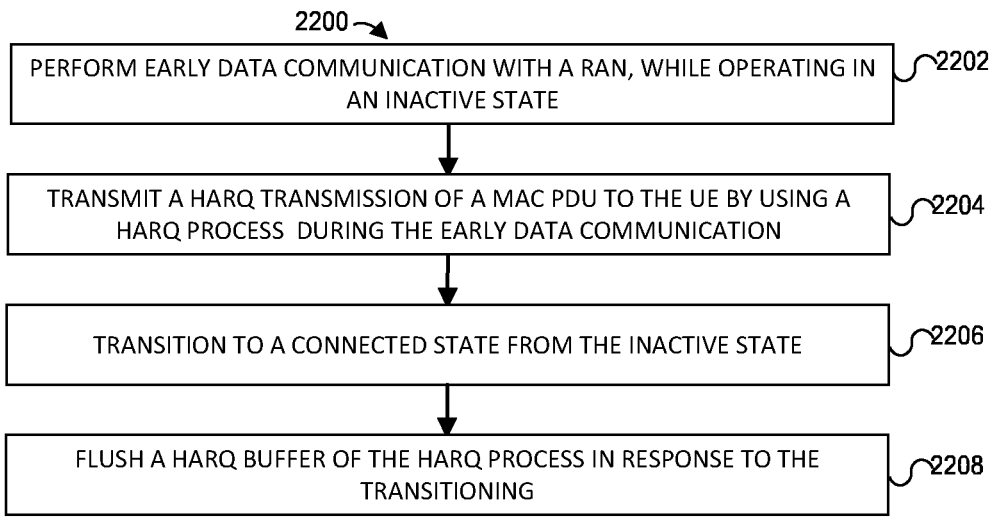
FIG. 22 is a flow diagram of an example method for data transmissions to a base station during a state transition by transmitting a HARQ transmission using a HARQ process number, which can be implemented by the UE of FIG. 1A.

FIG. 22 is a flow diagram of an example method 2200 for managing data communication before and after a state transition from the inactive state to the connected state, which can be implemented in the UE 102. In the method 2200, the UE flushes a HARQ buffer associated with a HARQ process number when the UE transitions to the connected state from the inactive state. In this manner, the HARQ process number resets so that a HARQ transmission associated with the HARQ process is scheduled as a new transmission.

At block 2202, the UE 102 operating in an inactive state performs early data communication with the base station 104 (e.g., events 304, 306, 312, 314). At block 2104, the UE 102 transmits a HARQ transmission to the base station 104 by using a HARQ process (number) during the early data communication (e.g., event 314). At block 2106, the UE 102 transitions to a connected state from the inactive state (e.g., events 322, 324). At block 2108, the UE 102 flushes a HARQ buffer associated with the HARQ process (number) in response to the transitioning. After flushing the HARQ buffer, the UE 102 operating in the connected state generates the next HARQ transmission associated with the HARQ process as a new transmission for the base station 104. In some implementations, the UE 102 receives a first DCI from the base station 104, scheduling the UE 102 to transmit the HARQ transmission at block 2204. The base station 104 receives the HARQ transmission at block 2204 in accordance with the first DCI. The UE 102 receives a second DCI from the base station 104, scheduling the UE 102 to transmit the next HARQ transmission after the UE transitions to the connected state. The base station 104 can include the same HARQ process number in the first DCI and second DCI. The base station 104 receives the next HARQ transmission in accordance with the second DCI.

In some implementations, the base station 104 uses a soft buffer associated with a HARQ process (number) to receive the HARQ transmission of the MAC PDU. The base station 104 flushes the soft buffer in response to the UE 102 transitioning to the connected state. After flushing the soft buffer, the base station 104 determines the next HARQ transmission associated with the HARQ process (number) as a new transmission. The base station 104 attempts to receive the UCI after the UE transitions to the connected state. In accordance with the second DCI, the base station receives the next HARQ transmission and determines the next HARQ transmission as a new transmission.

Figure 23:
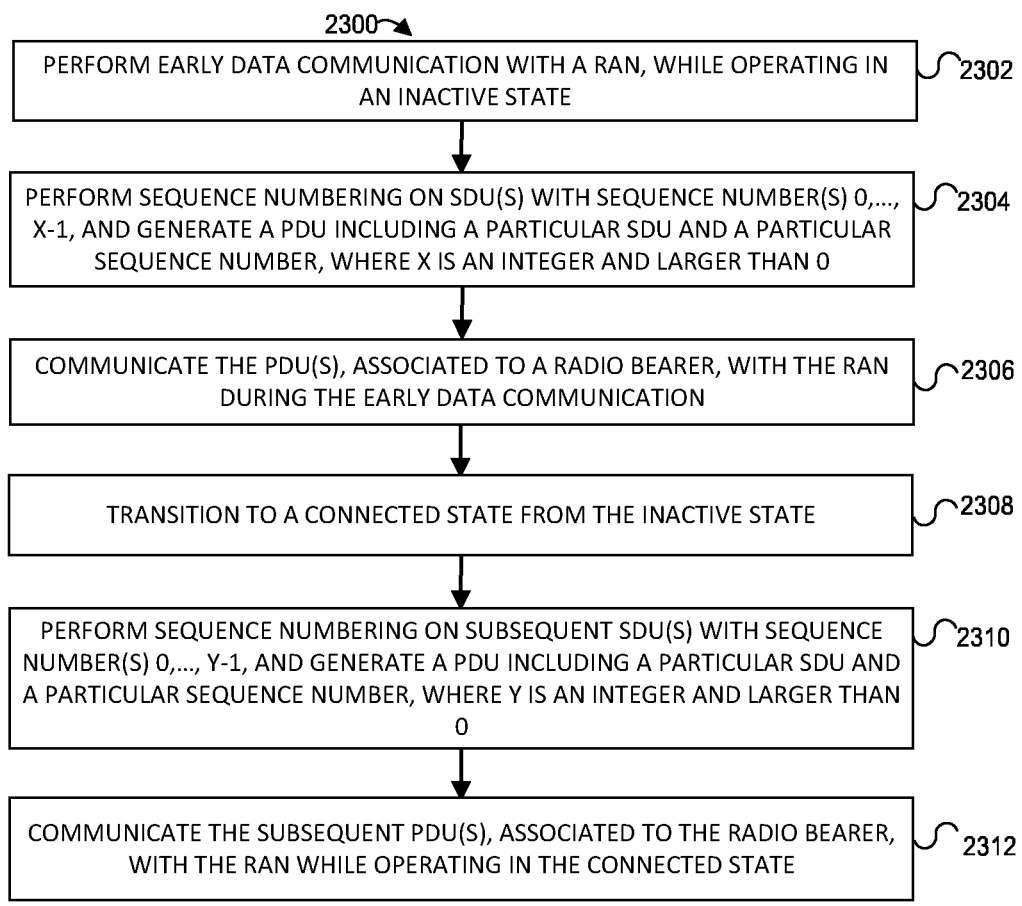
FIG. 23 is a flow diagram of an example method for data transmissions to a base station during a state transition by assigning a first set of sequence numbers (0, . . . , X−1) to packets transmitted in the inactive state and resetting the set of sequence numbers (0, . . . , Y–1) for packets transmitted in the connected state, which can be implemented by the UE of FIG. 1A.

FIG. 23 is a flow diagram of an example method 2300 for managing data communication before and after a state transition from the inactive state to the connected state, which can be implemented in the UE 102. In the example method 2300, the UE restarts sequence numbering for continuing UL PDCP PDUs associated with the same radio bearer after transitioning to the connected state as in FIG. 3B.

At block 2302, the UE 102 operating in an inactive state performs early data communication with a base station 104 (e.g., events 304, 306, 312, 314). At block 2304, the UE 102 performs sequence numbering on SDU(s) with sequence number(s) 0, . . . , X−1 and generates a PDU for each of the SDU(s), including a particular SDU and a particular sequence number, where X is an integer and larger than 0 (e.g., events 304, 306, 312, 314). At block 2306, the UE 102 communicates the PDU(s), associated to a radio bearer, with the base station 104 during the early data communication (e.g., events 304, 306, 312, 314). At block 2308, the UE 102 transitions to a connected state from the inactive state (e.g., events 322, 324). At block 2310, the UE 102 performs sequence numbering on subsequent SDU(s) with sequence number(s) 0, ..., Y−1, and generates a PDU, for each of the subsequent SDU(s), including a particular SDU and a particular sequence number, where Y is an integer and larger than 0 (e.g., events 335, 337). At block 2312, the UE 102 operating in the connected state communicates the subsequent PDU(s), associated to the radio bearer, with the base station 104 (e.g., events 335, 337). In some implementations, the PDU(s) can be PDCP PDU(s) or RLC PDU(s).

Figure 24:
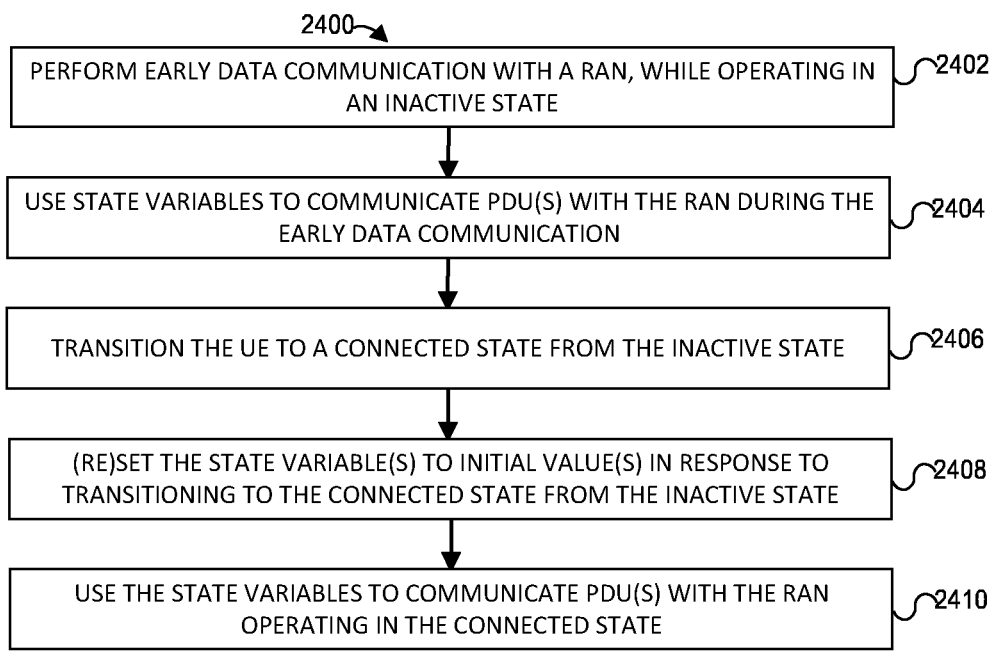
FIG. 24 is a flow diagram of an example method for data transmissions to a base station during a state transition by resetting state variables used to communicate data packets in the inactive state to their initial values when transitioning to the connected state, which can be implemented by the UE of FIG. 1A.

FIG. 24 is a flow diagram of an example method 2400 for managing data communication before and after a state transition from the inactive state to the connected state, which can be implemented in the UE 102. This flow diagram uses state variables to track and (re)set and/or (re)establish RLC, MAC, and/or PDCP entities in accordance with any of FIGS. 4-6 after transitioning from an inactive state to the connected state.

At block 2402, the UE 102 operating in an inactive state performs early data communication with a base station 104 (e.g., events 304, 306, 312, 314). At block 2404, the UE 102 uses state variables to communicate PDU(s) with the base station 104 during the early data communication (e.g., events 304, 306, 312, 314). At block 2406, the UE 102 transitions to a connected state from the inactive state (e.g., events 322, 324). At block 2408, the UE 102 (re)sets the state variable(s) to initial value(s) in response to transitioning to the connected state from the inactive state (e.g., events 330, 342). At block 2410, the UE 102 operating in the connected state uses the state variables to communicate PDU(s) with the base station 104 (e.g., events 334, 336, 335, 337). In some implementations, the PDU(s) can be PDCP PDU(s) or RLC PDU(s).

FIG. 25 is a flow diagram of an example method 2500 for managing data communication before and after a state transition from the inactive state to the connected state, which can be implemented in the UE 102.

At block 2502, the UE 102 operating in an inactive state performs early data communication with a base station 104 by using a MAC entity (e.g., events 304, 306, 312, 314). At block 2504, the UE 102 transitions to a connected state from the inactive state (e.g., events 322, 324). At block 2506, the UE 102 refrains from resetting the MAC entity in response to transitioning to the connected state. At block 2508, the UE 102 operating in the connected state performs data communication with the base station 104 by using the MAC entity (e.g., events 334, 336, 335, 337).

FIG. 26 is a flow diagram of an example method 2600 for managing data communication before and after a state transition from the inactive state to the connected state, which can be implemented in the UE 102.

At block 2602, the UE 102 operating in an inactive state performs early data communication with a base station 104 by using a RLC entity (e.g., events 304, 306, 312, 314). At block 2604, the UE 102 transitions to a connected state from the inactive state (e.g., events 322, 324). At block 2606, the UE 102 refrains from reestablishing the RLC entity in response to transitioning to the connected state. At block 2608, the UE 102 operating in the connected state performs data communication with the base station 104 by using the RLC entity (e.g., events 334, 336, 335, 337).

FIG. 27 is a flow diagram of an example method 2700 for managing data communication before and after a state transition from the inactive state to the connected state, which can be implemented in the UE 102.

At block 2702, the UE 102 operating in an inactive state performs early data communication with a base station 104 by using a PDCP entity (e.g., events 304, 306, 312, 314). At block 2704, the UE 102 transitions to a connected state from the inactive state (e.g., events 322, 324). At block 2706, the UE 102 refrains from reestablishing the PDCP entity in response to transitioning to the connected state. At block 2708, the UE 102 operating in the connected state performs data communication with the base station 104 by using the PDCP entity (e.g., events 334, 336).

Figure 28A:
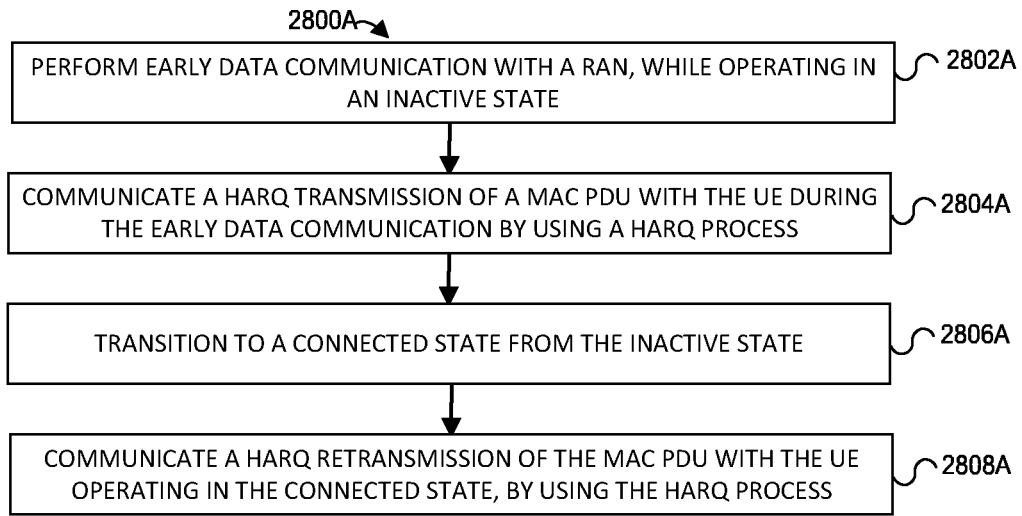
FIGS. 28A-28B are flow diagrams of example methods for data transmissions to a base station during a state transition by transmitting a HARQ transmission using a HARQ process number, which can be implemented by the UE of FIG. 1A.

FIG. 28A is a flow diagram of an example method 2800A for managing data communication before and after a state transition from the inactive state to the connected state, which can be implemented in the UE 102. In contrast to the method 2200 in FIG. 22, in the method 2800A the UE communicates a HARQ retransmission of the MAC PDU after the UE transitions to the connected state from the inactive state, rather than a new HARQ transmission.

At block 2802A, the UE 102 operating in an inactive state performs early data communication with the base station 104 (e.g., events 304, 306, 312, 314). At block 2804A, the UE 102 communicates a HARQ transmission of a MAC PDU with the base station 104 during the early data communication by using a HARQ process (number) (e.g., events 304, 306, 312, 314). At block 2806A, the UE 102 transitions to a connected state from the inactive state (e.g., events 322, 324). At block 2808A, the UE 102 operating in the connected state communicates a HARQ retransmission of the MAC PDU with the base station 104, by using the HARQ process (number).

In some implementations, the UE 102 receives a first DCI from the base station 104, scheduling the UE 102 to transmit the HARQ transmission at block 2804A. The base station 104 receives the HARQ transmission at block 2808A in accordance with the first DCI. The UE 102 receives a second DCI from the base station 104, scheduling the UE 102 to transmit the HARQ retransmission at block 2808A after the UE transitions to the connected state. The base station 104 can include the same HARQ process number in the first DCI and second DCI. The base station 104 receives the HARQ retransmission in accordance with the second DCI. The base station 104 can include the same NDI (value) in the first DCI and second DCI.

In other implementations, the UE 102 receives a first DCI from the base station 104, scheduling the UE 102 to receive the HARQ transmission at block 2804A. The base station 104 transmits the HARQ transmission to the UE 102 at block 2808A in accordance with the first DCI. The UE 102 receives a second DCI from the base station 104, scheduling the UE 102 to receive the HARQ retransmission at block 2808A after the UE transitions to the connected state. The base station 104 can include the same HARQ process number in the first DCI and second DCI. The base station 104 transmits the HARQ retransmission to the UE 102 in accordance with the second DCI. The base station 104 can include the same new data indicator (NDI) (value) in the first DCI and second DCI.

Figure 28B:
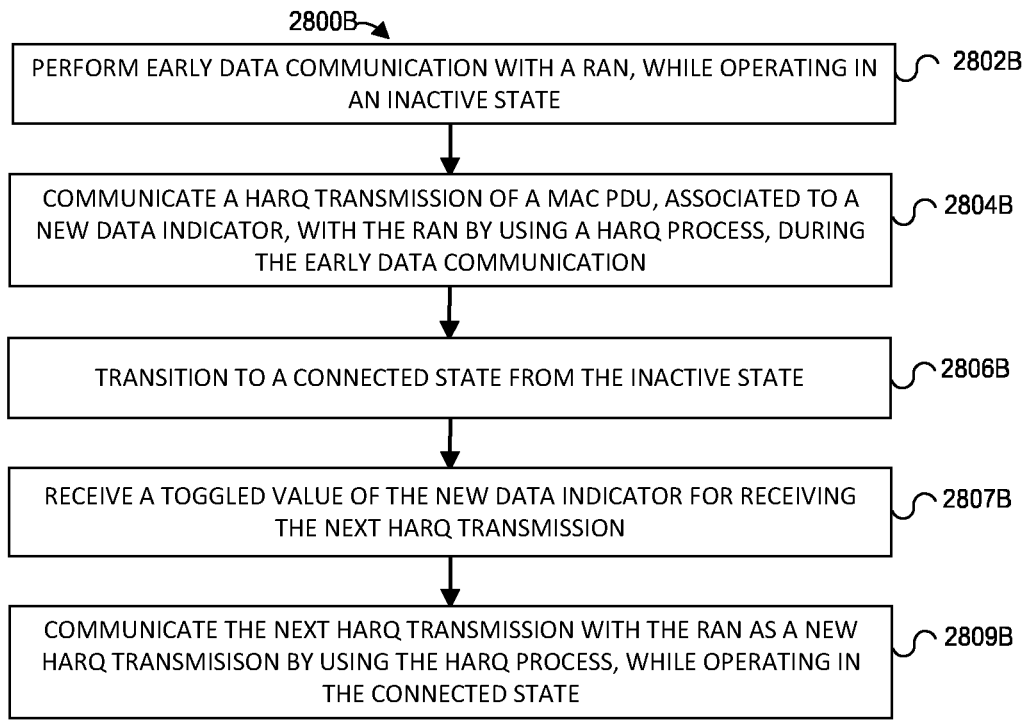

FIG. 28B is a flow diagram of an example method 2800B for managing data communication before and after a state transition from the inactive state to the connected state, which can be implemented in the UE 102. In the method 2800B the UE receives a toggled value of an NDI for a next HARQ retransmission associated with a HARQ process number after the UE transitions to the connected state from the inactive state, rather than using a different HARQ process number.

At block 2802B, the UE 102 operating in an inactive state performs early data communication with the base station 104 (e.g., events 304, 306, 312, 314). At block 2804B, the UE 102 communicates a HARQ transmission of a MAC PDU with the base station 104 during the early data communication by using a HARQ process (number) (e.g., events 304, 306, 312, 314). At block 2806B, the UE 102 transitions to a connected state from the inactive state (e.g., events 322, 324). At block 2807B, the UE 102 receives a toggled value for the new data indicator for the next HARQ transmission associated to the HARQ process (number) with the UE after transitioning to the connected state. At block 2809B, the UE 102 operating in the connected state communicates the next HARQ transmission with the base station 104 as a new HARQ transmission in accordance with the toggled value of the new data indicator, by using the HARQ process (number) (e.g., events 334, 336, 335, 337).

Figure 29:
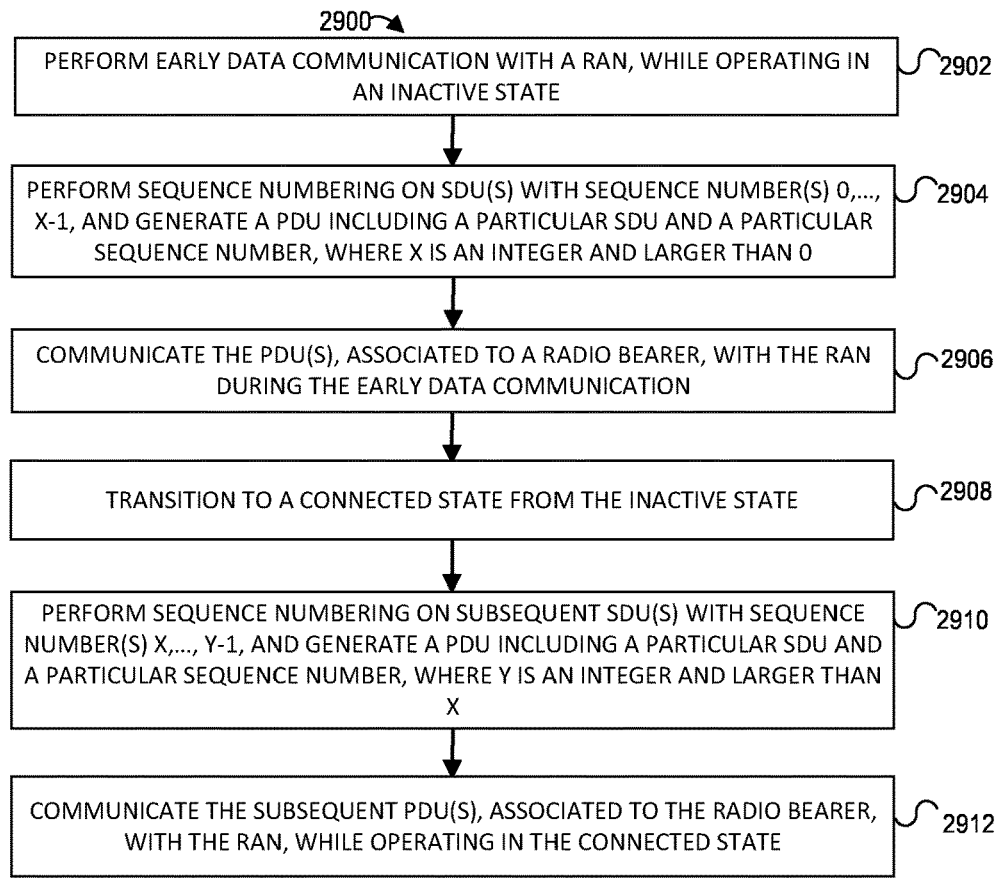
FIG. 29 is a flow diagram of an example method for data transmissions to a base station during a state transition by assigning a first set of sequence numbers (0, . . . , X–1) to packets transmitted in the inactive state and a second set of sequence numbers (X, . . . , Y–1) for packets transmitted in the connected state, where the second set of sequence numbers begin from the number (X) after the last number (X–1) in the first set of sequence numbers, which can be implemented by the UE of FIG. 1A.

FIG. 29 is a flow diagram of an example method 2900 for managing data communication before and after a state transition from the inactive state to the connected state, which can be implemented in the UE 102. In the example method 2900, the UE continues sequence numbering using the number after the last sequence number used for UL PDCP PDUs while the UE was in the inactive state for UL PDCP PDUs associated with the same radio bearer after transitioning to the connected state as in FIG. 3A. This is in contrast to the method 2300 as shown in FIG. 23 where the UE restarts the sequence numbers when the UE transitions to the connected state from the inactive state.

At block 2902, the UE 102 operating in an inactive state performs early data communication with the base station 104 (e.g., events 304, 306, 312, 314). At block 2904, the UE 102 performs sequence numbering on SDU(s) with sequence number(s) 0, ..., X−1 and generates a PDU for each of the SDU(s), including a particular SDU and a particular sequence number, where X is an integer and larger than 0 (e.g., events 304, 306, 312, 314). At block 2906, the UE 102 communicates the PDU(s), associated to a radio bearer, with the base station 104 during the early data communication (e.g., events 304, 306, 312, 314). At block 2908, the UE 102 transitions to a connected state from the inactive state (e.g., events 322, 324). At block 2910, the UE 102 performs sequence numbering on subsequent SDU(s) with sequence number(s) X, ..., Y−1, and generates a PDU, for each of the subsequent SDU(s), including a particular SDU and a particular sequence number, where Y is an integer and larger than X (e.g., events 334, 336). At block 2912, the UE 102 operating in the connected state communicates the subsequent PDU(s), associated to the radio bearer, with the base station 104 (e.g., events 334, 336). In some implementations, the PDU(s) can be PDCP PDU(s) or RLC PDU(s).

Figure 30:
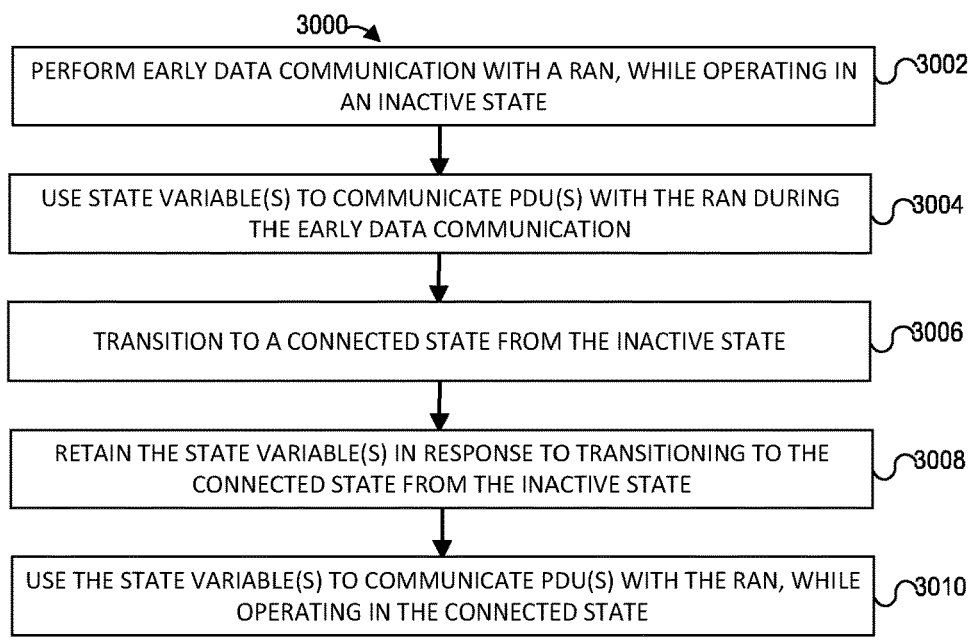
FIG. 30 is a flow diagram of an example method for data transmissions to a base station during a state transition by retaining state variables used to communicate data packets in the inactive state when transitioning to the connected state, which can be implemented by the UE of FIG. 1A.

FIG. 30 is a flow diagram of an example method 3000 for managing data communication before and after a state transition from the inactive state to the connected state, which can be implemented in the UE 102. This flow diagram uses state variables to track and (re)set and/or (re)establish RLC, MAC, and/or PDCP entities in accordance with any of FIGS. 4-6 after transitioning from an inactive state to the connected state. In contrast with the method 2400 as shown in FIG. 24, in the method 900 the UE retains the state variables after the UE transitions to the connected state from the inactive state.

At block 3002, the UE 102 operating in an inactive state performs early data communication with the base station 104 (e.g., events 304, 306, 312, 314). At block 3004, the UE 102 uses state variables to communicate PDU(s) with the base station 104 during the early data communication (e.g., events 304, 306, 312, 314). At block 3006, the UE 102 transitions to a connected state from the inactive state (e.g., events 322, 324). At block 3008, the UE 102 retains (values of) the state variable(s) in response to transitioning to the connected state from the inactive state. At block 3010, the UE 102 operating in the connected state uses the state variables to communicate PDU(s) with the base station 104 (e.g., events 334, 336, 335, 337). In some implementations, the PDU(s) can be PDCP PDU(s) or RLC PDU(s).

Figure 31:
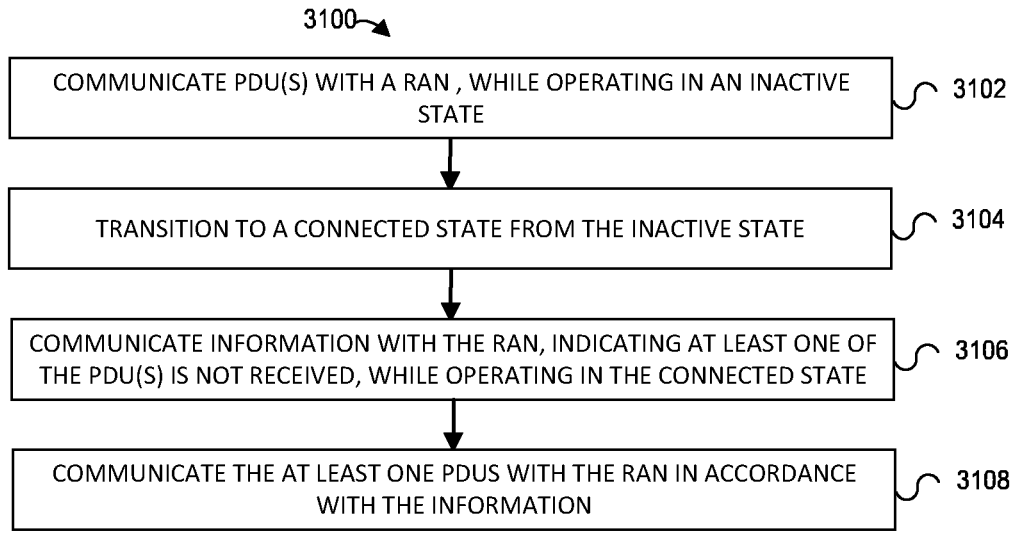
FIG. 31 is a flow diagram of an example method for data transmissions to a base station during a state transition by receiving information indicating that at least one data packet was not received while the UE was in the inactive state, which can be implemented by the UE of FIG. 1A.

FIG. 31 is a flow diagram of an example method 3100 for managing data communication before and after a state transition from the inactive state to the connected state, which can be implemented in the UE 102. In the method 3100, the RAN fails to communicate an acknowledgment of PDU(s) transmitted by the UE while the UE was in the inactive state or communicates an indication that the RAN did not receive at least one PDU transmitted by the UE while the UE was in the inactive state. Accordingly, the UE may retransmit the PDU(s) to the RAN while the UE is in the connected state.

At block 3102, the UE 102 operating in an inactive state communicates PDU(s) with the base station 104 (e.g., events 304, 306, 312, 314). At block 3104, the UE 102 transitions to a connected state from the inactive state (e.g., events 322, 324). At block 3106, the UE 102 operating in the connected state communicates information, indicating at least one of the PDU(s) is not received, with the base station 104. At block 3108, the UE 102 communicates the at least one PDU with the base station 104 in accordance with the information. In some implementations, the PDU(s) can be PDCP PDU(s) or RLC PDU(s). For example, the UE 102 operating in the connected state receives a RLC Status PDU including the information from the base station 104 and transmits the at least one of RLC PDU(s) to the base station 104 in accordance with the RLC Status PDU. In another example, the UE 102 operating in the connected state receives a PDCP Control PDU including the information from the base station 104, and transmits the at least one of PDCP PDU(s) to the base station 104 in accordance with the PDCP Control PDU. In yet another example, the UE 102 operating in the connected state receives a RRC message including the information from the base station 104, and transmits the at least one of PDU(s) to the base station 104 in accordance with the RRC message.

For example, the UE 102 operating in the connected state transmits a RLC Status PDU including the information to the base station 104 and receives the at least one of RLC PDU(s) from the base station 104 transmitting the at least one of RLC PDU(s) in accordance with the RLC Status PDU. In another example, the UE 102 operating in the connected state transmits a PDCP Control PDU including the information from the base station 104, and receives the at least one of PDCP PDU(s) from the base station 104 transmitting the at least one of PDCP PDU(s) in accordance with the PDCP Control PDU. In yet another example, the UE 102 operating in the connected state transmits a RRC message including the information from the base station 104, and receives the at least one of PDU(s) from the base station 104 transmitting the at least one of PDU(s) in accordance with the RRC message.

Figure 32:
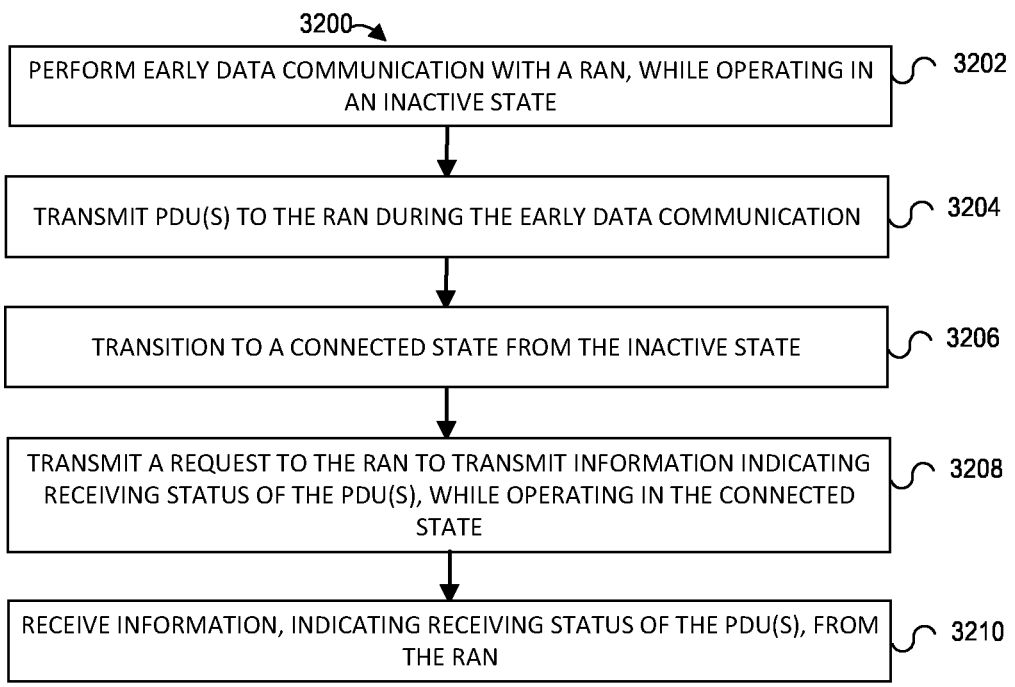
FIG. 32 is a flow diagram of an example method for data transmissions to a base station during a state transition by transmitting a request to the base station for information indicating whether the data packets were received while the UE was in the inactive state, which can be implemented by the UE of FIG. 1A.

FIG. 32 is a flow diagram of an example method 3200 for managing data communication before and after a state transition from the inactive state to the connected state, which can be implemented in the UE 102. The method 3200 includes additional or alternative steps to the method 3100 as shown in FIG. 31. In the method 3200, the UE transmits a request to the RAN operating in the connected state, to request the RAN to transmit information indicating the received status of PDU(s) transmitted while the UE was in the inactive state.

At block 3202, the UE 102 operating in an inactive state performs early data communication with the base station 104 (e.g., events 304, 306, 312, 314). At block 3404, the UE 102 transmits PDU(s) to the base station 104 during the early data communication (e.g., events 314). At block 3206, the UE 102 transitions to a connected state from the inactive state (e.g., events 322, 324). At block 3208, the UE 102 operating in the connected state transmits a request to the base station 104, to request the base station 104 to transmit information indicating a received status of the PDU(s). In some implementations, the PDU(s) can be PDCP PDU(s) or RLC PDU(s). In some implementations, the request can be a PDU which includes a field or an IE requesting the base station 104 to transmit the information. The PDU can be a RLC PDU, PDCP PDU or a RRC message. The PDU can include a polling bit or can be a control PDU polling the UE to send the information.

Figure 33:
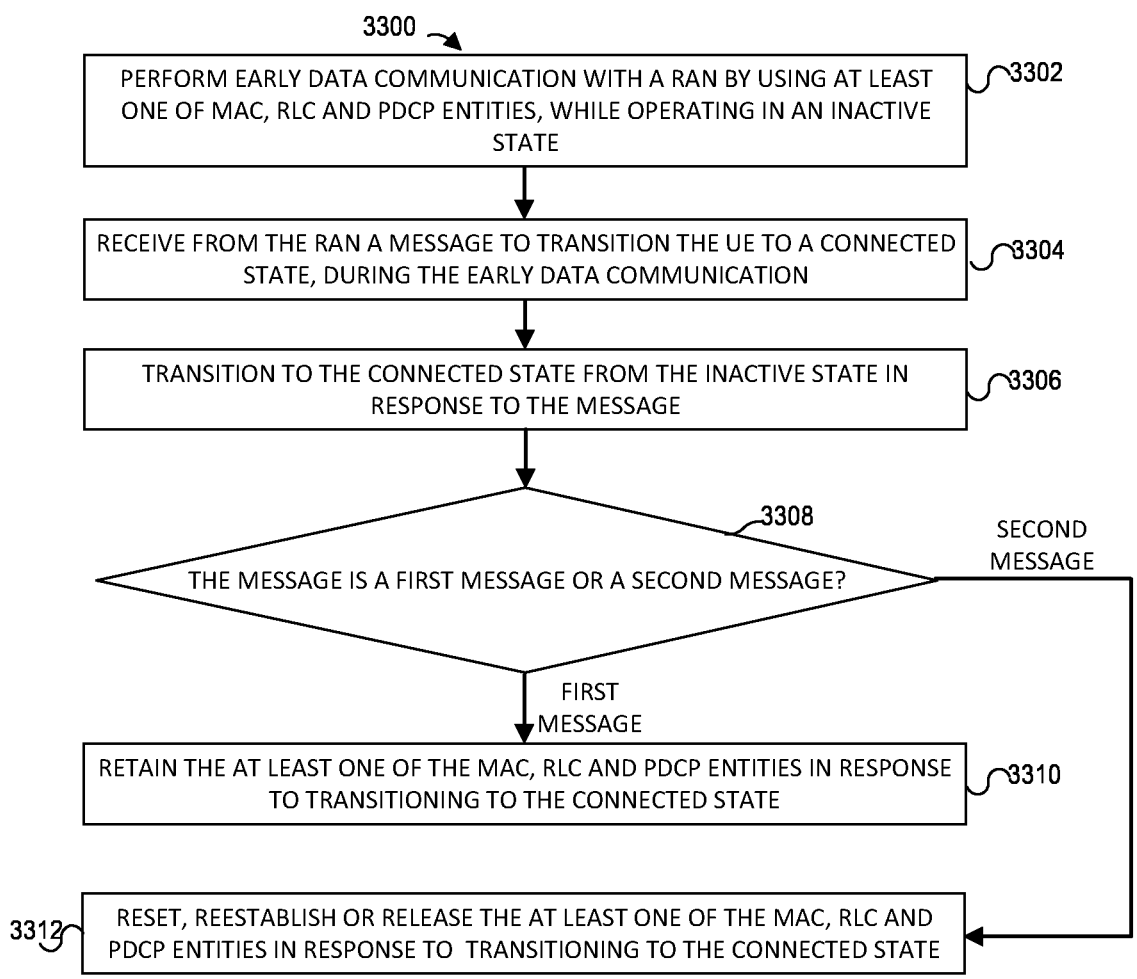
FIG. 33 is a flow diagram of an example method for data transmissions to a base station during a state transition by retaining, resetting, reestablishing, or releasing a MAC entity, an RLC entity, and/or a PDCP entity in response to receiving a first or second message from the base station, which can be implemented by the UE of FIG. 1A.

FIG. 33 is a flow diagram of an example method 3300 for managing data communication before and after a state transition from the inactive state to the connected state, which can be implemented in the UE 102. In the method 3300, a first message (e.g., an RRC resume message) indicates to retain the MAC, RLC and PDCP entities, and a second message (e.g., an RRC setup message) indicates to reset, reestablish or release the MAC, RLC and PDCP entities in response to the UE transitioning to the connected state from the inactive state.

At block 3302, the UE 102 operating in an inactive state performs early data transmission with the base station 104, by using at least one of MAC, RLC and PDCP entities (e.g., events 304, 306, 312, 314). At block 3304, the UE 102 receives a message from the base station 104 to transition to the connected state (e.g., events 322, 324). At block 3306, the UE transitions to the connected state (e.g., event 326). At block 3308, the UE 102 determines to proceed to block 3310 or 3312. If the message is a first message, the UE 102 retains the at least one of the MAC, RLC or PDCP entities in response to transitioning to the connected state, at block 3310. If the message is a second message, the UE 102 resets, reestablishes or releases the at least one of the MAC, RLC, or PDCP entities in response to transitioning to the connected state (e.g., events 330, 342, 352). In cases of releasing the at least one of the MAC, RLC, or PDCP entities, the UE 102 can establish at least one of new MAC, RLC, or PDCP entities in response to transitioning to the connected state. The first message may be an RRC resume message, and the second message may be an RRC setup message.

Figure 34:
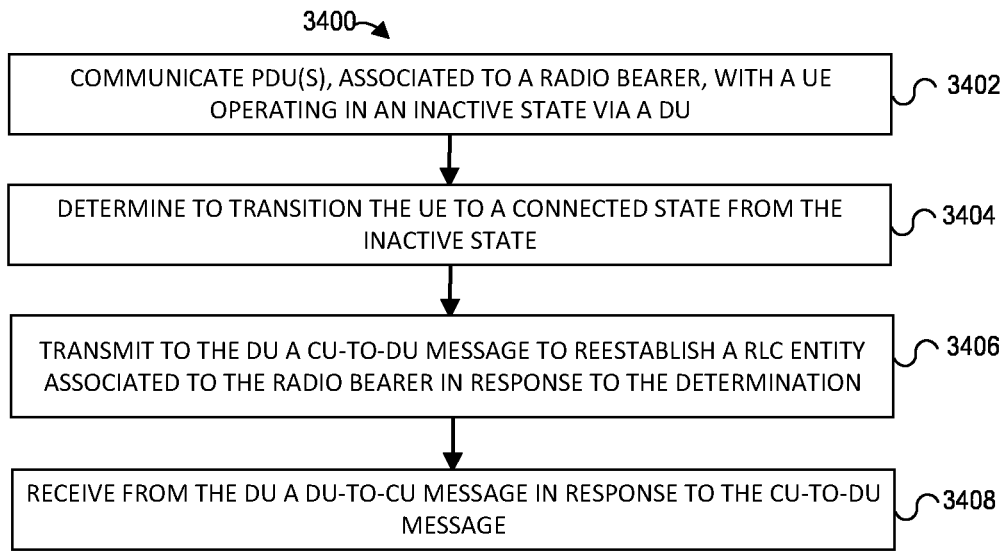
FIG. 34 is a flow diagram of an example method for managing communications from a UE during a state transition by transmitting a message to the DU to reestablish an RLC entity, which can be implemented by the CU of FIG. 1B.

FIG. 34 is a flow diagram of an example method 3400 for managing data communication before and after a state transition from the inactive state to the connected state, which can be implemented in a CU 172. In the method 3400, the CU 172 triggers the DU to reestablish an RLC entity.

At block 3402, the CU 172 communicates PDU(s) associated with a radio bearer with a UE 102 operating in an inactive state via a DU 174 (e.g., events, 304, 306, 312, 314). The PDU(s) may be PDCP PDU(s). At block 3404, the CU 172 determines to transition the UE 102 to a connected state from the inactive state (e.g., event 316). At block 3406, the CU 172 transmits a CU-to-DU message to the DU 174 to reestablish an RLC entity associated with the radio bearer in response to the determination (e.g., event 318). In some implementations, the CU 172 can include an indication in the CU-to-DU message to cause the DU 174 to reestablish the RLC entity. Then at block 3408, the CU 172 receives a DU-to-CU message from the DU 174 in response to the CU-to-DU message (e.g., event 320). For example, the CU-to-DU message may be a UE Context Modification Request message and the DU-to-CU message may be a UE Context Modification Response message.

Figure 35:
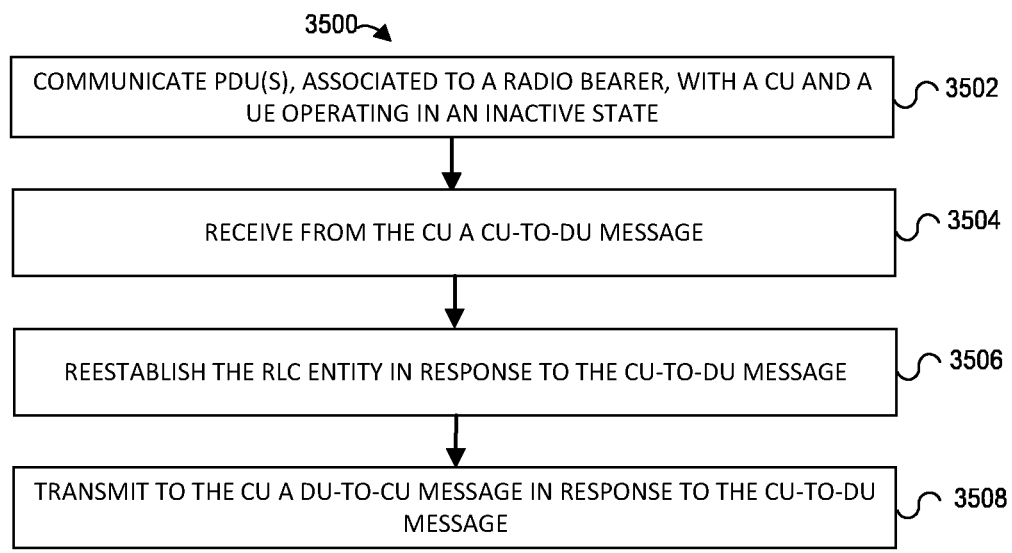
FIG. 35 is a flow diagram of an example method for managing communications from a UE during a state transition by reestablishing an RLC entity, which can be implemented by the DU of FIG. 1B.

FIG. 35 is a flow diagram of an example method 3500 for managing data communication before and after a state transition from the inactive state to the connected state, which can be implemented in a DU 174.

At block 3502, the DU 174 communicates PDU(s) associated with a radio bearer with a CU 172 and a UE 102 operating in an inactive state (e.g., events, 304, 306, 312, 314). The PDU(s) may be PDCP PDU(s). At block 3504, the DU receives a CU-to-DU message from the CU 172 (e.g., event 318). In some implementations, the CU-to-DU message can include an indication to cause the DU 174 to reestablish the RLC entity. At block 3506, the DU 174 reestablishes the RLC entity in response to the CU-to-DU message (e.g., event 330). At block 3508, the DU 174 transmits a DU-to-CU message to the CU 172 in response to the CU-to-DU message (e.g., event 320). For example, the CU-to-DU message may be a UE Context Modification Request message and the DU-to-CU message may be a UE Context Modification Response message.

Figure 36:
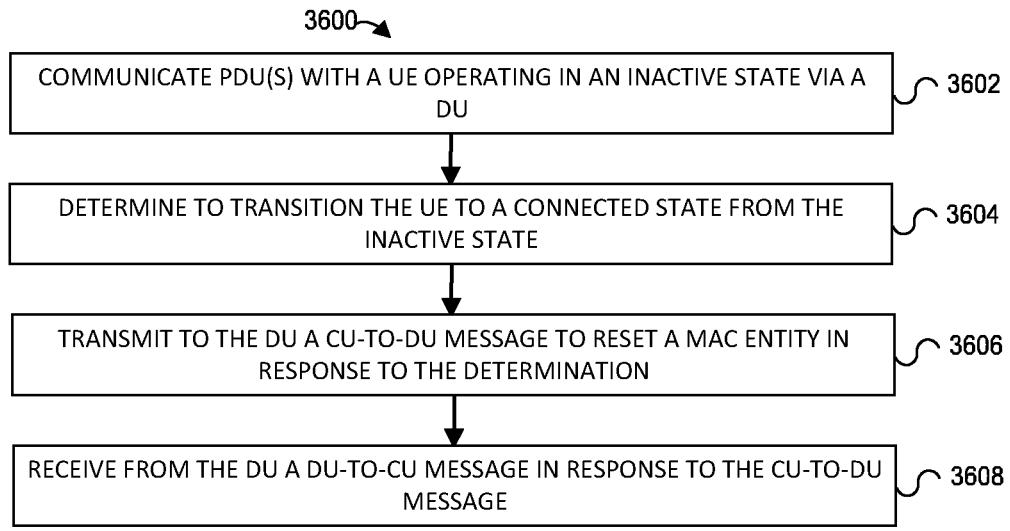
FIG. 36 is a flow diagram of an example method for managing communications from a UE during a state transition by transmitting a message to the DU to reset a MAC entity, which can be implemented by the CU of FIG. 1B.

FIG. 36 is a flow diagram of an example method 3600 for managing data communication before and after a state transition from the inactive state to the connected state, which can be implemented in a CU 172. In the method 3600, the CU 172 triggers the DU to reset a MAC entity.

At block 3602, the CU 172 communicates PDU(s) with a UE 102 operating in an inactive state via a DU 174 (e.g., events, 304, 306, 312, 314). The PDU(s) may be PDCP PDU(s). At block 3604, the CU 172 determines to transition the UE 102 to a connected state from the inactive state (e.g., event 316). At block 3606, the CU 172 transmits a CU-to-DU message to the DU 174 to reset a MAC entity in response to the determination (e.g., event 318). In some implementations, the CU 172 can include an indication in the CU-to-DU message to cause the DU 174 to reset the MAC entity. Then at block 3608, the CU 172 receives a DU-to-CU message from the DU 174 in response to the CU-to-DU message (e.g., event 320). For example, the CU-to-DU message may be a UE Context Modification Request message and the DU-to-CU message may be a UE Context Modification Response message.

Figure 37:
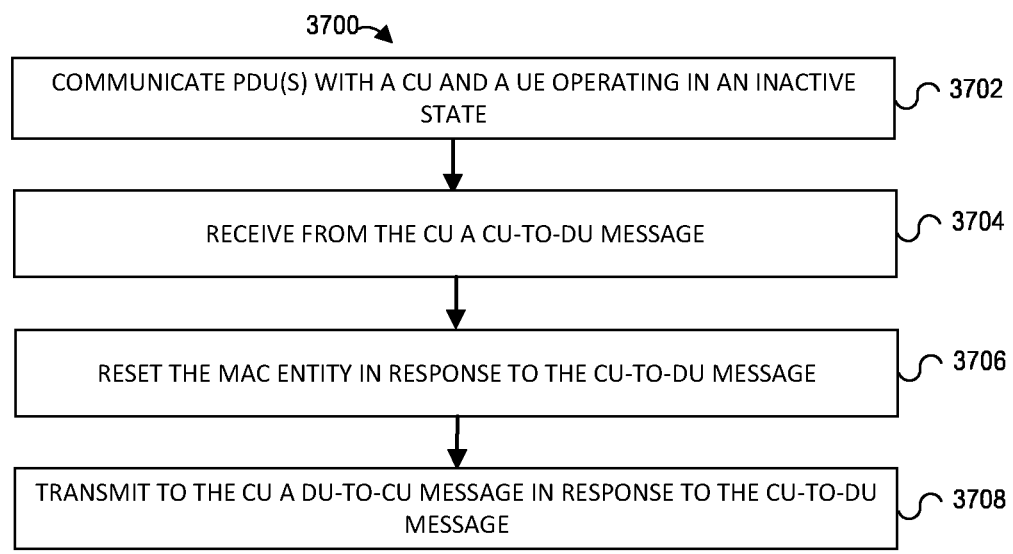
FIG. 37 is a flow diagram of an example method for managing communications from a UE during a state transition by resetting a MAC entity, which can be implemented by the DU of FIG. 1B.

FIG. 37 is a flow diagram of an example method 3700 for managing data communication before and after a state transition from the inactive state to the connected state, which can be implemented in a DU 174.

At block 3702, the DU 174 communicates PDU(s) associated with a radio bearer with a CU 172 and a UE 102 operating in an inactive state (e.g., events, 304, 306, 312, 314). The PDU(s) may be PDCP PDU(s). At block 3704, the DU receives a CU-to-DU message from the CU 172 (e.g., event 318). In some implementations, the CU-to-DU message can include an indication to cause the DU 174 to reset the MAC entity. At block 3706, the DU 174 resets the MAC entity in response to the CU-to-DU message (e.g., event 330). At block 3708, the DU 174 transmits a DU-to-CU message to the CU 172 in response to the CU-to-DU message (e.g., event 320). For example, the CU-to-DU message may be a UE Context Modification Request message and the DU-to-CU message may be a UE Context Modification Response message.

Figure 38:
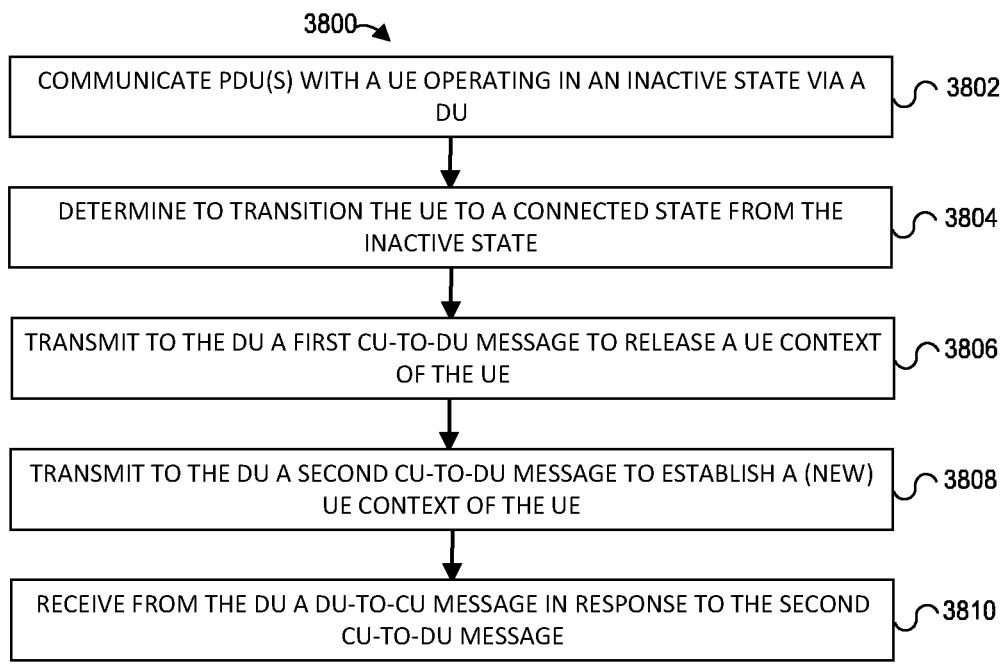
FIG. 38 is a flow diagram of an example method for managing communications from a UE during a state transition by transmitting a message to the DU to release UE context information for the UE, which can be implemented by the CU of FIG. 1B.

FIG. 38 is a flow diagram of an example method 3800 for managing data communication before and after a state transition from the inactive state to the connected state, which can be implemented in a CU 172. In the method 3800, the CU 172 instructs the DU 174 to release the UE Context for the UE. In this manner, the DU 174 releases the resources configured for the UE including the protocol entities, such as the RLC, MAC, and PDCP entities.

At block 3802, the CU 172 communicates PDU(s) with a UE 102 operating in an inactive state via a DU 174 (e.g., events, 304, 306, 312, 314). The PDU(s) may be PDCP PDU(s). At block 3804, the CU 172 determines to transition the UE 102 to a connected state from the inactive state (e.g., event 316). At block 3806, the CU 172 transmits a first CU-to-DU message to the DU 174 to release a UE Context of the UE 102 (e.g., event 318). At block 3810, the CU 172 transmits a second CU-to-DU message to the DU 174 to establish a new UE Context of the UE 102. Then at block 3810, the CU 172 receives a DU-to-CU message from the DU 174 in response to the second CU-to-DU message (e.g., event 320). For example, the first and second CU-to-DU messages may be UE Context Release Command messages and the DU-to-CU message may be a UE Context Setup Request message.

The following list of examples reflects additional embodiments explicitly contemplated by the present disclosure Example 1

A method in a central unit (CU) of a base station for managing communications from a UE during a state transition, the method comprising: performing, by processing hardware, an early data transmission procedure with the UE while the UE is in an inactive state, including transmitting at least one data packet of a sequence of data packets to the UE; determining, by the processing hardware, to transition the UE from the inactive state to a connected state; and in response to transitioning the UE to the connected state: transmitting, by the processing hardware, a next data packet in the sequence of data packets to the UE, or retransmitting, by the processing hardware, the at least one data packet to the UE in response to failing to determine the at least one data packet has been received.

Example 2

The method according to example 1, wherein performing the early data transmission procedure includes performing, by the processing hardware, the early data transmission procedure using a packet data convergence protocol (PDCP) entity, and further comprising: reestablishing, by the processing hardware, the PDCP entity in response to transitioning the UE to the connected state.

Example 3

The method according to any of the preceding examples, wherein the next data packet is transmitted or the at least one data packet is retransmitted using the reestablished PDCP entity.

Example 4

The method according to any of the preceding examples, further comprising: assigning, by the processing hardware, at least one sequence number to the at least one data packet; and resetting, by the processing hardware, sequence numbering for the next data packet in response to reestablishing the PDCP entity.

Example 5

The method according to any of the preceding examples, wherein performing an early data transmission procedure with the UE includes: receiving, by the processing hardware, an RRC message without an initial data packet from the UE via the DU; and receiving, by the processing hardware, data packets from the UE via the DU having sequence numbers including an initial sequence number.

Example 6

The method according to any of the preceding examples, wherein transmitting the at least one data packet to the UE includes transmitting, by the processing hardware, the at least one data packet to the UE via a distributed unit (DU) of the base station.

Example 7

The method according to any of the preceding examples, further comprising: in response to determining to transition the UE from the inactive state to the connected state, transmitting, by the processing hardware, a UE context request message to a DU of the base station to obtain a radio configuration for the UE; receiving, by the processing hardware from the DU, a UE context response including the radio configuration for the UE; and transmitting, by the processing hardware, a radio resource control (RRC) resume message to the UE via the DU.

Example 8

The method according to any of the preceding examples, further comprising: in response to determining to transition the UE from the inactive state to the connected state, transmitting, by the processing hardware, a UE context request message to a DU of the base station to obtain a radio configuration for the UE; receiving, by the processing hardware from the DU, a UE context response including the radio configuration for the UE; and transmitting, by the processing hardware, a radio resource control (RRC) setup message to the UE via the DU.

Example 9

The method according to any of the preceding examples, wherein the UE context request message triggers the DU to reestablish a Radio Link Control (RLC) entity.

Example 10

The method according to any of the preceding examples, wherein the UE context request message triggers the DU to reset a Media Access Control (MAC) entity.

Example 11

The method according to any of the preceding examples, wherein the UE context request message is a first UE context request message that causes the DU to release a UE context, and further comprising: transmitting, by the processing hardware, a second UE context request message to establish a new UE context for the UE.

Example 12

The method according to any of the preceding examples, wherein performing an early data transmission procedure with the UE includes: receiving, by the processing hardware, an initial data packet from the UE via the DU having an initial sequence number; and receiving, by the processing hardware, subsequent data packets from the UE via the DU having subsequent sequence numbers.

Example 13

The method according to any of the preceding examples, wherein the initial and subsequent data packets have sequence numbers from the initial sequence number to K, and further comprising: in response to transitioning the UE to the connected state, receiving, by the processing hardware, additional data packets from the UE via the DU having sequence numbers starting at K+1.

Example 14

The method according to any of the preceding examples, further comprising: assigning, by the processing hardware, at least one sequence number for the at least one data packet from an initial downlink sequence number to M; and assigning, by the processing hardware, a sequence number for the next data packet of M+1.

Example 15

The method according to any of the preceding examples, wherein performing the early data transmission procedure includes performing, by the processing hardware, the early data transmission procedure using a PDCP entity, and further comprising: refraining from reestablishing, by the processing hardware, the PDCP entity in response to transitioning the UE to the connected state.

Example 16

The method according to any of the preceding examples, wherein the next data packet is transmitted or the at least one data packet is retransmitted using the PDCP entity.

Example 17

The method according to any of the preceding examples, wherein performing the early data transmission procedure includes: transmitting, by the processing hardware, a hybrid automatic repeat request (HARQ) transmission of the at least one data packet to the UE using a HARQ process number.

Example 18

The method according to any of the preceding examples, further comprising: in response to transitioning the UE to the connected state, flushing, by the processing hardware, a HARQ buffer associated with the HARQ process number; and generating, by the processing hardware, a next HARQ transmission associated with the HARQ process number as a transmission to the UE.

Example 19

The method according to any of the preceding examples, further comprising: in response to transitioning the UE to the connected state, refraining from using the HARQ process number for HARQ transmissions to the UE in the connected state; and transmitting, by the processing hardware, a next HARQ transmission using a different HARQ process number that was not used in the inactive state.

Example 20

The method according to any of the preceding examples, wherein the at least one data packet is a first data packet and further comprising: in response to transitioning the UE to the connected state, determining, by the processing hardware, whether a HARQ acknowledgement for the HARQ transmission was received from the UE; in a first instance in response to determining that the HARQ acknowledgement was received, transmitting, by the processing hardware to the UE, a new HARQ transmission of a second data packet using the HARQ process number; and in a second instance in response to determining that the HARQ acknowledgement was not received, transmitting, by the processing hardware to the UE, a new HARQ transmission of the first data packet using the HARQ process number.

Example 21

The method according to any of the preceding examples, further comprising: in response to transitioning the UE to the connected state, transmitting, by the processing hardware, a HARQ retransmission of the at least one data packet to the UE using the HARQ process number.

Example 22

The method according to any of the preceding examples, wherein the HARQ transmission is associated with a new data indicator and further comprising: in response to transitioning the UE to the connected state, toggling, by the processing hardware, the new data indicator for a next HARQ transmission; and transmitting, by the processing hardware, the next HARQ transmission to the UE using the HARQ process number.

Example 23

The method according to any of the preceding examples, wherein performing the early data transmission procedure includes transmitting, by the processing hardware, the at least one data packet to the UE using state variables, and further comprising: in response to transitioning the UE to the connected state, resetting, by the processing hardware, the state variables to initial values; and transmitting the next data packet or retransmitting the at least one data packet using the reset state variables.

Example 24

The method according to any of the preceding examples, wherein performing the early data transmission procedure includes transmitting, by the processing hardware, the at least one data packet to the UE using state variables, and further comprising: in response to transitioning the UE to the connected state, retaining, by the processing hardware, the state variables; and transmitting the next data packet or retransmitting the at least one data packet using the state variables.

Example 25

The method according to any of the preceding examples, further comprising: in response to transitioning the UE to the connected state, receiving, by the processing hardware, information from the UE indicating that the UE did not receive the at least one data packet; and retransmitting, by the processing hardware, the at least one data packet in accordance with the information.

Example 26

The method according to any of the preceding examples, further comprising: in response to transitioning the UE to the connected state, transmitting, by the processing hardware, a request to the UE to transmit information indicating a received status of the at least one data packet; and receiving, by the processing hardware, information from the UE indicating the received status of the at least one data packet.

Example 27

The method according to any of the preceding examples, further comprising: transmitting, by the processing hardware, a message to the UE to transition the UE to the connected state; determining, by the processing hardware, whether the message is a first message or a second message; in a first instance in response to determining that the message is the first message, retaining, by the processing hardware, at least one of a MAC entity, an RLC entity, or a PDCP entity; and in a second instance in response to determining that the message is the second message, resetting, reestablishing, or releasing, by the processing hardware, at least one of the MAC entity, the RLC entity, or the PDCP entity.

Example 28

A CU of a base station comprising processing hardware and configured a method according to any of the preceding examples.

Example 29

A method in a distributed unit (DU) of a base station for managing communications from a UE during a state transition, the method comprising: performing, by processing hardware, an early data transmission procedure with the UE while the UE is in an inactive state, including transmitting at least one data packet of a sequence of data packets to the UE; and in response to the UE transitioning to the connected state: transmitting, by the processing hardware, a next data packet in the sequence of data packets to the UE, or retransmitting, by the processing hardware, the at least one data packet to the UE in response to failing to determine the at least one data packet has been received.

Example 30

The method according to example 29, wherein performing the early data transmission procedure includes performing, by the processing hardware, the early data transmission procedure using a media access control (MAC) entity, and further comprising: resetting, by the processing hardware, the MAC entity in response to the UE transitioning to the connected state.

Example 31

The method according to either one of example 29 or example 30, wherein the next data packet is transmitted or the at least one data packet is retransmitted using the reset MAC entity.

Example 32

The method according to any one of examples 29-31, wherein performing the early data transmission procedure includes performing, by the processing hardware, the early data transmission procedure using a radio link control (RLC) entity, and further comprising: reestablishing, by the processing hardware, the RLC entity in response to the UE transitioning to the connected state.

Example 33

The method according to any one of examples 29-32, wherein the next data packet is transmitted or the at least one data packet is retransmitted using the reestablished RLC entity.

Example 34

The method according to any one of examples 29-33, further comprising: receiving, by the processing hardware from a central unit (CU) of the base station, a UE context request message to obtain a radio configuration for the UE; transmitting, by the processing hardware to the CU, a UE context response including the radio configuration for the UE; receiving, by the processing hardware from the CU, a radio resource control (RRC) resume message; and transmitting, by the processing hardware, the RRC resume message to the UE.

Example 35

The method according to any one of examples 29-34, further comprising: receiving, by the processing hardware from a central unit (CU) of the base station, a UE context request message to obtain a radio configuration for the UE; transmitting, by the processing hardware to the CU, a UE context response including the radio configuration for the UE; receiving, by the processing hardware from the CU, an RRC setup message; and transmitting, by the processing hardware, the RRC setup message to the UE.

Example 36

The method according to any one of examples 29-35, further comprising: reestablishing, by the processing hardware, an RLC entity in response to receiving the RRC resume message or the RRC setup message.

Example 37

The method according to any one of examples 29-36, further comprising: resetting, by the processing hardware, a MAC entity in response to receiving the RRC resume message or the RRC setup message.

Example 38

The method according to any one of examples 29-37, wherein performing the early data transmission procedure includes performing, by the processing hardware, the early data transmission procedure using a MAC entity, and further comprising: refraining from resetting, by the processing hardware, the MAC entity in response to the UE transitioning to the connected state.

Example 39

The method according to any one of examples 29-38, wherein the next data packet is transmitted or the at least one data packet is retransmitted using the MAC entity.

Example 40

The method according to any one of examples 29-39, wherein performing the early data transmission procedure includes performing, by the processing hardware, the early data transmission procedure using an RLC entity, and further comprising: refraining from reestablishing, by the processing hardware, the RLC entity in response to the UE transitioning to the connected state.

Example 41

The method according to any one of examples 29-40, wherein the next data packet is transmitted or the at least one data packet is retransmitted using the RLC entity.

Example 42

A DU of a base station comprising processing hardware and configured a method according to any one of examples 29-41.

Example 43

A method in a UE for data transmissions to a base station during a state transition, the method comprising: performing, by processing hardware, an early data transmission procedure with a central unit (CU) and a distributed unit (DU) of the base station while the UE is in an inactive state, including transmitting at least one data packet of a sequence of data packets to the CU via the DU; transitioning, by the processing hardware, to a connected state with the base station; and in response to transitioning to the connected state: transmitting, by the processing hardware, a next data packet in the sequence of data packets to the base station, or retransmitting, by the processing hardware, the at least one data packet to the base station in response to failing to determine the at least one data packet has been received.

Example 44

The method according to example 43, wherein performing the early data transmission procedure includes performing, by the processing hardware, the early data transmission procedure using a media access control (MAC) entity, and further comprising: resetting, by the processing hardware, the MAC entity in response to transitioning to the connected state.

Example 45

The method according to either example 43 or example 44, wherein the next data packet is transmitted or the at least one data packet is retransmitted using the reset MAC entity.

Example 46

The method according to any one of examples 43-45, wherein performing the early data transmission procedure includes performing, by the processing hardware, the early data transmission procedure using a radio link control (RLC) entity, and further comprising: reestablishing, by the processing hardware, the RLC entity in response to transitioning to the connected state.

Example 47

The method according to any one of examples 43-46, wherein the next data packet is transmitted or the at least one data packet is retransmitted using the reestablished RLC entity.

Example 48

The method according to any one of examples 43-47, wherein the UE resets the MAC entity or reestablishes the RLC entity in response to receiving an RRC resume message or an RRC setup message from the CU via the DU.

Example 49

The method according to any one of examples 43-48, wherein performing the early data transmission procedure includes performing, by the processing hardware, the early data transmission procedure using a packet data convergence protocol (PDCP) entity, and further comprising: reestablishing, by the processing hardware, the PDCP entity in response to transitioning to the connected state.

Example 50

The method according to any one of examples 43-49, wherein the next data packet is transmitted or the at least one data packet is retransmitted using the reestablished PDCP entity.

Example 51

The method according to any one of examples 43-50, wherein the at least one data packet in the early data transmission procedures includes an initial data packet and subsequent data packets, and wherein performing an early data transmission procedure with the base station includes: transmitting, by the processing hardware, the initial data packet having an initial sequence number to the CU via the DU; and transmitting, by the processing hardware, the subsequent data packets having subsequent sequence numbers to the CU via the DU.

Example 52

The method according to any one of examples 43-51, wherein the at least one data packet in the early data transmission procedures includes an initial data packet and subsequent data packets, and wherein performing an early data transmission procedure with the base station includes: transmitting, by the processing hardware, an RRC message without the initial data packet to the CU via the DU; and transmitting, by the processing hardware, the initial data packet and the subsequent data packets having sequence numbers including an initial sequence number to the CU via the DU.

Example 53

The method according to any one of examples 43-52, wherein the initial and subsequent data packets have sequence numbers from the initial sequence number to K, and further comprising: assigning, by the processing hardware, a sequence number for the next data packet of K+1.

Example 54

The method according to any one of examples 43-53, further comprising: resetting, by the processing hardware, sequence numbering for the next data packet in response to reestablishing the PDCP entity.

Example 55

The method according to any one of examples 43-54, wherein performing the early data transmission procedure includes performing, by the processing hardware, the early data transmission procedure using a MAC entity, and further comprising: refraining from resetting, by the processing hardware, the MAC entity in response to transitioning to the connected state.

Example 56

The method according to any one of examples 43-55, wherein the next data packet is transmitted or the at least one data packet is retransmitted using the MAC entity.

Example 57

The method according to any one of examples 43-56, wherein performing the early data transmission procedure includes performing, by the processing hardware, the early data transmission procedure using an RLC entity, and further comprising: refraining from reestablishing, by the processing hardware, the RLC entity in response to transitioning to the connected state.

Example 58

The method according to any one of examples 43-57, wherein the next data packet is transmitted or the at least one data packet is retransmitted using the RLC entity.

Example 59

The method according to any one of examples 43-58, wherein performing the early data transmission procedure includes performing, by the processing hardware, the early data transmission procedure using a PDCP entity, and further comprising: refraining from reestablishing, by the processing hardware, the PDCP entity in response to transitioning to the connected state.

Example 60

The method according to any one of examples 43-59, wherein the next data packet is transmitted or the at least one data packet is retransmitted using the PDCP entity.

Example 61

The method according to any one of examples 43-60, wherein performing the early data transmission procedure includes: transmitting, by the processing hardware, a hybrid automatic repeat request (HARQ) transmission of the at least one data packet to the CU via the DU using a HARQ process number.

Example 62

The method according to any one of examples 43-61, further comprising: in response to transitioning to the connected state, flushing, by the processing hardware, a HARQ buffer associated with the HARQ process number; and generating, by the processing hardware, a next HARQ transmission associated with the HARQ process number as a transmission to the CU.

Example 63

The method according to any one of examples 43-62, further comprising: in response to transitioning to the connected state, transmitting, by the processing hardware, a HARQ retransmission of the at least one data packet to the CU using the HARQ process number.

Example 64

The method according to any one of examples 43-63, wherein the HARQ transmission is associated with a new data indicator and further comprising: in response to transitioning to the connected state, receiving, by the processing hardware, a toggled value for the new data indicator for a next HARQ transmission; and transmitting, by the processing hardware, the next HARQ transmission to the CU using the HARQ process number.

Example 65

The method according to any one of examples 43-64, wherein performing the early data transmission procedure includes transmitting, by the processing hardware, the at least one data packet to the CU using state variables, and further comprising: in response to transitioning to the connected state, resetting, by the processing hardware, the state variables to initial values; and transmitting the next data packet or retransmitting the at least one data packet to the CU using the reset state variables.

Example 66

The method according to any one of examples 43-65, wherein performing the early data transmission procedure includes transmitting, by the processing hardware, the at least one data packet to the UE using state variables, and further comprising: in response to transitioning to the connected state, retaining, by the processing hardware, the state variables; and transmitting the next data packet or retransmitting the at least one data packet to the CU using the state variables.

Example 67

The method according to any one of examples 43-66, further comprising: in response to transitioning to the connected state, receiving, by the processing hardware, information from the CU indicating that the CU did not receive the at least one data packet; and retransmitting, by the processing hardware, the at least one data packet in accordance with the information.

Example 68

The method according to any one of examples 43-67, further comprising: in response to transitioning to the connected state, transmitting, by the processing hardware, a request to the CU to transmit information indicating a received status of the at least one data packet; and receiving, by the processing hardware, information from the CU indicating the received status of the at least one data packet.

Example 69

The method according to any one of examples 43-68, further comprising: receiving, by the processing hardware, a message from the CU to transition to the connected state during the early data transmission procedure; transitioning, by the processing hardware, to the connected state with the base station in response to receiving the message; determining, by the processing hardware, whether the message is a first message or a second message; in a first instance in response to determining that the message is the first message, retaining, by the processing hardware, at least one of a MAC entity, an RLC entity, or a PDCP entity; and in a second instance in response to determining that the message is the second message, resetting, reestablishing, or releasing, by the processing hardware, at least one of the MAC entity, the RLC entity, or the PDCP entity.

Example 70

A UE comprising processing hardware and configured a method according to any one of examples 43-69.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

What is claimed is:

1. A method in a central unit (CU) of a base station for managing communications from a user equipment (UE) during a state transition, the method comprising:
performing, by the CU with the UE in an inactive state, an early data transmission, including transmitting at least one data packet of a sequence of data packets via a distributed unit (DU) of the base station using a packet data convergence protocol (PDCP) entity;
determining, by the CU, to transition the UE from the inactive state to a connected state; and
in response to the determining to transition the UE to the connected state:
refraining from reestablishing the PDCP entity; and
transmitting, by the CU, a next data packet in the sequence of data packets to the UE using the PDCP entity, or
retransmitting, by the CU, the at least one data packet to the UE via the DU using the PDCP entity in response to failing to determine the at least one data packet has been received.

2. The method of claim 1, wherein performing an early data transmission procedure with the UE includes:
receiving, by the CU, a radio resource control (RRC) message without an initial data packet from the UE via the DU; and
receiving, by the CU, data packets from the UE via the DU having sequence numbers including an initial sequence number.

3. The method of claim 1, further comprising:
in response to determining to transition the UE from the inactive state to the connected state, transmitting, by the CU, a UE context request message to a DU of the base station to obtain a radio configuration for the UE;
receiving, by the CU from the DU, a UE context response including the radio configuration for the UE; and
at least one of:
transmitting, by the CU, a radio resource control (RRC) resume message to the UE via the DU; or
transmitting, by the CU, a radio resource control (RRC) setup message to the UE via the DU.

4. The method of claim 3, wherein the UE context request message is a first UE context request message that causes the DU to release a UE context, and further comprising:
transmitting, by the CU, a second UE context request message to establish a new UE context for the UE.

5. The method of claim 1, wherein:
performing an early data transmission procedure with the UE includes:
receiving, by the CU, an initial data packet from the UE via the DU having an initial sequence number; and
receiving, by the CU, subsequent data packets from the UE via the DU having subsequent sequence numbers.

6. The method of claim 5, wherein refraining from reestablishing the PDCP entity includes:
assigning a sequence number for the next data packet of M+1 based on not reestablishing the PDCP entity; and/or
receiving, by the CU, additional data packets from the UE via the DU having sequence numbers starting at K+1 based on not reestablishing the PDCP entity.

7. The method of claim 5, further comprising:
assigning, by the CU, at least one sequence number for the at least one data packet from an initial downlink sequence number to M,
wherein the initial and subsequent data packets from the UE have sequence numbers from the initial sequence number to K.

8. The method of claim 1, wherein performing the early data transmission procedure includes:
transmitting, by the CU, a hybrid automatic repeat request (HARQ) transmission of the at least one data packet to the UE using a HARQ process number.

9. The method of claim 8, further comprising:
in response to transitioning the UE to the connected state, flushing, by the CU, a HARQ buffer associated with the HARQ process number; and
generating, by the CU, a next HARQ transmission associated with the HARQ process number as a transmission to the UE.

10. The method of claim 8, further comprising:
refraining from using the HARQ process number for HARQ transmissions to the UE in the connected state; and
transmitting, by the CU, a next HARQ transmission using a different HARQ process number that was not used in the inactive state.

11. The method of claim 8, wherein the at least one data packet is a first data packet, and further comprising:
determining, by the CU, whether a HARQ acknowledgement for the HARQ transmission was received from the UE;
in a first instance in response to determining that the HARQ acknowledgement was received, transmitting, by the CU to the UE, a new HARQ transmission of a second data packet using the HARQ process number; and
in a second instance in response to determining that the HARQ acknowledgement was not received, transmitting, by the CU to the UE, a new HARQ transmission of the first data packet using the HARQ process number.

12. The method of claim 8, further comprising:
transmitting, by the CU, a HARQ retransmission of the at least one data packet to the UE using the HARQ process number.

13. The method of claim 8, wherein the HARQ transmission is associated with a new data indicator and further comprising:
toggling, by the CU, the new data indicator for a next HARQ transmission; and
transmitting, by the CU, the next HARQ transmission to the UE using the HARQ process number.

14. The method of claim 1, further comprising:
in response to transitioning the UE to the connected state, receiving, by the CU information from the UE indicating that the UE did not receive the at least one data packet; and
retransmitting, by the CU, the at least one data packet in accordance with the information.

15. The method of claim 14, further comprising:
in response to transitioning the UE to the connected state, transmitting, by the CU, a request to the UE to transmit information indicating a received status of the at least one data packet; and
receiving, by the CU, information from the UE indicating the received status of the at least one data packet.

16. A central unit (CU) of a base station comprising processing hardware configured to:
perform, by the CU with a user equipment (UE) in an inactive state, an early data transmission, including transmit at least one data packet of a sequence of data packets via a distributed unit (DU) of the base station using a packet data convergence protocol (PDCP) entity;
determine, by the CU, to transition the UE from the inactive state to a connected state; and
in response to the determining to transition the UE to the connected state:
refrain from reestablishing the PDCP entity; and
transmit, by the CU, a next data packet in the sequence of data packets to the UE using the PDCP entity, or
retransmit, by the CU, the at least one data packet to the UE via the DU using the PDCP entity in response to failing to determine the at least one data packet has been received.

17. A method in a distributed unit (DU) of a base station for managing communications from a user equipment (UE) during a state transition, the method comprising:
performing, by the DU with the UE in an inactive state, an early data transmission procedure, including transmitting at least one data packet of a sequence of data packets to a central unit (CU) of the base station via the DU using a packet data convergence protocol (PDCP) entity; and
in response to the UE transitioning to a connected state:
refraining from reestablishing the PDCP entity; and
transmitting, by the DU, a next data packet in the sequence of data packets to the UE using the PDCP entity, or
retransmitting, by the DU, the at least one data packet to the UE using the PDCP entity in response to failing to determine the at least one data packet has been received.

18. The method of claim 17, further comprising:
receiving, by the DU from the CU, a UE context request message to obtain a radio configuration for the UE;
transmitting, by the DU to the CU, a UE context response including the radio configuration for the UE; and
at least one of:
receiving, by the DU from the CU, a radio resource control (RRC) resume message; and transmitting, by the processing hardware, the RRC resume message to the UE; or
receiving, by the DU from the CU, an RRC setup message; and transmitting, by the processing hardware, the RRC setup message to the UE.

19. The method of claim 17, wherein performing the early data transmission procedure further includes performing, by the DU, the early data transmission procedure using a medium access control (MAC) entity, and further comprising:
refraining from resetting, by the DU, the MAC entity in response to the UE transitioning to the connected state.

20. The method of claim 17, wherein performing the early data transmission procedure further includes performing, by the DU, the early data transmission procedure using an RLC entity, and further comprising:
refraining from reestablishing, by the DU, the RLC entity in response to the UE transitioning to the connected state.

21. A distributed unit (DU) of a base station comprising processing hardware configured to:

perform, by the DU with a user equipment (UE) in an inactive state, an early data transmission procedure, including transmit at least one data packet of a sequence of data packets to a central unit (CU) of the base station via the DU using a packet data convergence protocol (PDCP) entity; and in response to the UE transitioning to a connected state:

refrain from reestablishing the PDCP entity; and transmit, by the DU, a next data packet in the sequence of data packets to the UE using the PDCP entity, or retransmit, by the DU, the at least one data packet to the UE using the PDCP entity in response to failing to determine the at least one data packet has been received.

* * * * *